(12) United States Patent
Babaei et al.

(10) Patent No.: US 11,785,615 B2
(45) Date of Patent: *Oct. 10, 2023

(54) SEMI-PERSISTENT SCHEDULING CONFIRMATION

(71) Applicant: Comcast Cable Communications, LLC, Philadelphia, PA (US)

(72) Inventors: Alireza Babaei, Fairfax, VA (US); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,881

(22) Filed: Aug. 26, 2022

(65) Prior Publication Data

US 2022/0408419 A1 Dec. 22, 2022

Related U.S. Application Data

(63) Continuation of application No. 17/168,785, filed on Feb. 5, 2021, now Pat. No. 11,464,005, which is a (Continued)

(51) Int. Cl.
*H04W 72/23* (2023.01)
*H04W 72/20* (2023.01)

(52) U.S. Cl.
CPC .......... *H04W 72/23* (2023.01); *H04W 72/20* (2023.01)

(58) Field of Classification Search
CPC ............ H04W 72/04; H04W 72/0406; H04W 72/0413; H04W 72/042; H04W 72/20; H04W 72/21; H04W 72/23
See application file for complete search history.

(56) References Cited

U.S. PATENT DOCUMENTS

| 6,771,875 B1 | 8/2004 | Kunieda et al. |
| 7,596,549 B1 | 9/2009 | Issa et al. |

(Continued)

FOREIGN PATENT DOCUMENTS

EP 2763338 A1 8/2014

OTHER PUBLICATIONS

R1-162500, RAN WG1 Meeting #84bis, Busan, Korea, Apr. 11-15, 2016, Source: LG Electronics, Title: Discussions on UL enhancements for V2X.

(Continued)

*Primary Examiner* — Robert C Scheibel
(74) *Attorney, Agent, or Firm* — Banner & Witcoff, Ltd.

(57) ABSTRACT

A wireless device may receive configuration information for a plurality of periodic resource allocations. A downlink control information (DCI) may be received comprising an indication of activation or release of at least one periodic resource allocation of the plurality of periodic resource allocations. After receiving the DCI, a medium access control (MAC) subheader comprising a logical channel identifier (LCID) that identifies a confirmation MAC control element may be sent. The confirmation MAC control element may comprise a plurality of fields, and at least one of the plurality of fields may indicate receipt of the indication of activation or release by using a same value to indicate either the activation or the release.

56 Claims, 30 Drawing Sheets

Related U.S. Application Data continuation of application No. 15/812,246, filed on Nov. 14, 2017, now Pat. No. 10,959,218.

(60) Provisional application No. 62/422,284, filed on Nov. 15, 2016, provisional application No. 62/421,821, filed on Nov. 14, 2016.

(56) References Cited

U.S. PATENT DOCUMENTS

| | | | |
|---|---|---|---|
| 10,959,218 B2* | 3/2021 | Babaei | H04W 72/20 |
| 11,464,005 B2* | 10/2022 | Babaei | H04W 72/20 |
| 2010/0098012 A1 | 4/2010 | Bala et al. | |
| 2011/0105107 A1 | 5/2011 | Kwon et al. | |
| 2011/0249578 A1 | 10/2011 | Nayeb Nazar et al. | |
| 2013/0028229 A1 | 1/2013 | Suh et al. | |
| 2013/0058233 A1 | 3/2013 | Kim | |
| 2013/0121297 A1 | 5/2013 | Kim et al. | |
| 2013/0301509 A1 | 11/2013 | Pumadi et al. | |
| 2014/0016593 A1 | 1/2014 | Park et al. | |
| 2014/0241319 A1 | 8/2014 | Lee et al. | |
| 2014/0344472 A1 | 11/2014 | Lovsen et al. | |
| 2015/0043429 A1 | 2/2015 | Kim et al. | |
| 2015/0181576 A1 | 6/2015 | Papasakellariou et al. | |
| 2015/0365831 A1 | 12/2015 | Ko et al. | |
| 2015/0365963 A1 | 12/2015 | Won et al. | |
| 2016/0100353 A1 | 4/2016 | Gleixner | |
| 2016/0204905 A1 | 7/2016 | Lee et al. | |
| 2016/0227486 A1 | 8/2016 | Park | |
| 2016/0227602 A1 | 8/2016 | Yi et al. | |
| 2016/0295624 A1 | 10/2016 | Novlan et al. | |
| 2017/0019887 A1 | 1/2017 | Jiang et al. | |
| 2017/0245245 A1 | 8/2017 | Kim et al. | |
| 2017/0325076 A1 | 11/2017 | Fujishiro et al. | |
| 2017/0347270 A1 | 11/2017 | Iouchi et al. | |
| 2017/0374665 A1 | 12/2017 | Lee et al. | |
| 2018/0007680 A1 | 1/2018 | Lee et al. | |
| 2018/0007693 A1 | 1/2018 | Lee et al. | |
| 2018/0014284 A1* | 1/2018 | Yi | H04W 72/20 |
| 2018/0027461 A1 | 1/2018 | Jia et al. | |
| 2018/0035276 A1 | 2/2018 | Kang et al. | |
| 2018/0035340 A1 | 2/2018 | Fujishiro et al. | |
| 2018/0049225 A1* | 2/2018 | Lee | H04W 72/1263 |
| 2018/0124707 A1 | 5/2018 | Lee et al. | |
| 2018/0159935 A1 | 6/2018 | Cavalcanti et al. | |
| 2018/0192268 A1 | 7/2018 | Xu et al. | |
| 2018/0206089 A1 | 7/2018 | Cavalcanti et al. | |
| 2018/0255569 A1 | 9/2018 | Aiba et al. | |
| 2019/0014563 A1 | 1/2019 | Lee et al. | |
| 2019/0098698 A1 | 3/2019 | Fukuta | |
| 2019/0182644 A1 | 6/2019 | Zheng et al. | |
| 2019/0245657 A1 | 8/2019 | Lee et al. | |

OTHER PUBLICATIONS

R1-164421, 3GPP TSG-RAN WG1 #85, May 23-27, 2016, Nanjing, China, Agenda item: 6.2.2.3.1, Source: Qualcomm Incorporated, Title: eNodeB signaling for SPS resource allocation.

R1-164422, 3GPP TSG-RAN WG1 #85, May 23-27, 2016, Nanjing, China, Agenda item: 6.2.2.3.2, Source: Qualcomm Incorporated, Title: UE reporting for eNodeB resource allocation.

R1-164468, 3GPP TSG RAN WG1 Meeting #85, Nanjing, China, May 23-27, 2016, Source: Guangdong OPPO Mobile Telecom, Title: Discussion on the SPS configuration for mode-2.

R1-164514, 3GPP TSG RAN WG1 Meeting #85, Nanjing, China May 23-27, 2016, Source: LG Electronics, Title: Discussion on details of (E)PDCCH used for sidelink SPS.

R1-164515, 3GPP TSG RAN WG1 Meeting #85, Nanjing, China, May 23-27, 2016, Agenda item: 6.2.2.3.2, Source: LG Electronics, Title: Discussion on details of UE reporting.

R1-164538, 3GPP TSG RAN WG1 Meeting #85, Nanjing, China, May 23-27, 2016, Source: LG Electronics, Title: Discussion on UL SPS for V2X.

R1-164762, 3GPP TSG RAN WG1 Meeting #85, Nanjing, May 23-27, 2016, Agenda Item: 6.2.2.3.1, Source Samsung, Title: Multiple SPS configuration support for SL.

R1-164763, 3GPP TSG RAN WG1 Meeting #85, Nanjing, May 23-27, 2016, Agenda Item: 6.2.2.3.2, Source: Samsung, Title: UE reporting procedure for SL SPS transmissions.

R1-164818, 3GPP TSG RAN WG1 Meeting #85, Nanjing, China, May 23-27, 2016, Agenda Item: 6.2.2.3, Source: Huawei, HiSilicon, Title: SPS enhancement for V2V.

R1-164906, 3GPP TSG RAN WG1 Meeting #85, Nanjing, China May 23-27, 2016, Source: Panasonic, Title: Signaling design to support SPS activation/release in V2V.

R1-164963, 3GPP TSG-RAN WG1 Meeting #85, Nanjing, China May 23-27, 2016, Source: ZTE, Title: Trigger and release of V2V SPS resources.

R1-164964, 3GPP TSG RAN WG1 Meeting #85, Nanjing, China May 23-27, 2016, Agenda item: 6.2.2.3.2, Source: ZTE, Title: Discussion on UE reporting.

R1-165193, 3GPP TSG RAN WG1 Meeting #85, Nanjing, China May 23-27, 2016, Source: NTTDOCOMO, Inc., Title: (E)PDCCH for sidelink SPS configuration switching.

R1-165194, 3GPP TSG RAN WG1 Meeting #85, Nanjing, China May 23-27, 2016, Source: NTT Docomo, Inc., Title: UE reporting for sidelink SPS operation.

R1-165246, 3GPP TSG RAN WG1 Meeting #85, Nanjing, PRC, May 23-27, 2016, Source: Ericsson, Title: Contents of Downlink Control Information for V2V over PC5.

R1-165272, 3GPP TSG RAN WG1 Meeting #85, Nanjing, PRC, May 23-27, 2016, Source: Ericsson, Title: Mode-1 SPS for V2V over PC5.

R1-165274, 3GPP TSG RAN WG1 Meeting #85, Nanjing, May 23-27, 2016, Source: Ericsson, Title: UL SPS and reporting to eNB for V2X.

R1-165309, 3GPP TSG RAN WG1 Meeting #85, Nanjing, China May 23-27, 2016, Source: Panasonic, Title: Details on PC5 SPS enhancement.

R2-162197, 3GPP TSG-RAN2 Meeting #93bis, Dubrovnik, Croatia, Apr. 11-15, 2016, Agenda Item: 8.2.1, Source: OPPO, Title: Discussion on SPS Enhancements for V2V.

R2-162454, 3GPP TSG RAN WG2 Meeting #93bis, Dubrovnik, Croatia, Apr. 11-15, 2016, Agenda item: 8.2.1, Source: Intel Corporation, Title: SL resource allocation in SPS manner.

R2-162927, 3GPP TSG-RAN2 Meeting #93bis, Dubrovnik, Croatia, Apr. 11-15, 2016, Agenda item: 8.2.1, Source LG Electronics Inc., Title: SL SPS enhancement for V2V.

R2-163406, 3GPP TSG-RAN2 Meeting #94, Nanjing, P. R. China, Apr. 23-27, 2016, Agenda Item: 8.11.1, Source: OPPO, Title: Discussion on SPS Enhancements for V2X.

R2-163421, 3GPP TSG-RAN WG2 Meeting #94, Nanjing, China, May 23-25, 2016, Source: CATT, Title: Consideration on SPS Enhancement.

R2-163451, 3GPP TSG RAN WG2 Meeting #94, Nanjing, China, Apr. 23-25, 2016, Agenda Item: 8.2.4, Source: Samsung, Title: UE reporting and dynamic SL SPS transmission.

R2-163807, 3GPP TSG-RAN WG2 Meeting #94, Nanjing, China, May 23-27, 2016, Agenda Item: 8.11.1, Source: Huawei, HiSilicon, InterDigital, LG Electronics Inc., OPPO, Title: Discussions on CAM Characteristics.

R2-163812, 3GPP TSG-RAN WG2 #94, Nanjing, China, May 23-27, 2016, Agenda Item: 8.2.4, Source: Huawei, HiSilicon, Title: Enhancements for Sidelink Resource Allocation.

R2-163840, 3GPP TSG RAN WG2 #94, Nanjing, China, May 23 27, 2016, Source: ZTE, Title: SPS enhancements for V2X over Uu.

R2-163865, 3GPP TSG RAN WG2 Meeting #94, Nanjing, China, May 23-25, 2016, Source: ITL, Title: SLSPS for V2V.

R2-163885, 3GPP TSG RAN WG2 Meeting #94, Nanjing, China, May 23-27, 2016, Source: Potevio, Title: UE assisted information for SPS.

R2-163900, 3GPP TSG-RAN WG2 Meeting #94, Nanjing, China, May 23-27, 2016, Agenda item: 8.11.1, Source: Nokia, Alcatel-Lucent Shanghai Bell, Title: Multiple inter-dependent UL SPS occasions.

(56) References Cited

OTHER PUBLICATIONS

R2-164063, 3GPP TSG-RAN WG2 Meeting #94, Nanjing, China, May 23-27, 2016, Agenda item: 8.2.4, Source: Qualcomm Incorporated, Title: SPS for V2V Communication.
R2-164079, 3GPP TSG-RAN2 Meeting #94, Nanjing, China, Apr. 11-15, 2016, Agenda item: 8.2.4, Source: LG Electronics Inc. Title: Support of Semi-Persistent Scheduling for PCS mode 1.
R2-164082, 3GPP TSG-RAN2 Meeting #94, Nanjing, China, Apr. 11-15, 2016, Agenda item: 8.11.1, Source: LG Electronics Inc, InterDigital, OPPO, Huawei, Title: Proposed TP for UL SPS enhancements.
R2-164377, 3GPP TSG-RAN WG2 Meeting #94, Nanjing, China, May 23-27, 2016, Agenda item: 8.11.1, Source: Huawei, HiSilicon, Title: TP on CAM Characteristics.
Tdoc R2-161571, 3GPP TSG-RAN WG2 #93, St. Julians, Malta, Feb. 15-19, 2016, Agenda Item: 7.11, Source: Ericsson, Title: Overview of V2X Enhancements for Further RAN2 Work.
Tdoc R2-164112, 3GPP TSG-RAN WG2 #94, Nanjing, P.R. China, May 23-27, 2016, Agenda Item: 8.11.1, Source: Ericsson, Title: SPS Enhancements for Uu Operations in V2X.
3GPP TS 36.423 V14.0.0 (Sep. 2016); Technical Specification; 3rd Generation Partnership Project; Technical Specification Group Radio Access Network; Evolved Universal Terrestrial Radio Access Network (E-UTRAN); X2 application protocol (X2AP) (Release 14).
R2-167409; 3GPP TSG RAN WG2 Meeting #96; Reno, USA, Nov. 14-18, 2016; 3GPP TSG RAN WG1 Meeting #86bis; R1-1610929; Lisboa, Portugal, Oct. 10-14, 2016; Title: LS response on DFN offset.
R2-167481; 3GPP TSG-RAN2 Meeting #96; Reno, USA, Nov. 14-18, 2016; Agenda Item: 8.13.2; Source: OPPO; Title: Discussion on Remain Issues of V2X SPS Enhancements.
R2-167482; 3GPP TSG-RAN2 Meeting #96; Reno, USA, Nov. 14-18, 2016; Agenda Item: 8.13.3; Source: OPPO; Title: Discussion on V2P.
R2-167567; 3GPP TSG-RAN WG2 #96; Reno, USA, Nov. 14-18, 2016; Agenda item: 8.13.2; Source: Samsung, Intel; Title: Handling Sidelink SPS Configurations.
R2-167889; 3GPP TSG-RAN WG2 Meeting #96; Reno, USA, Nov. 14-18, 2016; Agenda item: 8.13.2; Source: Qualcomm Incorporated; Title: SPS enhancement for V2X.
R2-167890; 3GPP TSG-RAN WG2 Meeting #96; Reno, USA, Nov. 14-18, 2016; Agenda item: 8.13.3; Source: Qualcomm Incorporated; Title: Sensing based resource selection for V2P.
R2-167919; 3GPP TSG RAN WG2 #96; Reno, USA, Nov. 14 to 18, 2016; Agenda Item: 8.13.3; Source: Samsung; Title: Discussion about prioritization of P-UEs.
R2-167928; 3GPP TSG RAN WG2 Meeting #96; Reno, USA, Nov. 14-18, 2016; Agenda Item: 8.13.3; Source: Huawei, HiSilicon; Title: Discussion on P2X Sidelink Communication.
R2-167930; 3GPP TSG RAN WG2 Meeting #96; Reno, USA, Nov. 14-18, 2016; Agenda Item: 8.13.2; Source: Huawei, HiSilicon; Title: Discussions on Remaining Issues for SPS.
R2-167934; 3GPP TSG RAN WG2 Meeting #96; Reno, USA, Nov. 14-18, 2016; Agenda Item: 8.13.1; Source: Huawei, HiSilicon; Title: Multi-PLMN operation for Uu-based V2X.
R2-167998; 3GPP TSG RAN WG2 Meeting #96; Reno, USA, Nov. 14-18, 2016; Agenda item: 8.13.2; Source: Potevio; Title: Details of LCP for enhanced SPS configurations.
R2-167999; 3GPP TSG RAN WG2 Meeting #96; Reno, USA,Nov. 14-18, 2016; Source: Potevio; Title: Discussion on SPS configuration related issues.
3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.0.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).
3GPP TS 36.300 V14.0.0 (Sep. 2016); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
R2-162236; 3GPP TSG-RAN WG2 Meeting #93bis; Apr. 11 to 15, 2016, Dubrovnik, Croatia; Agenda Item: 8.8.2; Source: Samsung; Title: Discussion on acknowledging SPS command.
R2-162264; 3GPP TSG-RAN WG2 Meeting #93b; Dubrovnik, Croatia, Apr. 11-15, 2016; Agenda item: 8.8.2; Source: Huawei, HiSilicon; Title: On UL grants skipping.
R2-162265; 3GPP TSG-RAN WG2 Meeting #93bis; Dubrovnik, Croatia, Apr. 11-15, 2016; Agenda Item 8.8.2; Source: Huawei, HiSilicon; Title: Implicit SPS release under UL grants skipping.
R2-162266; 3GPP TSG-RAN WG2 Meeting #93b; Dubrovnik, Croatia, Apr. 11-15, 2016; Agenda item: 8.8.2; Source: Huawei, HiSilicon; Title: Necessity of feedback for SPS activation and deactivation.
R2-162415; 3GPP TSG-RAN WG2 Meeting #93bis; Dubrovnik, Croatia, Apr. 11-15, 2016; Agenda Item: 8.8.1; Source: CMCC; Title: Remaining issues related to UL SPS.
R2-162466; 3GPP TSG-RAN2 Meeting #93bis; Dubrovnik, Croatia Apr. 11-15, 2016; Agenda item: 8.8.1; Source: Intel Corporation; Title: Further aspects of short SPS interval.
R2-162467; 3GPP TSG-RAN2 Meeting #93bis; Dubrovnik, Croatia Apr. 11-15, 2016; Agenda item:8.8.2;Source: Intel Corporation; Title: Further aspects of UL grant skipping.
R2-162468; 3GPP TSG-RAN2 Meeting #93bis; Dubrovnik, Croatia Apr. 11-15, 2016; Agenda item: 8.8.3; Source: Intel Corporation; Title: SPS activation, reactivation and deactivation feedback.
R2-162515; 3GPP TSG RAN WG2 Meeting #93bis; Dubrovnik, Croatia, Apr. 11-15, 2016; Source:CATT; Title: Feedback for SPS PDCCH command.
R2-162572; 3GPP TSG-RAN WG2 Meeting #93bis; Dubrovnik, Croatia, Apr. 11-15, 2016; Source: ZTE Corporation; Title: Discussion on the feedback of the SPS activation command.
R2-162601; 3GPP TSG-RAN2 Meeting #93bis; Republika Hrvatska, Dubrovnik, Apr. 11-15, 2016; Agenda Item:8.8.2—LTE Rel-14: WI: L2 latency reduction techniques; Source: ASUSTeK;Title:Discussion on skipping UL grants.
R2-162781; 3GPP TSG-RAN WG2 #93bis; Dubrovnik, Croatia, Apr. 11-15, 2016; Agenda Item: 8.8.3; Source: Ericsson; Title: Acknowledgements for SPS commands.
R2-162901; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: Need for feedback of SPS command.
R2-162902; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: SPS feedback transmission.
R2-162909; 3GPP TSG-RAN2 Meeting #93bis; Dubrovnik, Croatia, Apr. 12-16, 2016; Agenda item: 8.8.2; Source: Qualcomm Incorporated; Title: Open issues for skipping UL grants.
R2-163385; 3GPP TSG-RAN2 Meeting #94; Nanjing, China, May 23-27, 2016; Agenda item: 8.8.1; Source: FiberHome; Title: UL SPS command feedback.

(56) References Cited

OTHER PUBLICATIONS

R2-163386; 3GPP TSG-RAN WG2 Meeting #94; Nanjing, China, May 23-27, 2016; Agenda Item: 8.8.2; Source: FiberHome; Title: discussion of retransmission for short SPS period.
R2-163475; 3GPP TSG RAN WG2 Meeting #94; Nanjing, China, May 23-27, 2016; Source: CATT; Title: Feedback for SPS activation and deactivation.
R2-163671; 3GPP TSG-RAN WG2 Meeting #94; May 23 to 27, 2016, Nanjing, China; Agenda Item: 8.8.1; Source: Samsung; Title: Feedback for SPS activation/deactivation.
R2-163698; 3GPP TSG-RAN WG2 Meeting #94; Nanjing, China, May 23-27, 2016; Agenda item: 8.8.1; Source: Nokia, Alcatel-Lucent Shanghai Bell; Title: Feedback for SPS activation/deactivation.
R2-163771; 3GPP TSG-RAN WG2 Meeting #94; Nanjing, China, May 23-27, 2016; Agenda Item: 8.8.2; Source: Fujitsu; Title: Considerations on the SPS resource efficiency.
R2-163781; 3GPP TSG-RAN WG2 #94; Nanjing, China, May 23-27, 2016; Agenda Item: 8.8.1; Source: Ericsson; Title: Acknowledgements for SPS commands.
R2-163916; 3GPP TSG-RAN WG2 Meeting #94; Nanjing, China, May 23-27, 2016; Agenda item: 8.8.1; Source: Huawei, HiSilicon; Title: Discussion on feedback for SPS activation and deactivation.
R2-163917; 3GPP TSG-RAN WG2 Meeting #94; Nanjing, China, May 23-27, 2016; Agenda Item: 8.8.2; Source: Huawei, HiSilicon; Title: Implicit SPS release under UL grants skipping.
R2-164207; 3GPP TSG-RAN WG2 Meeting #94; Nanjing, China, May 23-27, 2016; Agenda Item: 8.8.1 (LTE_LATRED_L2-Core); Source: LG Electronics Inc.; Title: SPS feedback for SPS release.
R2-164217; 3GPP TSG-RAN WG2 Meeting #94; Nanjing, China, May 23-27, 2016; Agenda Item: 8.8.1 (LTE_LATRED_L2-Core); Source: LG Electronics Inc.; Title: Need of feedback for SPS activation.
R2-165266; 3GPP TSG-RAN2 Meeting #95; Goteborg, Sweden, Aug. 22-26, 2016; Source: ZTE Corporation; Title: Discussion on the configurable feedback.
R2-165267; 3GPP TSG-RAN2 Meeting #95; Goteborg, Sweden, Aug. 22-26, 2016; Source: ZTE Corporation; Title: Discussion on the feedback transmission of SPS release.
R2-165354; 3GPP TSG-RAN WG2 #95; Gothenburg, Sweden, May 22-26, 2016; Agenda Item: 8.8; Source: Ericsson; Title: Remaining issues with SPS with skip padding and short periods.
R2-165663; 3GPP TSG-RAN WG2 Meeting #95; Gothenburg, Sweden, Aug. 22-26, 2016; Agenda Item: 8.8 (LTE_LATRED_L2-Core); Source: LG Electronics Inc.; Title: Remaining issues on SPS Confirmation MAC CE.
R2-165686; 3GPP TSG-RAN2 Meeting #95; Gothenburg, Sweden, Aug. 22-26, 2016; Agenda item: 8.8; Source: Qualcomm Incorporated; Title: Remaining Open Issues for Uplink Skipping.
3GPP TS 22.185 V0.2.0 (Feb. 2016), Technical Specification, 3rd Generation Partnership Project; Technical Specification Group Services and System Aspects; Service requirements for V2X services; Stage 1 (Release 14).
3GPP TS 23.203 V13.7.0 (Mar. 2016), Technical Specification, 3rd Generation Partnership Project; Technical Specification Group Services and System Aspects; Policy and charging control architecture (Release 13).
3GPP TS 23.303 V13.3.0 (Mar. 2016), Technical Specification, 3rd Generation Partnership Project; Technical Specification Group Services and System Aspects; Proximity-based services (ProSe); Stage 2 (Release 13).
3GPP TS 24.334 V13.3.1 (Mar. 2016-03), Technical Specification, 3rd Generation Partnership Project; Technical Specification Group Core Network and Terminals; Proximity-services (ProSe) User Equipment (UE) to Prose function protocol aspects; Stage 3, (Release 13).
3GPP TS 29.214 V13.5.0 (Mar. 2016), Technical Specification, 3rd Generation Partnership Project; Technical Specification Group Core Network and Terminals; Policy and Charging Control over Rx reference point, (Release 13).
3GPP TS 36.213 V13.2.0 (Jun. 2016), Technical Specification, 3rd Generation Partnership Project; Technical Specification Group Radio Access Network; Evolved Universal Terrestrial Radio Access (E-UTRA); Physical layer procedures (Release 13).
3GPP TS 36.300 V13.4.0 (Jun. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA); Medium Access Control (MAC) protocol specification (Release 13).
3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource Control (RRC); Protocol specification (Release 13).
R1-164878, 3GPP TSG RAN WG1 Meeting #85, Nanjing, China May 23-27, 2016, Source: CMCC, Title: Discussion on SPS configurations.
R1-162122, 3GPP TSG RAN WG1 Meeting #84bis, Busan, Korea, April 11-15, 2016, Agenda Item: 7.3.2.2.2, Source: Huawei, HiSilicon, Title: SPS enhancement for V2V.
R1-162340, 3GPP TSG RAN WG1 Meeting #84 bis, Busan, Korea, Apr. 11-15, 2016, Source: OPPO, Title: Discussion on the SPS configuration.
R1-162413, 3GPP TSG-RAN WG1 Meeting #84bis, Busan, Korea Apr. 11-15, 2016, Source: ZTE, Title: Discussion on V2V SPS resource scheme.
R2-168043; 3GPP TSG-RAN WG2 #96; Reno, USA, Nov. 14-18, 2016; Agenda item: 8.13.3; Source: Kyocera; Title: Consideration of the P2V transmission scheme.
R2-168045; 3GPP TSG RAN WG2 #96; Reno, USA, Nov. 14 to 18, 2016; Agenda Item: 8.13.1; Source: Samsung; Title: Supporting small and variable Service Area in non-overlapped local MBMS service area.
R2-168068; 3GPP TSG-RAN WG2 Meeting #96; Reno, Nevada, USA, Nov. 14-18, 2016; Agenda item: 8.13.3; Source: Samsung; Title: Resource configuration for P2V.
R2-168083; 3GPP TSG RAN WG2 Meeting #96; Reno, USA, Nov. 14-18, 2016; Source: CATT; Title: Discussion on Impact of LCP procedure in V2X SPS resource usage; Agenda Item: 8.13.2.
R2-168084; 3GPP TSG RAN WG2 Meeting #96; Reno, USA, Nov. 14-18, 2016; Source: CATT, ZTE, Potevio; Title: Discussion on V2X SPS.
R2-168085; 3GPP TSG-RAN WG2 Meeting #96; Reno, USA, Nov. 14 -18, 2016; Source: CATT; Title: Consideration on pool management and resource selection.
R2-168137; 3GPP TSG-RAN WG2 #96; Reno, USA, Nov. 14-18, 2016; Agenda Item: 8.13.2; Source: ZTE; Title: Discussion on SPS related issues.
R2-168139; 3GPP TSG-RAN WG2 Meeting #96; Reno, USA, Nov. 14-18, 2016; Title: MBMS enhancement for Uu based V2X communication; Source: ZTE Corporation.
R2-168144; 3GPP TSG-RAN WG2 Meeting #96; Reno, USA, Nov. 14-18, 2016; Title: Discussion on V2P aspects; Source: ZTE.
R2-168Z73; 3GPP TSG-RAN WG2 Meeting #96; Reno, USA, Nov. 14-18, 2016; Agenda Item: 8.13.3; Source: Coolpad; Title: Discussion on power saving for PCS-based V2P.
R2-168409; 3GPP TSG-RAN WG2 #96; Reno, USA, Aug. 14-18, 2016; Agenda Item: 8.13.2; Source: LG Electronics Inc.; Title: SPS and UE assistant information for V2X.
R2-168410; 3GPP TSg-RAN WG2 #96; Reno, USA, Nov. 14-18, 2016; Agenda Item : 8.13.3; Source: LG Electronics Inc.; Title: Support for V2P service.
R2-168426; 3GPP TSG-RAN WG2 Meeting #96; Reno, USA, Nov. 14-18, 2016; Agenda item: 8.13.3; Source: Nokia, Alcatel-Lucent Shanghai Bell; Title: Efficient V2P/P2V activation.
R2-168427; 3GPP TSG-RAN WG2 Meeting #96; Reno, USA, Nov. 14-18, 2016; Agenda item: 8.13.2; Source: Nokia, Alcatel-Lucent Shanghai Bell; Title: Further discussion on SPS enhancements.

(56) References Cited

OTHER PUBLICATIONS

R2-168486; 3GPP TSG-RAN WG2 #96; Reno, Nevada, USA, Nov. 14-18, 2016; Agenda Item: 9.3.1.1.3 Source: Ericsson; Title: Consideration on mobility for URLLC and eV2x.
R2-168642; 3GPP TSG-RAN WG2 #96; Reno, Nevada, USA, Nov. 14-18, 2016; Agenda Item: 8.13.3; Source: Ericsson; Title: Discussion on Sidelink Operations for Pedestrian.
R2-168653; 3GPP TSG-RAN WG2 #96; Reno, Nevada, USA, Nov. 14-18, 2016; Agenda Item: 8.13.2; Source: Ericsson; Title: SPS Protocol for Uu.
R2-168701; 3GPP TSG-RAN WG2 #96; Reno, Nevada, USA, Nov. 14-18, 2016; Agenda Item: 8.13.2; Source: Ericsson, Interdigital, Qualcomm; Title: Configuration of UE Assistance Information.
R2-168702; 3GPP TSG-RAN WG2 #96; Reno, Nevada, USA, Nov. 14-18, 2016; Agenda Item: 8.13.2; Source: Ericsson, Interdigital, ITL; Title:vSidelink SPS Configuration.
R2-168789; 3GPP TSG RAN WG2 Meeting #96; Reno, NV, USA, Nov. 14-18, 2016; Title: Draft LS reply on Voice and Video enhancement for LTE.
International Search Report dated Jan. 11, 2018 in International Application No. PCT/US2017/045754.
R2-164105, 3GPP TSG-RAN WG2 Meeting #94, Nanjing, China, May 23-27, 2016, Source: Ericsson, Title: Sidelink Resource Allocation in V2X.
R2-163836, 3GPP TSG-RAN WG2 Meeting #94, Nanjing, China, May 23-27, 2016, Source: ZTE, Title: SPS enhancements for V2V over PC5.
3GPP TS 36.213 V11.3.0 (Jul. 2013), Technical Specification, 3rd Generation Partnership Project; Technical Specification LTE; Evolved Universal Terrestrial Radio Access (E-UTRA); (Release 11).

* cited by examiner

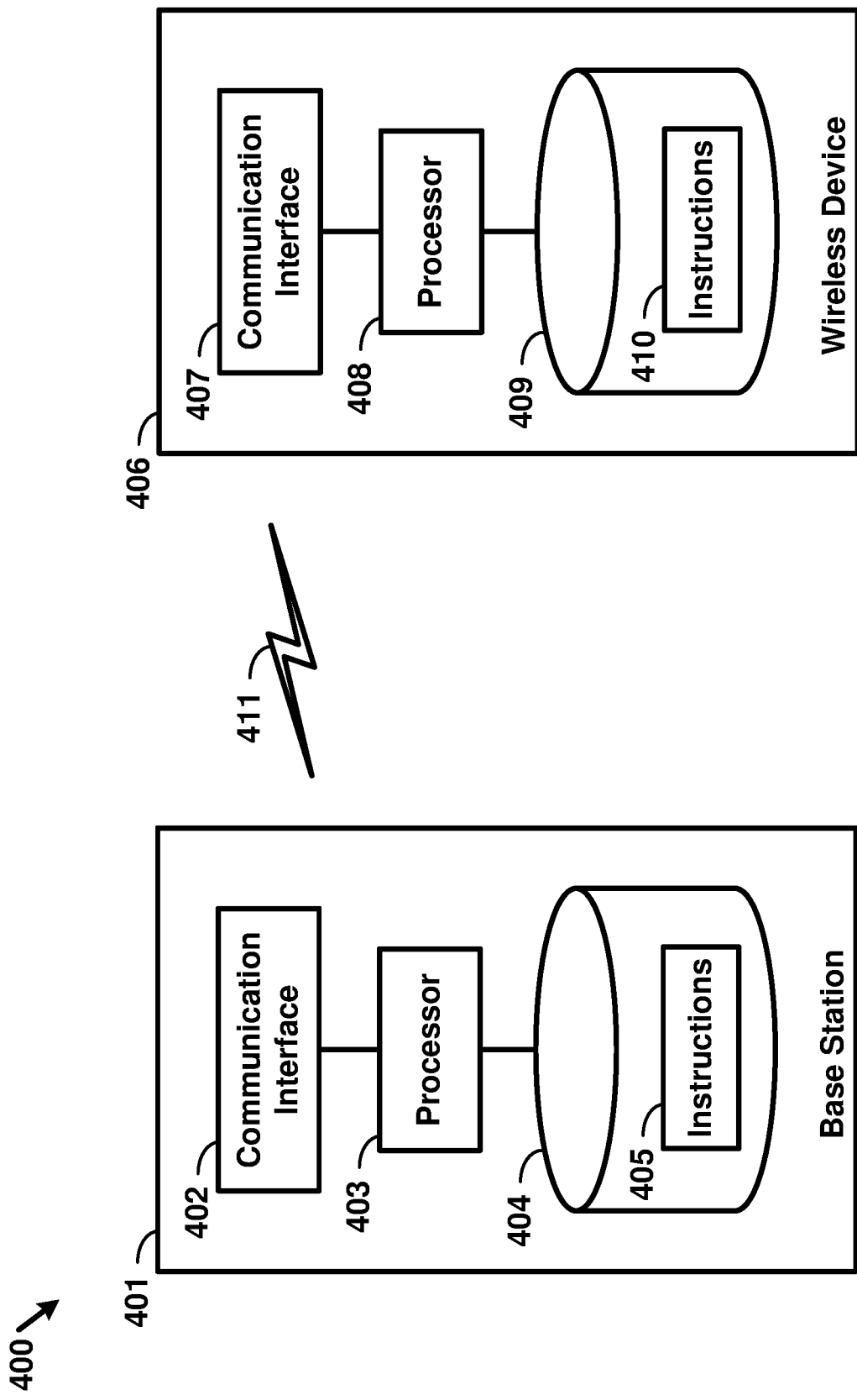

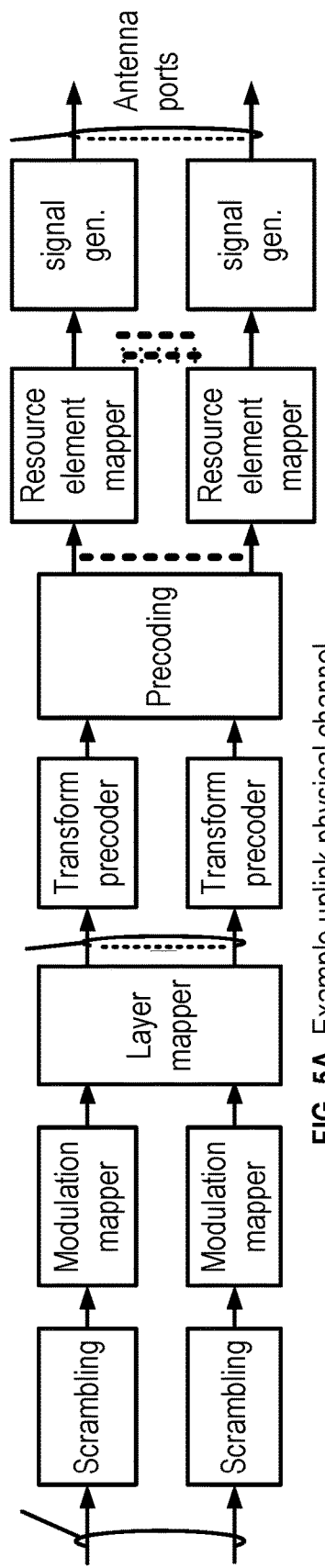
FIG. 5A Example uplink physical channel
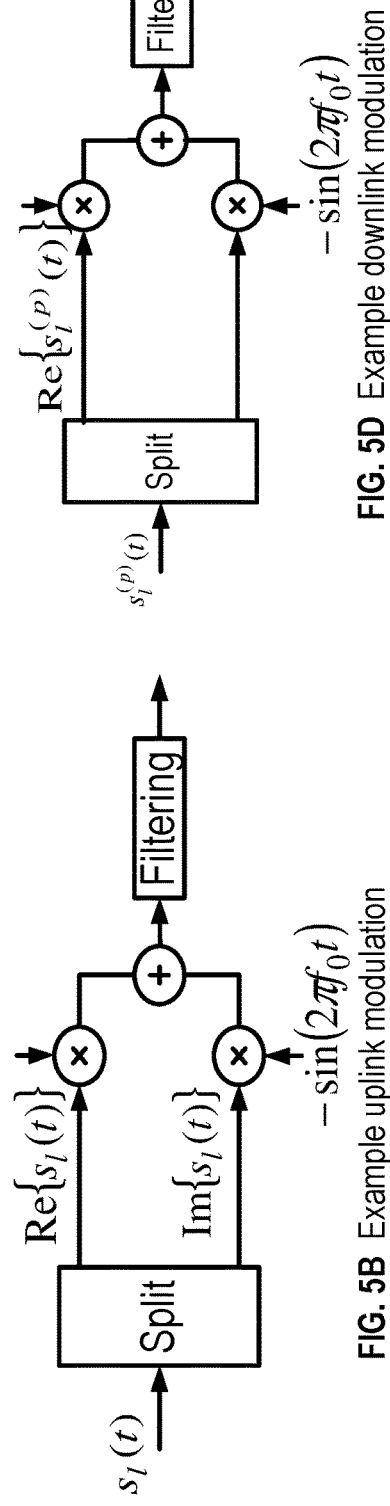
FIG. 5B Example uplink modulation
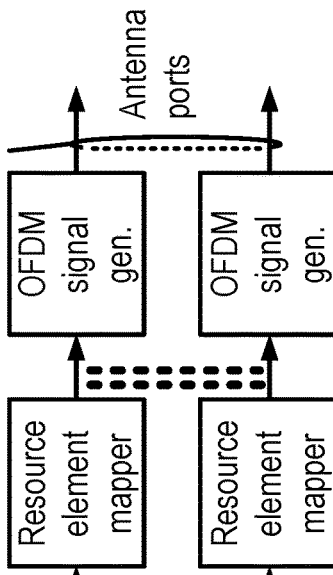
FIG. 5D Example downlink modulation
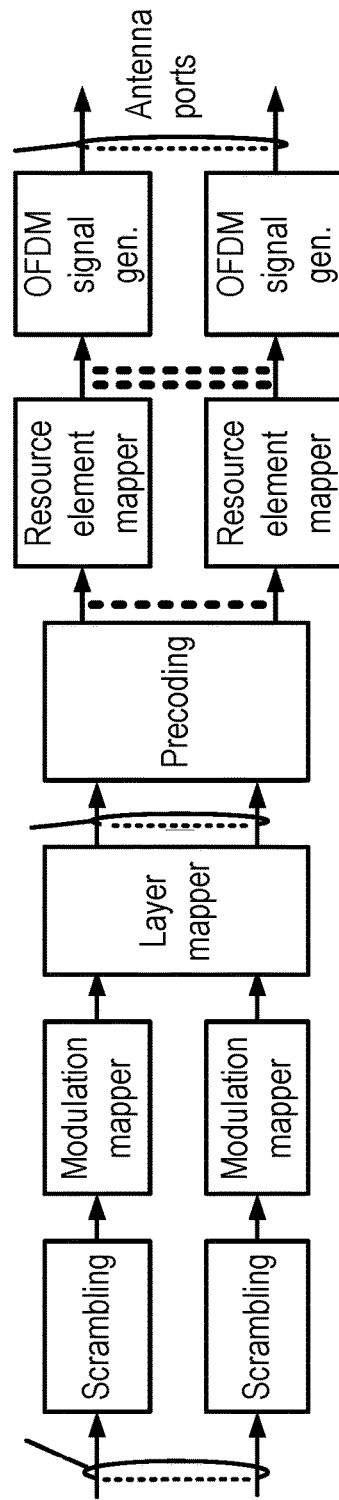
FIG. 5C Example downlink physical channel Dual-Connectivity at eNB FIG. 7  Dual-Connectivity- two MAC entities at UE side Example 1: 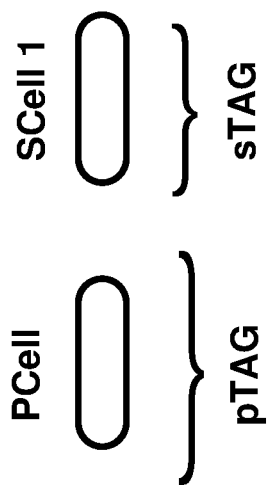
Example 2: 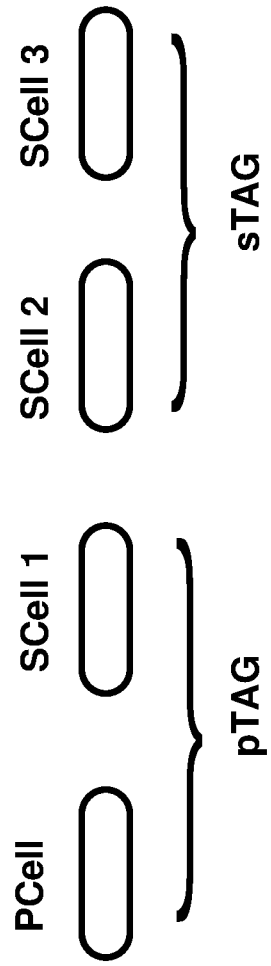
Example 3: 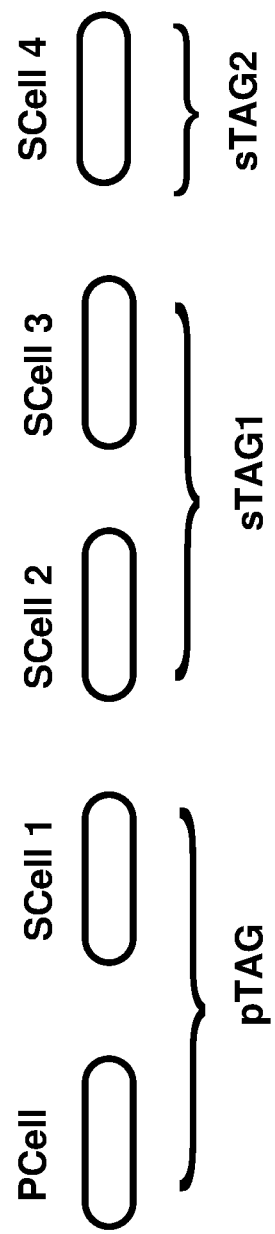
FIG. 8

Example Activation/Deactivation MAC control element of one octet

| $C_7$ | $C_6$ | $C_5$ | $C_4$ | $C_3$ | $C_2$ | $C_1$ | R | Oct 1 |

Example Activation/Deactivation MAC control element of four octets

| | | | | |
|---|---|---|---|---|
| R | $C_8$ | $C_{16}$ | $C_{24}$ | Oct 1 |
| $C_1$ | $C_9$ | $C_{17}$ | $C_{25}$ | Oct 2 |
| $C_2$ | $C_{10}$ | $C_{18}$ | $C_{26}$ | Oct 3 |
| $C_3$ | $C_{11}$ | $C_{19}$ | $C_{27}$ | Oct 4 |
| $C_4$ | $C_{12}$ | $C_{20}$ | $C_{28}$ | |
| $C_5$ | $C_{13}$ | $C_{21}$ | $C_{29}$ | |
| $C_6$ | $C_{14}$ | $C_{22}$ | $C_{30}$ | |
| $C_7$ | $C_{15}$ | $C_{23}$ | $C_{31}$ | |

FIG. 10

| TDD UL/DL configuration | Position of initial Semi-Persistent grant | Subframe_Offset value (ms) |
|---|---|---|
| 0 | N/A | 0 |
| 1 | Subframes 2 and 7 | 1 |
| 1 | Subframes 3 and 8 | -1 |
| 2 | Subframe 2 | 5 |
| 2 | Subframe 7 | -5 |
| 3 | Subframes 2 and 3 | 1 |
| 3 | Subframe 4 | -2 |
| 4 | Subframe 2 | 1 |
| 4 | Subframe 3 | -1 |
| 5 | N/A | 0 |
| 6 | N/A | 0 |

FIG. 11

SEMI-PERSISTENT SCHEDULING CONFIRMATION

CROSS-REFERENCE TO RELATED APPLICATIONS

This application is a continuation of U.S. application Ser. No. 17/168,785 filed on Feb. 5, 2021 (now U.S. Pat No. 11,464,005), which is a continuation of U.S. application Ser. No. 15/812,246, filed on Nov. 14, 2017 (now U.S. Pat. No. 10,959,218), which claims the benefit of U.S. Provisional Application No. 62/421,821, filed Nov. 14, 2016 and of U.S. Provisional Application No. 62/422,284, filed Nov. 15, 2016 each of which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4 is an example block diagram of a base station and a wireless device as per an aspect of an embodiment of the present disclosure.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 10 is an example diagram depicting Activation/Deactivation MAC control elements as per an aspect of an embodiment of the present disclosure.

FIG. 11 is an example diagram depicting example subframe offset values as per an aspect of an embodiment of the present disclosure.

DETAILED DESCRIPTION OF EMBODIMENTS

Figure 1:
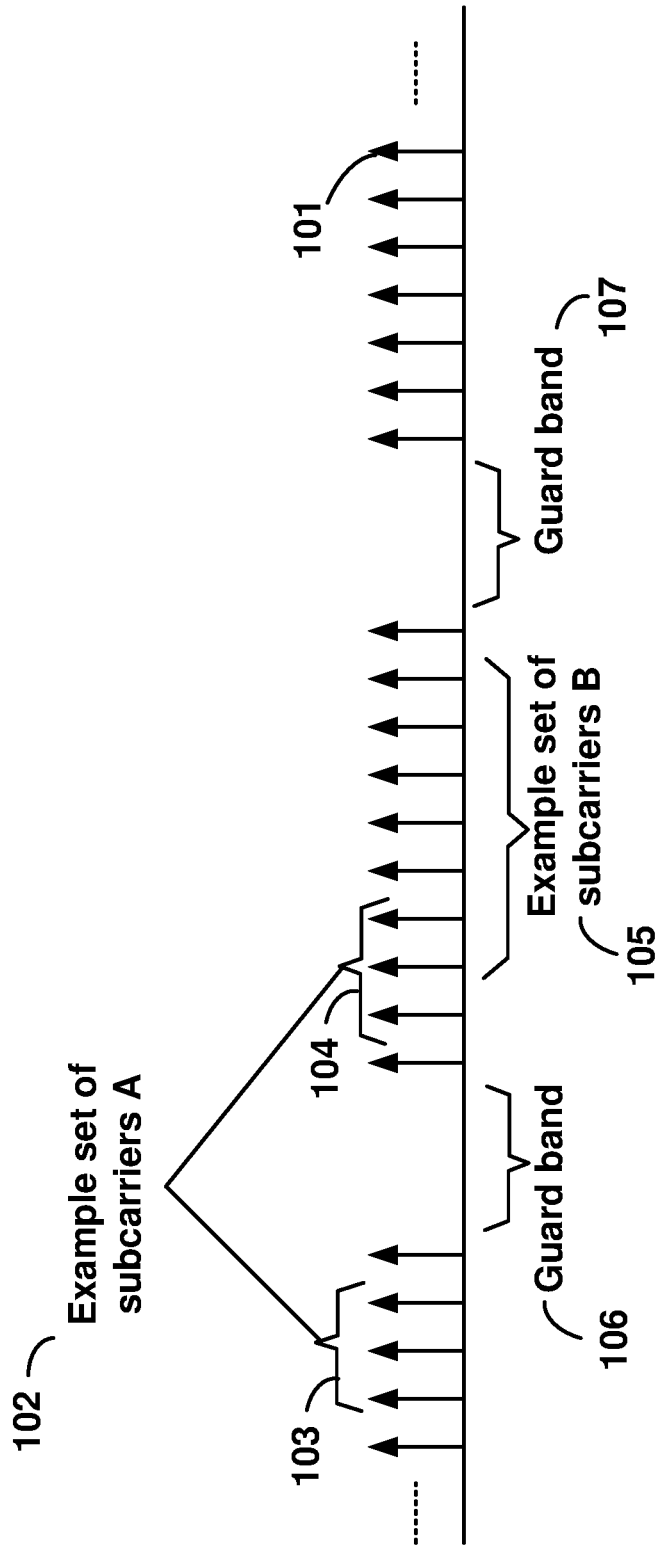
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
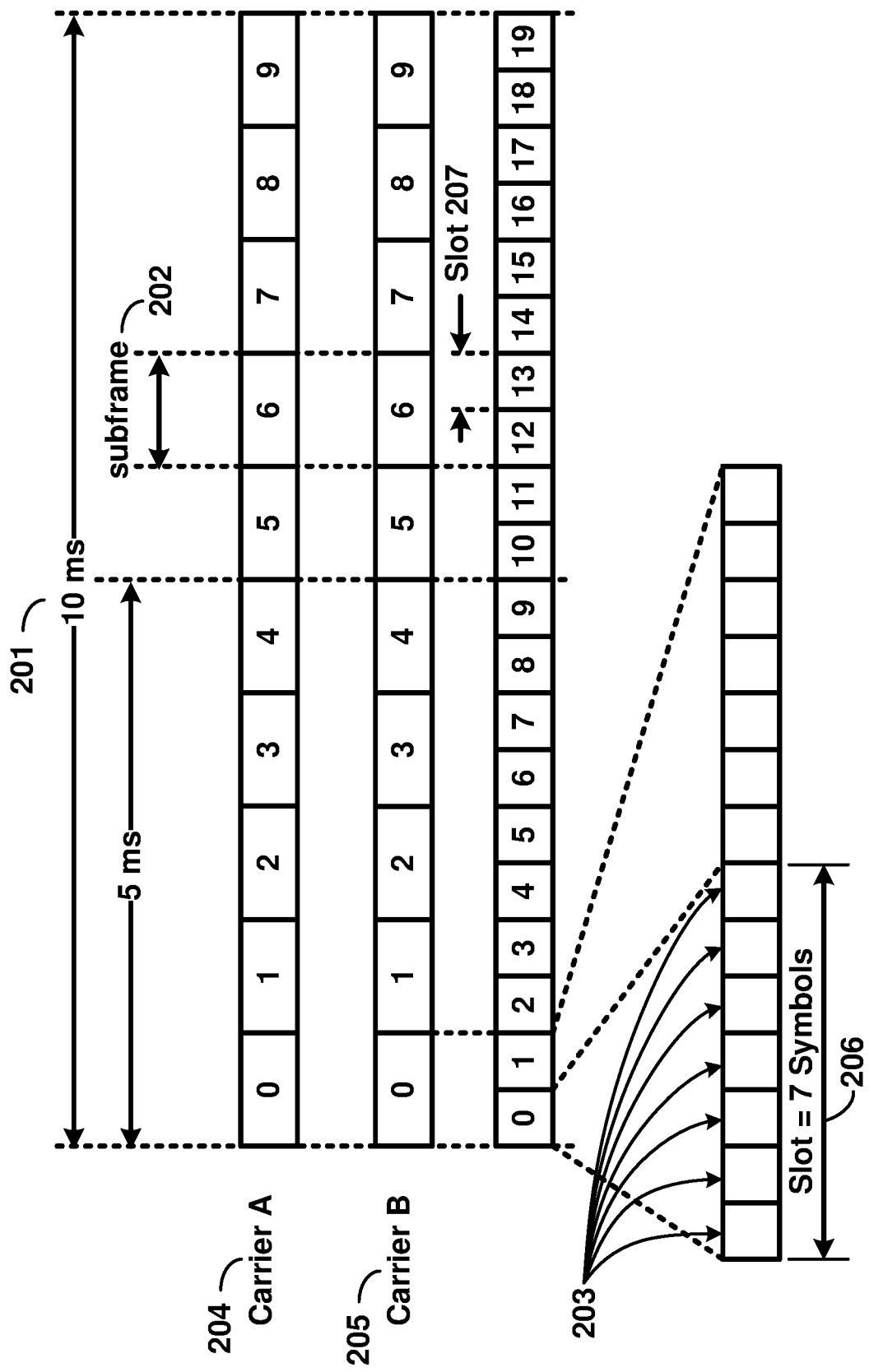
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
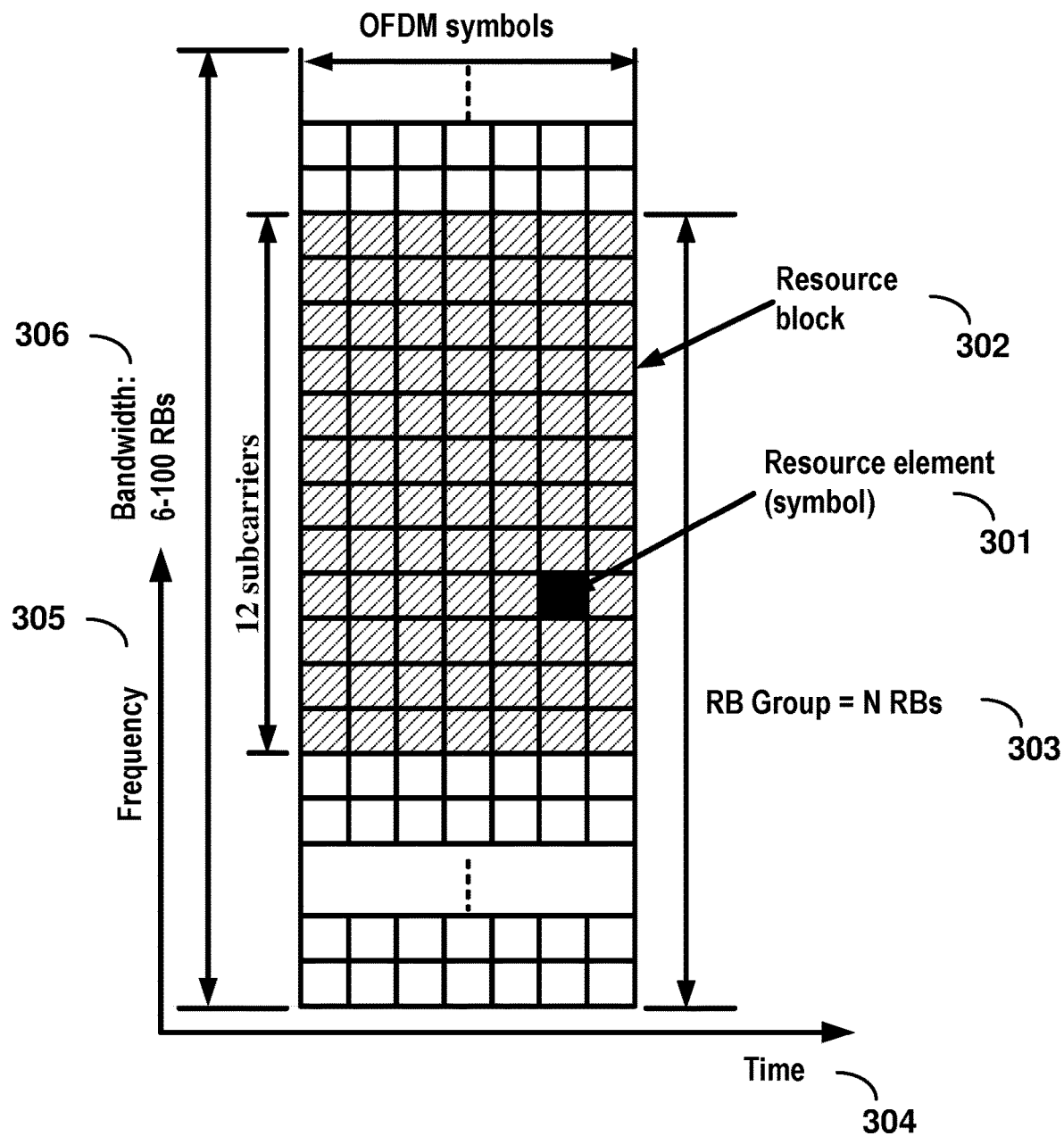
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
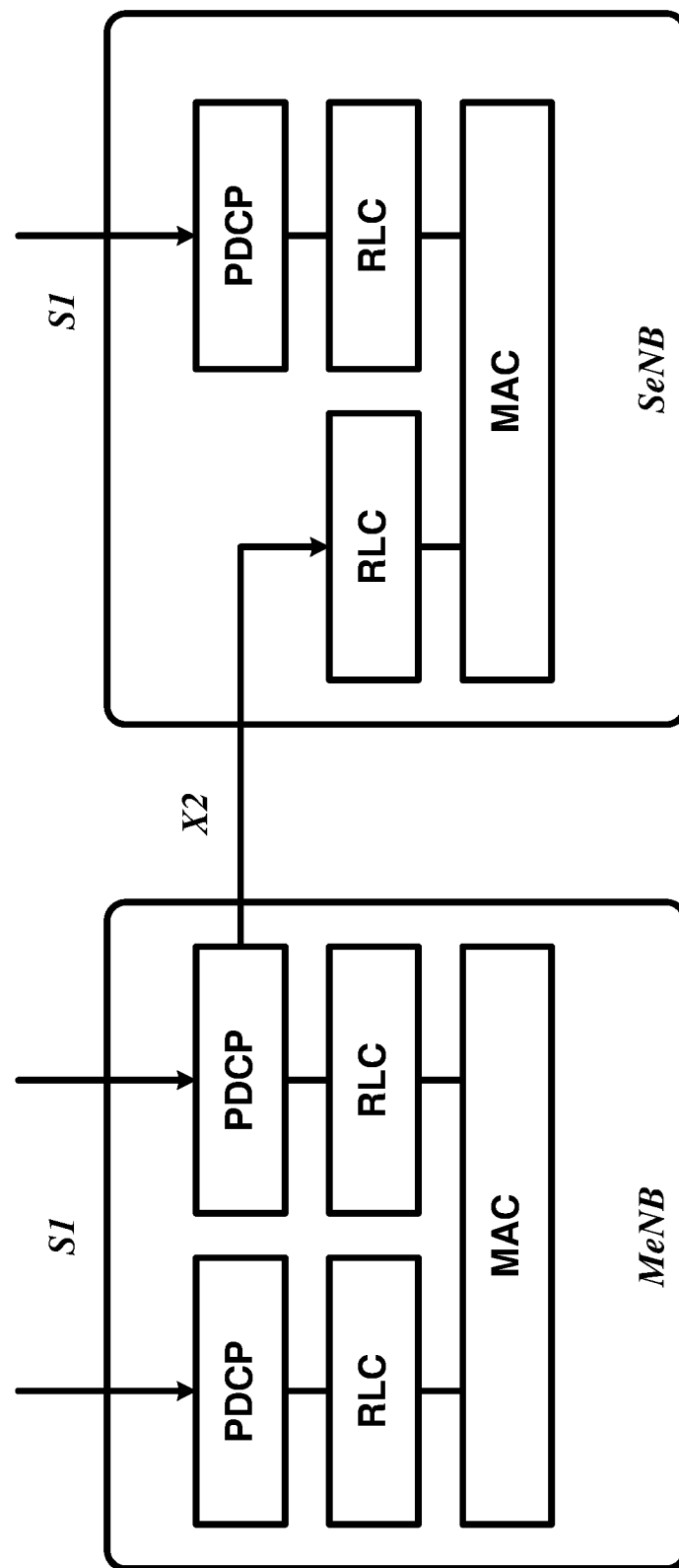
FIG. 6 is an example diagram for a protocol structure with CA and DC as per an aspect of an embodiment of the present disclosure.
Figure 7:
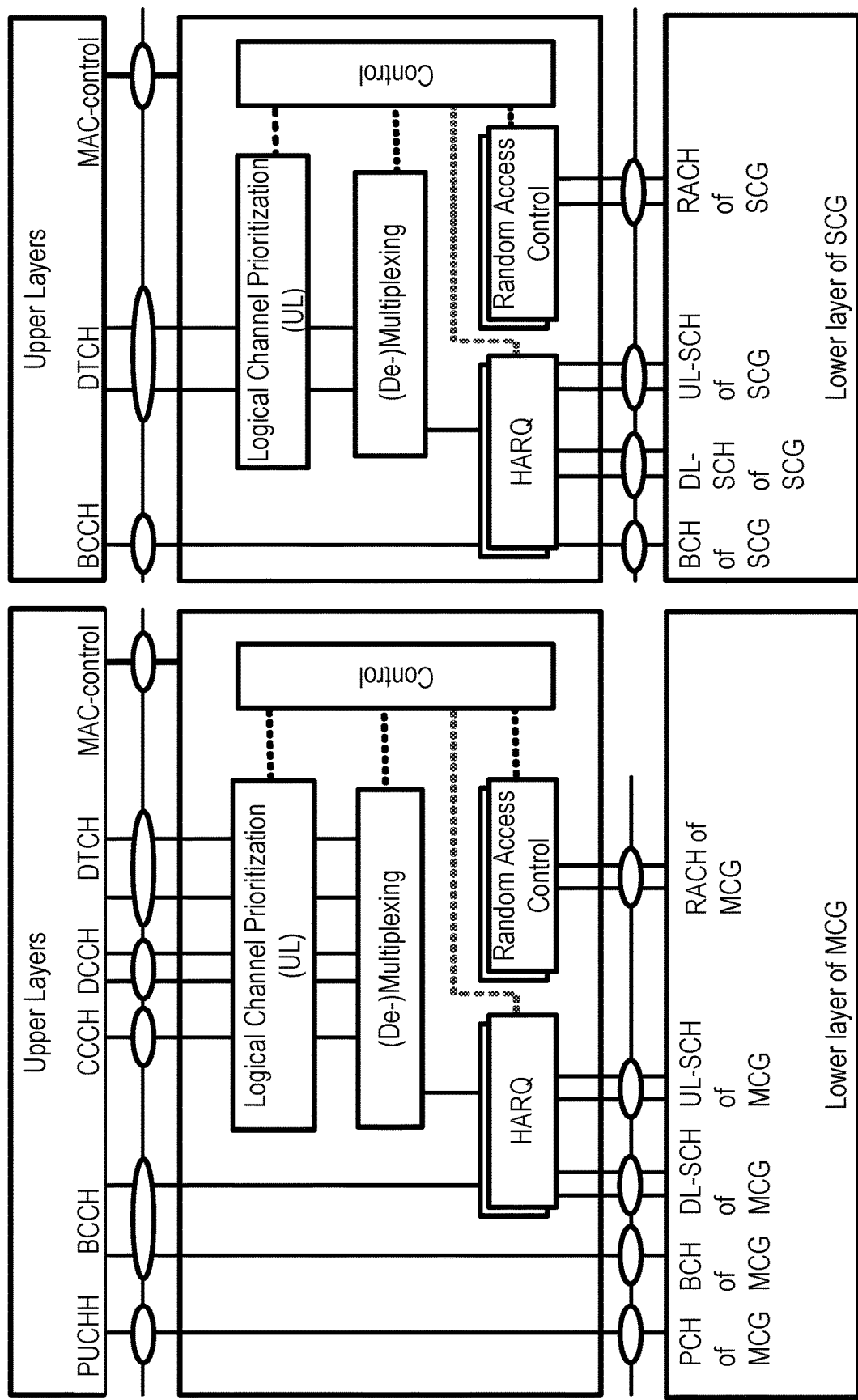
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
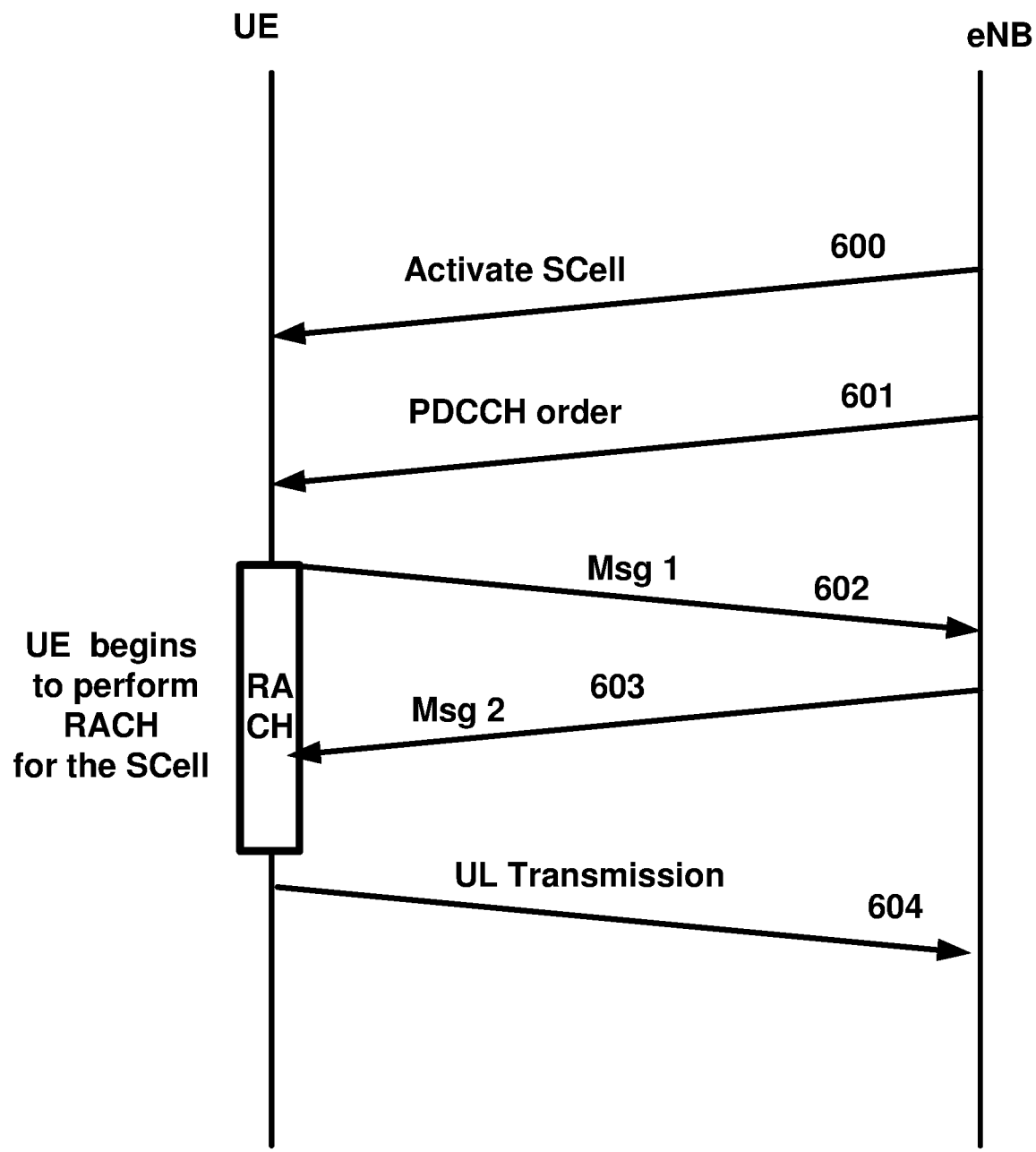
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

In an example, the MAC entity may be configured with one or more SCells. In an example, the network may activate and/or deactivate the configured SCells. The SpCell may always be activated. The network may activate and deactivates the SCell(s) by sending the Activation/Deactivation MAC control element. The MAC entity may maintain a sCellDeactivationTimer timer for a configured SCell. Upon the expiry of sCellDeactivationTimer timer, the MAC entity may deactivate the associated SCell. In an example, the same initial timer value may apply to each instance of the sCellDeactivationTimer and it may be configured by RRC. The configured SCells may initially be deactivated upon addition and after a handover. The configured SCG SCells may initially be deactivated after a SCG change.

In an example, if the MAC entity receives an Activation/Deactivation MAC control element in a TTI activating a SCell, the MAC entity may, in a TTI according to the timing defined below, activate the SCell and apply normal SCell operation including SRS transmissions on the SCell, CQI/PMI/RI/PTI/CRI reporting for the SCell, PDCCH monitoring on the SCell, PDCCH monitoring for the SCell and PUCCH transmissions on the SCell, if configured. The MAC entity may start or restart the sCellDeactivationTimer associated with the SCell and trigger power headroom report (PHR). In an example, if the MAC entity receives an Activation/Deactivation MAC control element in a TTI deactivating a SCell or if the sCellDeactivationTimer associated with an activated SCell expires in the TTI, the MAC entity may, in a TTI according to the timing defined below, deactivate the SCell, stop the sCellDeactivationTimer associated with the SCell and flush all HARQ buffers associated with the SCell.

In an example, when a UE receives an activation command for a secondary cell in subframe n, the corresponding actions above may be applied no later than the minimum requirements and no earlier than subframe n+8, except for the actions related to CSI reporting on a serving cell which may be active in subframe n+8 and the actions related to the sCellDeactivationTimer associated with the secondary cell which may be applied in subframe n+8. The actions related to CSI reporting on a serving cell which is not active in subframe n+8 may be applied in the earliest subframe after n+8 in which the serving cell is active.

In an example, when a UE receives a deactivation command for a secondary cell or the sCellDeactivationTimer associated with the secondary cell expires in subframe n, the corresponding actions above may apply no later than the minimum requirement except for the actions related to CSI reporting on a serving cell which is active which may be applied in subframe n+8.

In an example, if the PDCCH on the activated SCell indicates an uplink grant or downlink assignment or if the PDCCH on the Serving Cell scheduling an activated SCell indicates an uplink grant or a downlink assignment for the activated SCell, the MAC entity may restart the sCellDeactivationTimer associated with the SCell.

In an example, if a SCell is deactivated, the UE may not transmit SRS on the SCell, may not report CQI/PMI/RI/PTI/CRI for the SCell, may not transmit on UL-SCH on the SCell, may not transmit on RACH on the SCell, may not monitor the PDCCH on the SCell, may not monitor the PDCCH for the SCell and may not transmit PUCCH on the SCell.

In an example, the HARQ feedback for the MAC PDU containing Activation/Deactivation MAC control element may not be impacted by PCell interruption due to SCell activation/deactivation. In an example, when SCell is deactivated, the ongoing Random Access procedure on the SCell, if any, may be aborted.

In an example, the Activation/Deactivation MAC control element of one octet may be identified by a MAC PDU subheader with LCID 11000. FIG. 10 shows example Activation/Deactivation MAC control elements. The Activation/Deactivation MAC control element may have a fixed size and may consist of a single octet containing seven C-fields and one R-field. Example Activation/Deactivation MAC control element with one octet is shown in FIG. 10. The Activation/Deactivation MAC control element may have a fixed size and may consist of four octets containing 31 C-fields and one R-field. Example Activation/Deactivation MAC control element of four octets is shown in FIG. 10. In an example, for the case with no serving cell with a serving cell index (ServCellIndex) larger than 7, Activation/Deactivation MAC control element of one octet may be applied, otherwise Activation/Deactivation MAC control element of four octets may be applied. The fields in an Activation/Deactivation MAC control element may be interpreted as follows. Ci: if there is an SCell configured with SCellIndex i, this field may indicate the activation/deactivation status of the SCell with SCellIndex i, else the MAC entity may ignore the Ci field. The Ci field may be set to "1" to indicate that the SCell with SCellIndex i is activated. The Ci field is set to "0" to indicate that the SCell with SCellIndex i is deactivated. R: Reserved bit, set to "0".

Figure 12:
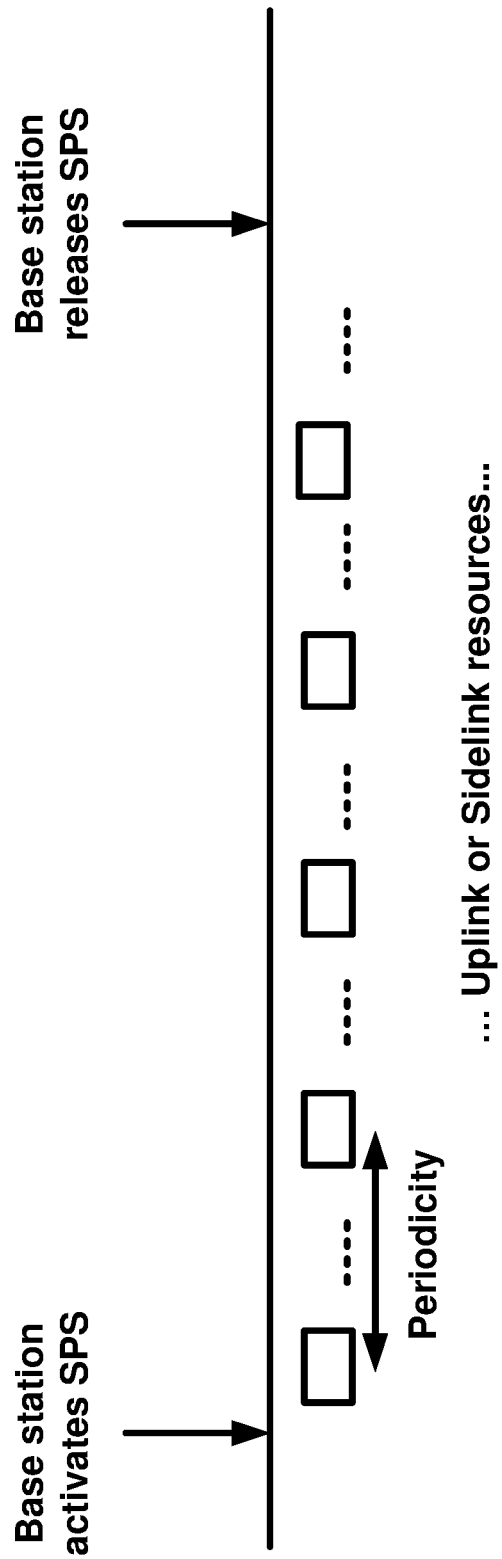
FIG. 12 is an example diagram depicting example uplink SPS activation and release as per an aspect of an embodiment of the present disclosure.

A base station may provide a periodic resource allocation. In a periodic resource allocation, an RRC message and/or a DCI may activate or release a periodic resource allocation. The UE may be allocated in downlink and/or uplink periodic radio resources without the need for transmission of additional grants by the base station. The periodic resource allocation may remain activated until it is released. The periodic resource allocation for example, may be called, semi-persistent scheduling or grant-free scheduling, or periodic multi-subframe scheduling, and/or the like. In this specification, the example term semi-persistent scheduling is mostly used, but other terms may also be equally used to refer to periodic resource allocation, e.g. grant-free scheduling. An example periodic resource allocation activation and release is shown in FIG. 12.

In the downlink, a base station may dynamically allocate resources (PRBs and MCS) to UEs at a TTI via the C-RNTI on PDCCH(s). A UE may monitor the PDCCH(s) in order to find possible allocation when its downlink reception is enabled (e.g. activity governed by DRX when configured). When CA is configured, the same C-RNTI applies to serving cells. Base station may also allocate semi-persistent downlink resources for the first HARQ transmissions to UEs. In an example, an RRC message may indicate the periodicity of the semi-persistent downlink grant. In an example, a PDCCH DCI may indicate whether the downlink grant is a semi-persistent one e.g. whether it can be implicitly reused in the following TTIs according to the periodicity defined by RRC.

In an example, when required, retransmissions may be explicitly signaled via the PDCCH(s). In the sub-frames where the UE has semi-persistent downlink resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its C-RNTI on the PDCCH(s), the PDCCH allocation may override the semi-persistent allocation for that TTI and the UE may not decode the semi-persistent resources.

When CA is configured, semi-persistent downlink resources may be configured for the PCell and/or SCell(s). In an example, PDCCH dynamic allocations for the PCell and/or SCell(s) may override the semi-persistent allocation.

In the uplink, a base station may dynamically allocate resources (PRBs and MCS) to UEs at a TTI via the C-RNTI on PDCCH(s). A UE may monitor the PDCCH(s) in order to find possible allocation for uplink transmission when its downlink reception is enabled (activity governed by DRX when configured). When CA is configured, the same C-RNTI applies to serving cells. In addition, a base station may allocate a semi-persistent uplink resource for the first HARQ transmissions and potentially retransmissions to UEs. In an example, an RRC may define the periodicity of the semi-persistent uplink grant. PDCCH may indicate whether the uplink grant is a semi-persistent one e.g. whether it can be implicitly reused in the following TTIs according to the periodicity defined by RRC.

In an example, in the sub-frames where the UE has semi-persistent uplink resource, if the UE cannot find its C-RNTI on the PDCCH(s), an uplink transmission according to the semi-persistent allocation that the UE has been assigned in the TTI may be made. The network may perform decoding of the pre-defined PRBs according to the pre-defined MCS. Otherwise, in the sub-frames where the UE has semi-persistent uplink resource, if the UE finds its C-RNTI on the PDCCH(s), the PDCCH allocation may override the persistent allocation for that TTI and the UE's transmission follows the PDCCH allocation, not the semi-persistent allocation. Retransmissions may be either implicitly allocated in which case the UE uses the semi-persistent uplink allocation, or explicitly allocated via PDCCH(s) in which case the UE does not follow the semi-persistent allocation.

Vehicular communication services, represented by V2X services, may comprise of the following different types: V2V, V2I, V2N and/or V2P. V2X services may be provided by PC5 interface (sidelink) and/or Uu interface (UE to base station interface). Support of V2X services via PC5 interface may be provided by V2X sidelink communication, which is a mode of communication whereby UEs may communicate with each other directly over the PC5 interface. This communication mode may be supported when the UE is served by E-UTRAN and when the UE is outside of E-UTRA coverage. The UEs authorized to be used for V2X services may perform V2X sidelink communication.

The user plane protocol stack and functions for sidelink communication may be used for V2X sidelink communication. In order to assist the eNB to provide sidelink resources, the UE in RRC_CONNECTED may report geographical location information to the eNB. The eNB may configure the UE to report the complete UE geographical location information based on periodic reporting via the existing measurement report signaling.

In an example, for V2X communication, k SPS (e.g. k=8 or 16, etc.) configurations with different parameters may be configured by eNB and SPS configurations may be active at the same time. The activation/deactivation of an SPS configuration may signaled via a PDCCH DCI and/or an RRC message by eNB. The logical channel prioritization for Uu may be used.

For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

In an example, for unicast transmission of V2X messages, the V2X message may be delivered via Non-GBR bearers as well as GBR bearers. In order to meet the QoS requirement for V2X message delivery for V2X services, a Non-GBR QCI value and a GBR QCI value for V2X messages may be used. For broadcasting V2X messages, SC-PTM or MBSFN transmission may be used. In order to reduce SC-PTM/MBSFN latency, shorter (SC-) MCCH repetition period for SC-PTM/MBSFN, modification period for SC-PTM/MBSFN and MCH scheduling period for MBSFN may be supported. Reception of downlink broadcast of V2X messages in different carriers/PLMNs may be supported by having multiple receiver chains in the UE.

In an example embodiment, various DCI formats may be used for SPS scheduling. For example, the DCI format 0 may be used for uplink SPS. In an example, the fields for DCI format 0 may comprise one or more of the following fields: Carrier indicator e.g. 0 or 3 bits. Flag for format0/format1A differentiation e.g. 1 bit, where value 0 may indicate format 0 and value 1 may indicate format 1A. Frequency hopping flag, e.g. 1 bit. This field may be used as the MSB of the corresponding resource allocation field for resource allocation type 1. Resource block assignment and hopping resource allocation, e.g. $\lceil \log_2(N_{RB}^{UL}(N_{RB}^{UL}+1))/$ 2)] bits where $N_{RB}^{UL}$ may be the uplink bandwidth configuration in number of resource blocks. Modulation and coding scheme and redundancy version e.g. 5 bits. New data indicator e.g. 1 bit. TPC command for scheduled PUSCH e.g. 2 bits. Cyclic shift for DM RS and OCC index e.g. 3 bits. UL index e.g. 2 bits (this field may be present for TDD operation with uplink-downlink configuration 0). Downlink Assignment Index (DAI) e.g. 2 bits (this field may be present for cases with TDD primary cell and either TDD operation with uplink-downlink configurations 1-6 or FDD operation). CSI request e.g. 1, 2 or 3 bits. The 2-bit field may apply to UEs configured with no more than five DL cells and to UEs that are configured with more than one DL cell and when the corresponding DCI format is mapped onto the UE specific search space given by the C-RNTI, UEs that are configured by higher layers with more than one CSI process and when the corresponding DCI format is mapped onto the UE specific search space given by the C-RNTI, UEs that are configured with two CSI measurement sets by higher layers with the parameter csi-MeasSubframeSet, and when the corresponding DCI format is mapped onto the UE specific search space given by the C-RNTI; the 3-bit field may apply to the UEs that are configured with more than five DL cells and when the corresponding DCI format is mapped onto the UE specific search space given by the C-RNTI; otherwise the 1-bit field may apply. SRS request e.g. 0 or 1 bit. This field may be present in DCI formats scheduling PUSCH which are mapped onto the UE specific search space given by the C-RNTI. Resource allocation type e.g. 1 bit. This field may be present if $N_{RB}^{UL} \le N_{RB}^{DL}$ where $N_{RB}^{UL}$ may be the uplink bandwidth configuration in number of resource blocks and $N_{RB}^{DL}$ may be the downlink bandwidth configuration in number of resource blocks. In example, one or more fields may be added to a DCI for SPS to enhance SPS scheduling process. In example, one or more of the fields may be replaced with new fields, or new values, or may be interpreted differently for SPS to enhance SPS scheduling process.

A base station may transmit one or more RRC messages to a wireless device to configure SPS. The one or more RRC messages may comprise SPS configuration parameters. Example SPS configuration parameters are presented below. In example, one or more parameters may be added to an RRC message for SPS to enhance SPS scheduling process. In example, one or more some of the parameters for an SPS in an RRC message may be replaced with new parameters, or new values, or may be interpreted differently for SPS to enhance SPS scheduling process. In an example, IE SPS-Config may be used by RRC to specify the semi-persistent scheduling configuration. In an example, the IE SPS-Config may be SEQUENCE {semiPersistSchedC-RNTI: C-RNTI; sps-ConfigDL: SPS-ConfigDL; sps-ConfigUL: SPS-ConfigUL}. SPS-ConfigDL IE may comprise semiPersistSchedIntervalDL, numberOfConfSPS-Processes, n1PUCCH-AN-PersistentList, twoAntennaPortActivated, n1PUCCH-AN-PersistentListP1, and/or other parameters. In an example, SPS-ConfigUL IE may comprise semiPersistSchedIntervalUL, implicitReleaseAfter, p0-NominalPUSCH-Persistent, p0-UE-PUSCH-Persistent, twoIntervalsConfig, p0-PersistentSubframeSet2, p0-NominalPUSCH-PersistentSubframeSet2, p0-UE-PUSCH- and/or PersistentSubframeSet2, and/or other parameters.

In an example, one or more RRC configuration parameters may comprise one or more of the following parameters to configure SPS for a wireless device. In an example, SPS configuration may include MCS employed for packet transmission of an MCS grant. In an example, implicitReleaseAfter IE may be the number of empty transmissions before implicit release, e.g. value e2 may corresponds to 2 transmissions, e3 may correspond to 3 transmissions and so on. In an example, n1PUCCH-AN-PersistentList IE, n1PUCCH-AN-PersistentListP1 IE may be the List of parameter: $n_{PUCCH}^{(1,p)}$ for antenna port P0 and for antenna port P1 respectively. Field n1-PUCCH-AN-PersistentListP1 IE may be applicable if the twoAntennaPortActivated-PUCCH-Format1a1b in PUCCH-ConfigDedicated-v1020 is set to true. Otherwise the field may not be configured.

In an example, numberOfConfSPS-Processes IE may be the number of configured HARQ processes for Semi-Persistent Scheduling. In an example, p0-NominalPUSCH-Persistent IE may be the parameter: $P_{O\_NOMINAL\_PUSCH}^{(0)}$ used in PUSCH power control with unit in dBm and step 1. This field may be applicable for persistent scheduling. If choice setup is used and p0-Persistent is absent, the value of p0-NominalPUSCH for p0-NominalPUSCH-Persistent may be applied. If uplink power control subframe sets are configured by tpc-SubframeSet, this field may apply for uplink power control subframe set 1.

In an example, p0-NominalPUSCH-PersistentSubframeSet2 IE may be the parameter: $P_{O\_NOMENAL\_PUSCH}^{(0)}$ used in PUSCH power control with unit in dBm and step 1. This field may be applicable for persistent scheduling. If p0-PersistentSubframeSet2-r12 is not configured, the value of p0-NominalPUSCH-SubframeSet2-r12 may be applied for p0-NominalPUSCH-PersistentSubframeSet2. E-UTRAN may configure this field if uplink power control subframe sets are configured by tpc-SubframeSet, in which case this field may apply for uplink power control subframe set 2. In an example, p0-UE-PUSCH-Persistent IE may be the parameter: $P_{O\_UE\_PUSCH}^{(0)}$ used in PUSCH power control with unit in dB. This field may be applicable for persistent scheduling. If choice setup is used and p0-Persistent is absent, the value of p0-UE-PUSCH may be applied for p0-UE-PUSCH-Persistent. If uplink power control subframe sets are configured by tpc-SubframeSet, this field may be applied for uplink power control subframe set 1. In an example, p0-UE-PUSCH-PersistentSubframeSet2 IE may be the parameter: $P_{O\_UE\_PUSCH}^{(0)}$ used in PUSCH power control with unit in dB. This field may be applicable for persistent scheduling. If p0-PersistentSubframeSet2-r12 is not configured, the value of p0-UE-PUSCH-SubframeSet2 may be applied for p0-UE-PUSCH-PersistentSubframeSet2. E-UTRAN may configure this field if uplink power control subframe sets are configured by tpc-SubframeSet, in which case this field may apply for uplink power control subframe set 2.

In an example, semiPersistSchedC-RNTI IE may be Semi-Persistent Scheduling C-RNTI. In an example, semiPersistSchedIntervalDL IE may be Semi-persistent scheduling interval in downlink. Its value may be in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, semiPersistSchedIntervalUL IE may be semi-persistent scheduling interval in uplink. Its value in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, twoIntervalsConfig IE may be trigger of two-intervals-Semi-Persistent Scheduling in uplink. If this field is present, two-intervals-SPS is enabled for uplink. Otherwise, two-intervals-SPS is disabled.

In an example, multiple downlink or uplink SPS may be configured for a cell. In an example, multiple SPS RNTIs may be configured when a plurality of SPSs is configured. A base station may transmit to a UE at least one RRC message comprising SPS configuration parameters comprising a first SPS RNTI and a second SPS RNTI. For example, a first SPS RNTI may be configured for a first SPS configuration (e.g. for VOIP), and a second SPS RNTI may be configured for a second SPS configuration (e.g. for V2X communications). The UE may monitor PDCCH for at least DCIs corresponding to the first SPS RNTI and the second SPS RNTI.

When Semi-Persistent Scheduling is enabled by RRC, at least one or more of the following information may be provided: Semi-Persistent Scheduling C-RNTI(s); Uplink Semi-Persistent Scheduling interval semiPersistSchedIntervalUL, number of empty transmissions before implicit release implicitReleaseAfter, if Semi-Persistent Scheduling is enabled for the uplink; Whether twoIntervalsConfig is enabled or disabled for uplink, for TDD; Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink; and/or other parameters.

When Semi-Persistent Scheduling for uplink or downlink is disabled by RRC, the corresponding configured grant or configured assignment may be discarded.

In an example, after a Semi-Persistent downlink assignment is configured, the MAC entity may consider sequentially that the Nth assignment occurs in the subframe for which: (10*SFN+subframe)=[(10*SFNstart time+subframestart time)+N*semiPersistSchedIntervalDL] modulo 10240. Where SFNstart time and subframestart time may be the SFN and subframe, respectively, at the time the configured downlink assignment were (re)initialized.

In an example, after a Semi-Persistent Scheduling uplink grant is configured, the MAC entity may: if twoIntervalsConfig is enabled by upper layer: set the Subframe_Offset according to Table below. else: set Subframe_Offset to 0. consider sequentially that the Nth grant occurs in the subframe for which: (10*SFN+subframe)=[(10*SFNstart time+subframestart time)+N*semiPersistSchedIntervalUL+Subframe_Offset*(N modulo 2)] modulo 10240. Where SFNstart time and subframestart time may be the SFN and subframe, respectively, at the time the configured uplink grant were (re-)initialised. FIG. 11. shows example subframe offset values.

The MAC entity may clear the configured uplink grant immediately after implicitReleaseAfter number of consecutive MAC PDUs containing zero MAC SDUs have been provided by the Multiplexing and Assembly entity, on the Semi-Persistent Scheduling resource. Retransmissions for Semi-Persistent Scheduling may continue after clearing the configured uplink grant.

In an example embodiment, SPS configurations may be enhanced to support transmission of various V2X traffic and/or voice traffic by a UE. There is a need to support multiple SPS configurations for a UE. For example, a UE supporting V2X may need to support multiple uplink SPS configurations for transmitting various periodic (or semi-periodic) traffic and/or voice traffic in the uplink. Other examples may be provided. For example, CAM messages in V2X may be semi-periodic. In some scenarios, CAM message generation may be dynamic in terms of size, periodicity and timing. Such changes may result in misalignment between SPS timing and CAM timing There may be some regularity in size and periodicity between different triggers. Enhanced SPS mechanisms may be beneficial to transmit V2X traffic, voice traffic, and/or the like. In an example, various SPS periodicity, for example 100 ms and is may be configured.

In an example, multiple SPS configurations may be configured for UU and/or PC5 interface. An eNB may configure multiple SPS configurations for a given UE. In an example, SPS configuration specific MCS (e.g. MCS as a part of the RRC SPS-configuration) and/or SPS-configuration-specific periodicity may be configured. In an example, some of the SPS configuration parameters may be the same across multiple SPS and some other SPS configuration parameters may be different across SPS configurations. The eNB may dynamically trigger/release the different SPS-configurations employing (E)PDCCH DCIs. In an example, the multiple SPS configurations may be indicated by eNB RRC signaling. The dynamical triggering and releasing may be performed by eNB transmitting (E)PDCCH DCI to the UE employing SPS C-RNTI.

In an example embodiment, a UE may transmit UE SPS assistant information to a base station indicating that the UE does not intend and/or intend to transmit data before a transmission associated to an SPS configuration. The eNB may acknowledge the UE indication. For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

Some example V2X messages are CAM, DENM and BSM. For Example, CAM message may have the following characteristics. Content: status (e.g. time, position, motion state, activated system), attribute (data about dimension, vehicle type and role in the road traffic). Periodicity: typical time difference between consecutive packets generation is bounded to the [0.1, 1] sec range. Length: Variable. For Example, DENM message may have the following characteristics. Content: Contain information related to a variety of events. Periodicity: Event triggers the DENM update. In between two consequent DENM updates, it is repeated with a pre-defined transmission interval. Length: Fixed until DENM update. For Example, BSM message may have the following characteristics. Content: Part I contains some of the basic vehicle state information such as the message ID, vehicle ID, vehicle latitude/longitude, speed and acceleration status. Part II contains two option data frames: VehicleSafetyExtension and VehicleStatus. Periodicity: Periodic, the periodicity may be different considering whether BSM part II is included or not and the different application type. Length: Fixed, with different message size considering whether part II exists or not.

In an example, SPS may be employed for the transmission of BSM, DENMs and CAMs. For example, the UE's speed/position/direction changes within a range. BSM may be periodic traffic with a period of 100 ms. The message size of BSM may be in the range of 132~300 Bytes without certificate and 241~409 Bytes with certificate. DENMs, once triggered, may be transmitted periodically with a given message period which may remain unchanged. The message size of the DENM may be 200~1200 Bytes. If the UE's speed/position/direction does not change or changes within a small range, the CAM generation periodicity may be fixed.

The SPS may be supported for the UL and DL VoIP transmission. In the current SPS specification, the base station may configure SPS periodicity via dedicated RRC signaling. The periodicity of VoIP packet is generally fixed.

The UE may transmit traffic associated with multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets. Once the AS layer of UE receives the V2X packets from upper layer, the UE may trigger V2X packet transmissions on the corresponding SPS grant. Multiple UL SPS configurations may be configured for the UE.

The eNB may configure different SPS C-RNTIs for different SPS processes of the UE. SPS activation and release mechanism may be implemented. Employing at least one or more SPS RNTIs, the eNB may trigger which SPS process is activated or released. In an example implementation, in order to support multiple SPS configurations different SPS C-RNTIs may be configured for different SPS traffic types. For example, a first SPS C-RNTI may be configured for SPS configuration to transmit voice traffic, a second SPS C-RNTI may be configured for SPS configuration to transmit a V2X traffic. An eNB may transmit one or more RRC messages comprising multiple SPS configuration parameters. The multiple SPS configuration parameters may comprise multiple SPS-RNTI parameters for multiple SPS traffic types (e.g. multiple UL SPS configurations).

In the current LTE standard, a maximum of one downlink SPS and/or one uplink SPS may be configured for the PCell. Configuration of multiple SPSs are not supported for the PCell or any other cell. An SPS RNTI is configured for the UE to support one DL SPS configuration and/or one UL SPS configuration. The current SPS-Config IE comprises: semiPersistSchedRNTL RNTI; sps-ConfigDL: SPS-ConfigDL; sps-ConfigUL: SPS-ConfigUL. Example embodiments enhance SPS configuration and processes to enable multiple SPS configuration for downlink, uplink and/or sidelink of a cell.

In an example, CAM message generation may be dynamic in terms of size, periodicity and timing. Such changes may result in misalignment between SPS timing and CAM timing. There may be some regularity in size and periodicity between different triggers. UE assistance may be needed to trigger and/or employ SPS.

Figure 17:
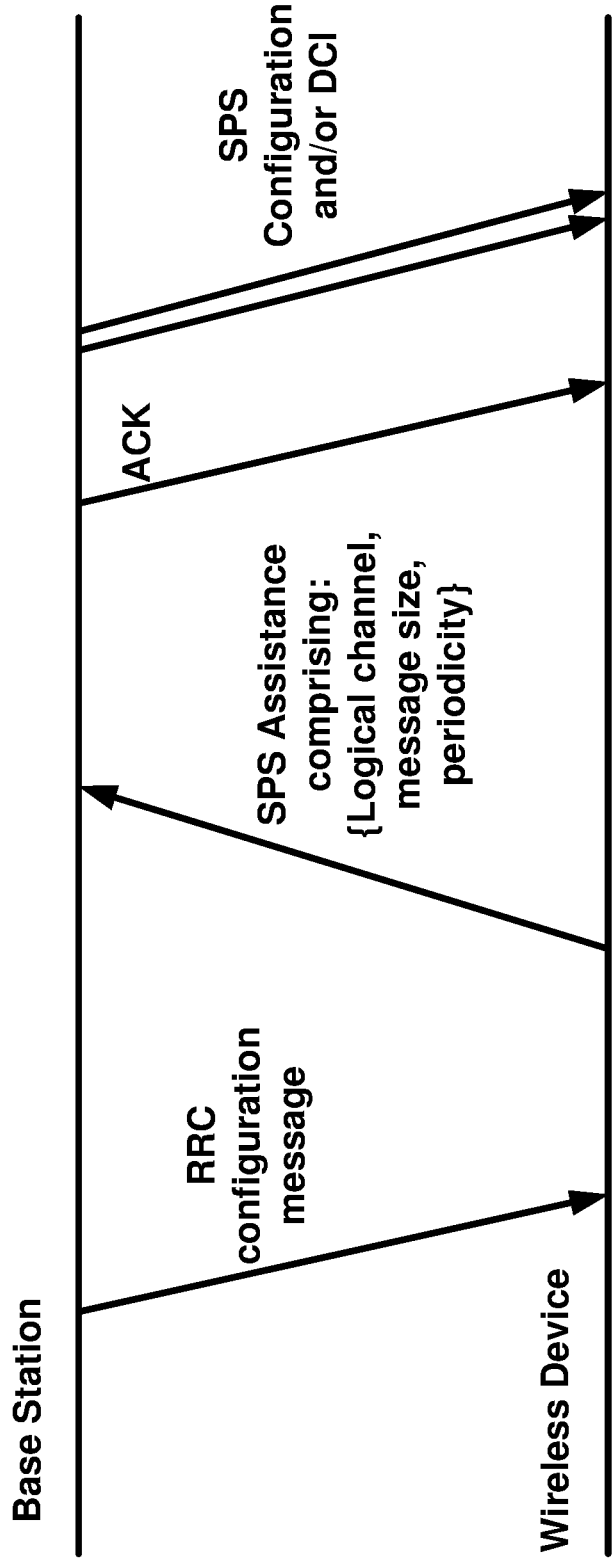
FIG. 17 is an example diagram depicting example signaling flow as per an aspect of an embodiment of the present disclosure.

FIG. 17 shows an example signaling flow for configuring and transmitting UE SPS assistance. In an example embodiment, a base station may transmit one or more RRC messages to configure reporting of UE assistance information. A UE may transmit UE SPS assistance information to a base station indicating that the UE intends to transmit data associated to an SPS configuration. In response, the base station may transmit to the UE an acknowledgement to the UE indication. A UE may provide UE assistance information to a base station for V2X communications. The UE assistance information may include parameters related to SPS traffic and configurations. Triggering of UE assistance information transmission may be left to UE implementation. For instance, the UE may be allowed to report the UE assistance information when change in an estimated periodicity and/or a timing offset of packet arrival occurs.

In an example, a base station may provide one or more SPS configurations for the UE via RRC signaling. SPS configurations may be for transmission of SPS traffic via a downlink, an uplink and/or via a sidelink. When a UE needs to transmit a type of message employing SPS, the UE may report UE SPS assistance information about one or more SPS traffic types to the base station. UE SPS assistance information may indicate at least one of the following SPS assistance parameters for an SPS traffic type. The SPS assistance parameters may indicate at least one of the following: message type, logical channel, traffic/message size, SPS configuration index, traffic type, and/or traffic periodicity. The base station may transmit an SPS transmission grant (e.g. DCI activating an SPS) based on the UE assistance report. The base station may provide an SPS DCI grant for an SPS configuration and SPS radio resources based on the assistance information transmitted by the UE. After receiving the grant, the UE may initialize the corresponding SPS configuration and may transmit the data via the radio resources allocated to the UE. The UE assistance information may enable the base station to determine logical channels and traffic priority and size. The base station may configure/activate the corresponding SPS for the UE. For example, legacy mechanisms do not provide UE SPS assistance information comprising at least one logical channel and other assistance parameters. This improved process enhances SPS transmission efficiency in the uplink.

In an example, multiple SPSs may be activated in parallel. For example, a new service may be triggered while a previous service is on-going. In an example, the UE may transmit an assistance message to the base station indicating new information about new messages (SPS traffic) for transmission. The base station may provide a second SPS transmission grant for transmission of the new service/message(s). The UE may select the second SPS configuration and corresponding resources for transmission of new SPS traffic. In an example, a previous SPS grant and a new SPS grant may continue in parallel.

In an example, a UE may transmit traffic associated with multiple V2X services, which may require different periodicity and packet sizes. The SPS TB size and period may be adapted to different V2X services. Multiple parallel SPS processes may be activated in parallel at the UE. Different SPS processes may differ in the number of allocated resource blocks (RBs) and/or SPS periodicity and may correspond to different types of V2X packets. Once the radio layer of UE receives the V2X packets from a V2X application, the UE may trigger V2X packet transmissions on the corresponding SPS grant. Multiple UL SPS configurations may be configured for a UE.

When configuration of multiple SPSs are required, legacy mechanisms may be extended to support multiple SPSs. The base station may configure different SPS RNTIs for different SPS processes of the UE. SPS activation and release mechanism may be implemented. The base station may trigger which SPS process is activated or released employing at least one or more SPS RNTIs. In an example implementation, in order to support multiple SPS configurations different SPS RNTIs may be configured for different SPS configurations. For example, a first SPS RNTI may be configured for SPS configuration to transmit a first V2X traffic, a second SPS RNTI may be configured for SPS configuration to transmit a second V2X traffic. A base station may transmit one or more RRC messages comprising multiple SPS configuration parameters. The multiple SPS configuration parameters may comprise multiple SPS-RNTI parameters for multiple SPS configurations (e.g. multiple UL SPS configurations). Some of the example embodiments may implement multiple SPS RNTIs, and some may implement a single SPS RNTI.

A UE configured with multiple SPS RNTIs may need to monitor search space of PDCCH for multiple SPS RNTIs. When the number of required SPS configurations increases, this mechanism may increase UE processing requirements and/or power consumption. Extension of legacy mechanisms, for implementation of multiple SPS configurations, increases UE processing requirements and battery power consumption. In an example, a UE may be configured with many SPS configurations (e.g. 4, or 8, etc) for different types of V2X traffic. There is a need to improve SPS configuration and activation/release mechanisms in a base station and wireless device when multiple SPSs are configured. Example embodiments may increase signaling overhead, however the potential benefits outweigh the increased overhead when V2X communication is enabled. Example embodiments improve base station and UE implementations, enhance network performance, reduce UE monitoring requirements, and reduce battery power consumption, when multiple SPSs are configured for a given UE for transmission of SPS traffic via an uplink (UL) or a sidelink (SL).

Figure 13:
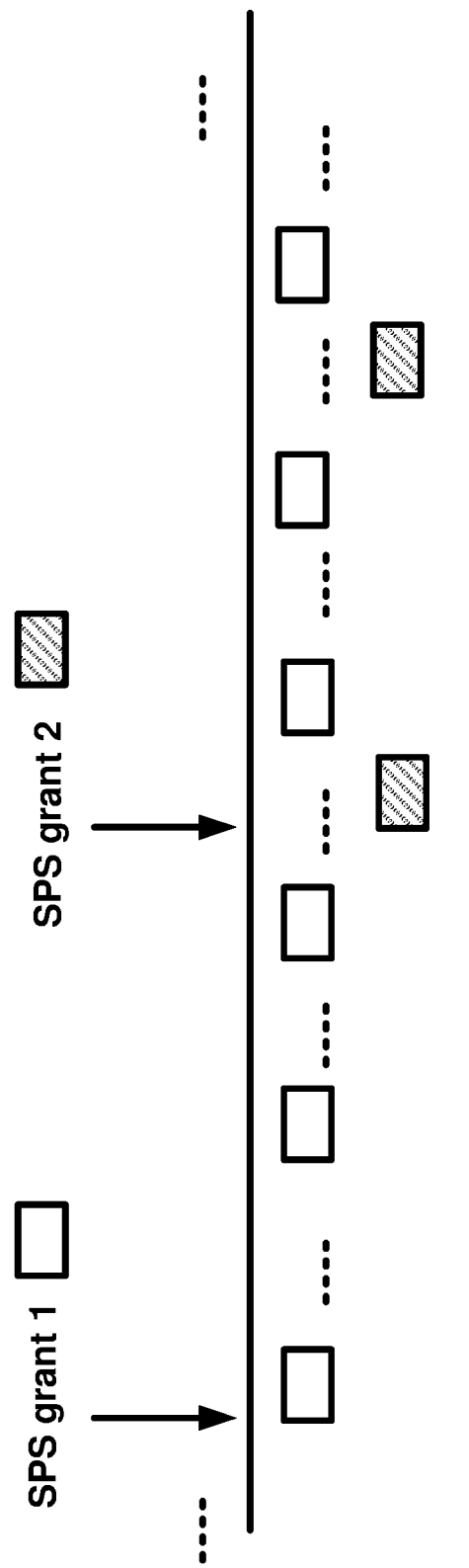
FIG. 13 is an example diagram depicting example multiple parallel SPSs as per an aspect of an embodiment of the present disclosure.

In an example, multiple SPSs may be activated in parallel. For example, a new SPS may be triggered while a previous SPS is on-going. In an example, the UE may transmit to a base station a message comprising assistant information indicating that the UE requires new SPS resources for transmission of new messages. The assistant information may comprise information about at least one SPS traffic type, e.g. logical channel, periodicity, message size, and/or the like. The base station may provide an SPS grant for the new service/message(s). The UE may employ an SPS configuration and a corresponding SPS resources for uplink transmission of a corresponding traffic. In an example, a previous SPS grant and a new SPS grant may be employed in parallel. FIG. 13 shows an example when multiple SPS grants are activated in parallel. A base station may transmit SPS grant 1 in a first subframe for transmission of a first SPS traffic. The base station may transmit SPS grant 2 in a second subframe for transmission of a second SPS traffic. The first SPS grant and the second SPS grant may have different parameters, for example, may comprise different RBs assignments, may have different periodicity, may have different DCI and RRC configuration parameter(s), and/or the like.

In an example, multiple downlink, uplink, and/or sidelink SPSs may be configured for a cell. In an example, one or more SPS RNTIs may be configured when a plurality of SPSs are configured. In an example, an RRC message may comprise an index identifying an SPS configuration of a cell. In an example, the DCI employing SPS RNTI and triggering an SPS may include the index of the SPS that is triggered (initialized, activated) or released (deactivated). For example, the DCI activating or releasing an uplink SPS corresponding to a V2X SPS traffic may comprise an UL SPS configuration index field (e.g. 3 bits) identifying the SPS configuration corresponding the SPS configuration index. SPS configuration index may indicate the index of one of one or more SL/UL SPS configurations. Using this enhanced mechanism multiple SPSs may be configured using the same SPS RNTI (e.g. for V2X traffic). This may reduce UE battery power consumption and provide flexibility in configuring multiple SPSs.

Figure 14:
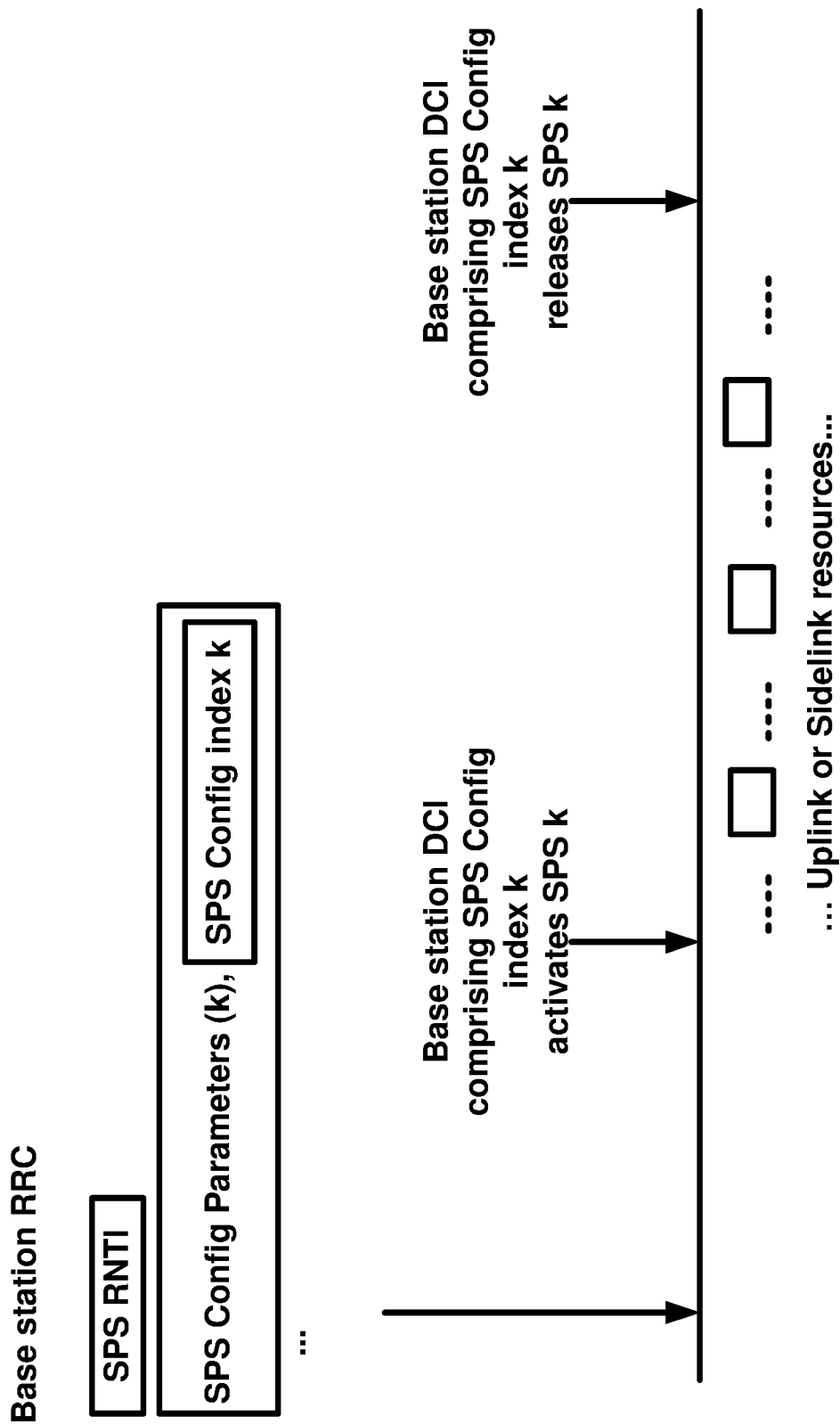
FIG. 14 is an example diagram depicting example RRC configuration and example DCIs as per an aspect of an embodiment of the present disclosure.

In an example embodiment, when one or more SPS grant configurations are configured for a UE, for example, when one or more SPS-ConfigUL and/or SPS-ConfigSL are configured on a cell or when one or more SPS grant configurations are configured within an SPS-ConfigUL and/or SPS-ConfigSL, RRC configuration parameters may comprise an SPS configuration index. One or more uplink SPS configuration parameters may be assigned to (associated with) the same SPS RNTI. Different SPS configurations (e.g. having different SPS periodicity) may be assigned to the same SPS RNTI, and may be identified by different SPS configuration indexes. In an example embodiment, one or more SPS configurations (e.g. multiple periodicity, MCS, and/or other parameters) may be triggered employing the same SPS RNTI, and using different SPS configuration indexes. FIG. 14 shows an example RRC configuration and example DCIs activating and releasing an SPS for an uplink or a sidelink. A similar mechanism may be applied to the downlink.

The example mechanism may be applied to downlink, uplink and/or sidelink SPS configurations. For example, when one or more SPS grant configurations are configured for transmission of various V2X traffic via sidelink by a UE, for example, when one or more SPS configurations are configured for a sidelink of a cell, RRC configuration parameters may comprise an SPS RNTI for the sidelink, and one or more SPS configuration indexes (each associated with a sidelink SPS RRC configuration). One or more uplink SPS configuration parameters may be assigned to (associated with) the same sidelink SPS RNTI for sidelink SPS activation and release. Different SPS configurations (e.g. having different periodicity) may be assigned to the same sidelink SPS RNTI, and may be identified by different SPS configuration indexes. In an example embodiment, one or more sidelink SPS configurations (e.g. multiple periodicity, MCS, and/or other parameters) may be triggered employing the same sidelink SPS RNTI for transmission of SPS V2X traffic via a sidelink.

In an example, SPS-ConfigUL1 may be assigned SPS RNTI and SPS-ConfigIndex1, and SPS-ConfigUL2 may be assigned SPS RNTI and SPS-ConfigIndex2. A base station may transmit one or more RRC messages comprising configuration parameters of one or more cells (e.g. PCell and/or SCell(s)). The configuration parameters may comprise configuration parameters for one or more SPSs. The configuration parameters may comprise the SPS RNTI, SPS-ConfigIndex1 and SPS-ConfigIndex2.

In an example, SPS-ConfigUL IE may comprise an SPS RNTI and an SPS-ConfigIndex1 and an SPS-ConfigIndex2. One or more first SPS configuration parameters may be associated with SPS-ConfigIndex1 and one or more second SPS configuration parameters may be associated with SPS-ConfigIndex2. Example of SPS configuration parameters may be periodicity, HARQ parameter(s), MCS, grant size, and/or any other SPS configuration parameter presented in RRC SPS configuration. A base station may transmit one or more RRC messages comprising configuration parameters of one or more cells (e.g. PCell and/or SCell(s)). The configuration parameters may include configuration parameters for one or more SPSs. The configuration parameters may comprise the SPS RNTI, SPS-ConfigIndex1 and SPS-ConfigIndex2.

The UE configured with SPS configurations may monitor PDCCH and search for a DCI associated with the SPS RNTI (e.g. scrambled with SPS-RNTI). The base station may transmit a DCI associated to SPS RNTI to the UE to activate or release an SPS grant. The UE may decode a DCI associated with the SPS RNTI. The DCI may comprise one or more fields comprising information about the grant. The DCI may further comprise an SPS configuration index. The SPS configuration index may determine which one of the SPS configurations are activated or released.

Some of example fields in the DCI grants for an SPS in a legacy system is employed. Many of fields are marked by N/A. In an example embodiment, one of the existing fields (e.g. one of the N/A fields), or a new field may be introduced in a DCI for indicating the SPS configuration index. An SPS configuration index field in the DCI may identify which one of the SPS configurations is activated or released. The UE may transmit or receive data according the grant and SPS configuration parameters.

In an example embodiment, a wireless device may receive at least one message comprising: a semi-persistent scheduling (SPS) cell radio network temporary identifier (RNTI); a first SPS configuration parameter(s); a second SPS configuration parameter(s); a first SPS configuration index value associated with the first SPS configuration parameters; and a second SPS configuration index value associated with the second SPS configuration parameters. The wireless device may receive a downlink control information (DCI) associated with the SPS RNTI. The DCI comprises one or more fields of an SPS grant and an SPS configuration index value. The wireless device may transmit/receive SPS traffic on radio resources identified in the SPS grant considering the SPS configuration parameters associated with the SPS configuration index value. The SPS configuration parameter associated with the SPS configuration index may include, for example, SPS periodicity, MCS, radio resource parameters, and/or other SPS parameters included in SPS configurations.

Figure 15:
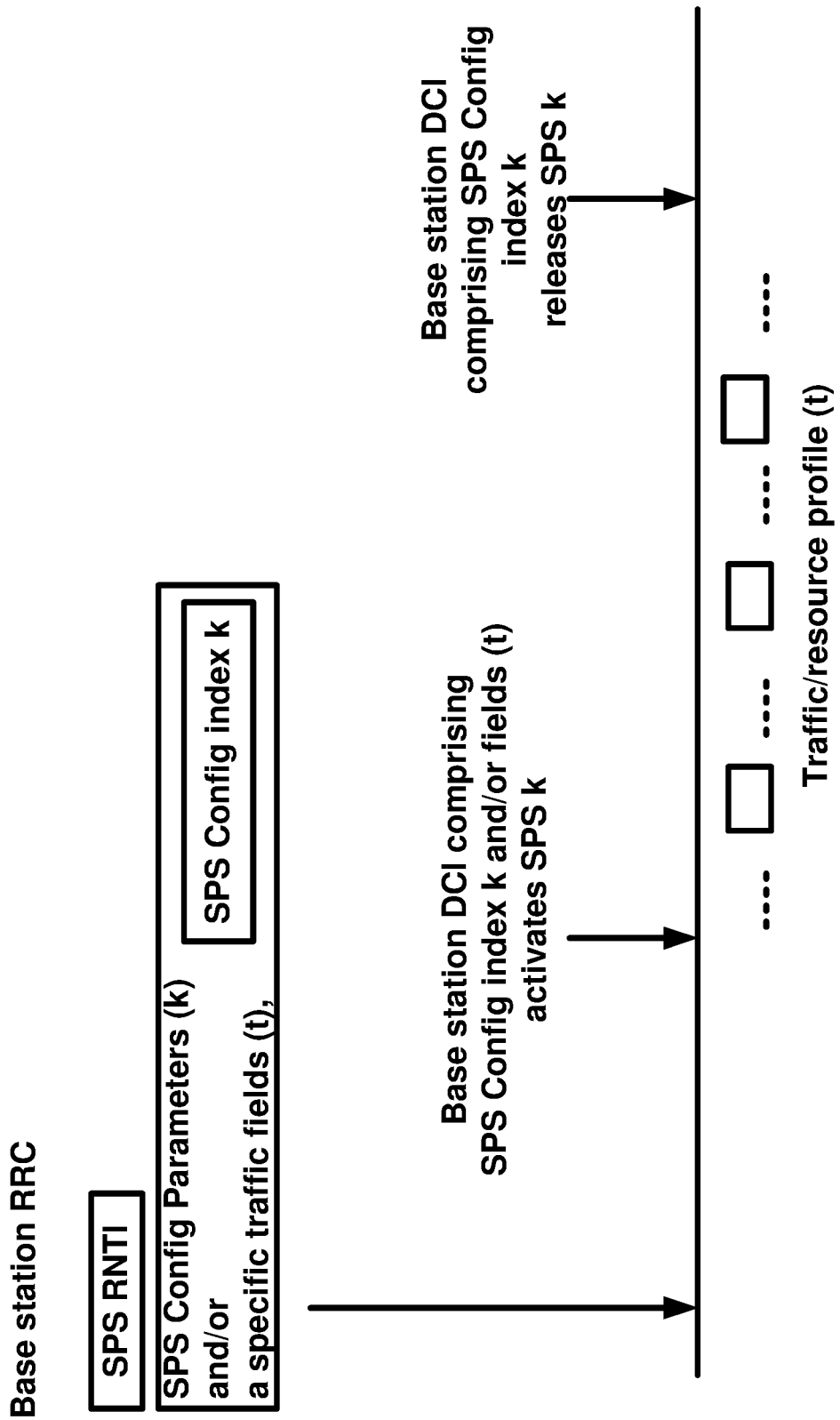
FIG. 15 is an example diagram depicting example RRC configuration and example DCIs as per an aspect of an embodiment of the present disclosure.

In an example embodiment, an SPS grant may be for a specific message type. In current mechanisms, SPS configuration parameters and/or an SPS DCI grant do(es) not comprise information on traffic types associated with the grant. In an example embodiment, a wireless device may receive at least one message comprising: a semi-persistent scheduling (SPS) cell radio network temporary identifier (RNTI); and a sequence of one or more SPS configuration IEs. An SPS configuration IE may comprise SPS configuration parameters, SPS configuration index, and/or one or more fields indicating a traffic/resource profile (e.g. traffic index value) associated with the SPS configuration parameters. The index for the traffic type may be a logical channel identifier, bearer identifier, V2X traffic type identifier, a service type, a radio resource type and/or the like. The one or more fields may also determine a relative priority of the traffic type compared with other traffics. The wireless device may receive a downlink control information (DCI) associated with the SPS RNTI. The DCI may comprise at least one of SPS Config index and/or traffic/resource profile fields. Example embodiments may increase signaling overhead, however the potential benefits outweigh the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 15 shows an example SPS configuration and example activation/release DCIs for transmission of various traffic types. When RRC SPS configuration parameters and/or one or more DCI fields indicate traffic/resource profile, the UE may transmit uplink data including the corresponding traffic type in the corresponding SPS grant.

In an example, SPS configurations may include a sequence of various configuration parameters. In an example embodiment, a wireless device may receive at least one message comprising: a semi-persistent scheduling (SPS) cell radio network temporary identifier (RNTI); a sequence of one or more SPS configuration parameters, e.g. periodicities. In an example, each of the one or more SPS configurations parameters (e.g. SPS Config IE comprising a periodicity IE value) may be associated with an SPS configuration index. The wireless device may receive a downlink control information (DCI) associated with the SPS RNTI. The DCI may comprise one or more fields of an SPS grant (e.g. a first SPS configuration index value). The wireless device may activate (transmit/receive) SPS traffic on radio resources identified in the SPS grant considering the SPS configuration parameters (e.g. associated with the first SPS configuration index value). In an example, the DCI may comprise one or more fields comprising traffic/resource profile parameters.

Figure 16:
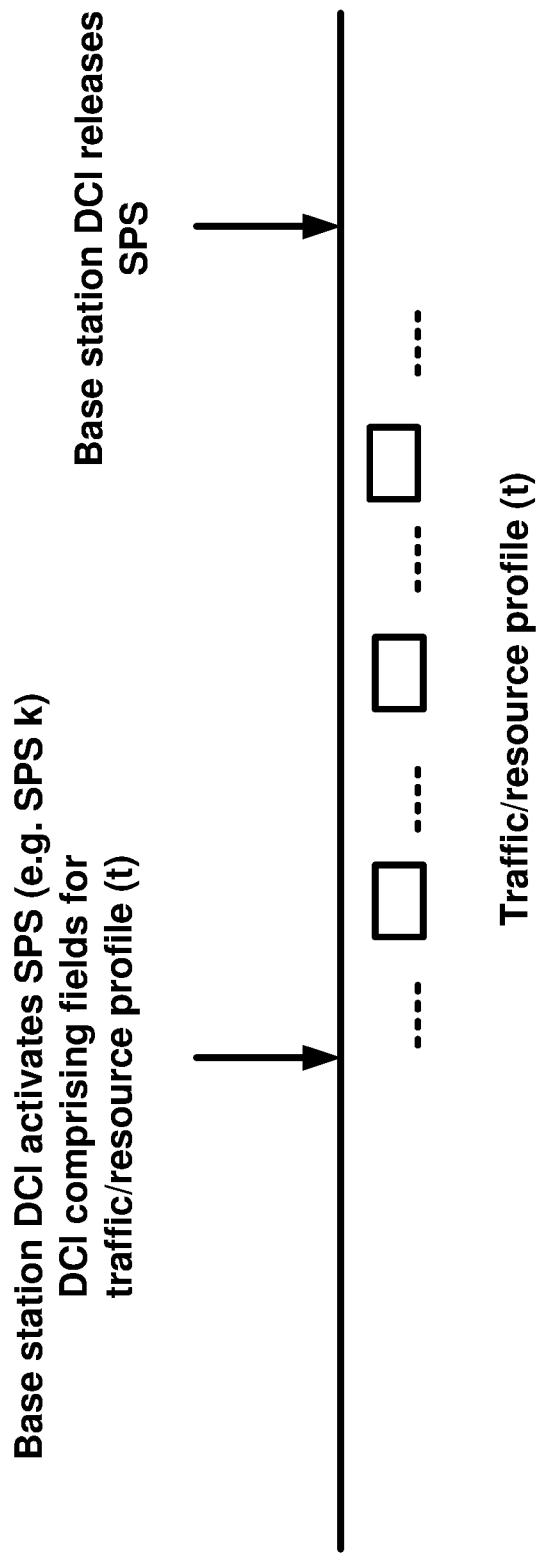
FIG. 16 is an example diagram depicting example DCIs as per an aspect of an embodiment of the present disclosure.

The DCI may comprise one or more fields indicating a traffic/resource profile (e.g. traffic/resource index value) associated with the SPS configuration parameters. The index for the traffic type may be a logical channel identifier, bearer identifier, V2X traffic type identifier, a service type, a radio resource type and/or the like. In an example, the one or more fields may also determine a relative priority of the traffic type compared with other traffics. Example embodiments may increase signaling overhead, however the potential benefits outweigh the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 16 shows an example activation/release DCIs for transmission of various traffic types. When one or more DCI fields indicate traffic/resource profile, the UE may transmit uplink data including the corresponding traffic type in the corresponding SPS grant.

In an example, an RRC IE (e.g., MAC-MainConfig) may comprise a skipUplinkTx IE configured as setup. The skipUplinkTxSPS IE and/or the skipUplinkTxDynamic IE may be configured as true. In an example, if skipUplinkTxDynamic is configured, the UE may skip UL transmissions for an uplink grant other than a configured uplink grant if no data is available for transmission in the UE buffer. In an example, if skipUplinkTxSPS is configured, the UE may skip UL transmissions for a configured uplink grant if no data is available for transmission in the UE buffer. In an example, the base station may configure skipUplinkTxSPS when semiPersistSchedIntervalUL is shorter than sf10. In an example, if skipUplinkTxSPS is configured, the UE may ignore the implicitReleaseAfter field. In an example, if the MAC entity is not configured with skipUplinkTxSPS, the MAC entity may clear the configured uplink grant immediately after implicitReleaseAfter number of consecutive new MAC PDUs each containing zero MAC SDUs have been provided by the Multiplexing and Assembly entity, on the Semi-Persistent Scheduling resource.

In an example, a SPS confirmation MAC CE may be triggered in response to receiving a DCI activating and/or reactivating and/or releasing a SPS. In an example, in response to a SPS confirmation being triggered and not cancelled and the MAC entity having UL resources allocated for new transmission for a TTI, the Multiplexing and Assembly entity of a MAC entity may generate a SPS confirmation MAC CE. The wireless device may cancel the triggered SPS confirmation. In an example, in response to the SPS confirmation being triggered by a SPS release, the MAC entity may clear the configured uplink grant immediately after first transmission of SPS confirmation MAC Control Element triggered by the SPS release. In an example, a SPS confirmation MAC CE may be identified by a MAC PDU subheader with a specified LCID.

In an example, a MAC PDU may consist of a MAC header, zero or more MAC Service Data Units (MAC SDU), zero, or more MAC control elements, and optionally padding. In an example, the MAC header and the MAC SDUs may be of variable sizes. In an example, a MAC PDU header may consist of one or more MAC PDU subheaders. In an example, a subheader may correspond to either a MAC SDU, a MAC control element or padding. In an example, a MAC PDU subheader may comprise five or six header fields R/F2/E/LCID/(F)/L but for the last subheader in the MAC PDU and for fixed sized MAC control elements. In an example, the last subheader in the MAC PDU and subheaders for fixed sized MAC control elements may comprise four header fields R/F2/E/LCID. In an example, a MAC PDU subheader corresponding to padding may consist of the four header fields R/F2/E/LCID. In an example, MAC PDU subheaders may have the same order as the corresponding MAC SDUs, MAC control elements and padding. In an example, MAC control elements may be placed before a MAC SDU.

In an example, the MAC header may be of variable size and may comprise the LCID, L, F, F2, E and R fields.

In an example, LCID may be the Logical Channel ID field and may identify the logical channel instance of the corresponding MAC SDU or the type of the corresponding MAC control element or padding for the DL-SCH, UL-SCH and MCH respectively. In an example, there may be one LCID field for each MAC SDU, MAC control element or padding included in the MAC PDU. In an example, one or two additional LCID fields may be included in the MAC PDU, when single-byte or two-byte padding is required but cannot be achieved by padding at the end of the MAC PDU. In an example, a UE of Category 0 may indicate CCCH using LCID "01011", otherwise the UE may indicate CCCH using LCID "00000". The LCID field size may be 5 bits.

In an example, the L field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field.

In an example, the F (Format) field may indicate the size of the Length field. There may be one F field per MAC PDU subheader except for the last subheader and subheaders corresponding to fixed-sized MAC control elements and except for when F2 is set to 1. The size of the F field may be 1 bit. If the F field is included; if the size of the MAC SDU or variable-sized MAC control element is less than 128 bytes, the value of the F field may be set to 0, otherwise it may be set to 1.

In an example, the F2 (Format2) field may indicate the size of the Length field. There may be one F2 field per MAC PDU subheader. The size of the F2 field may be 1 bit. If the size of the MAC SDU or variable-sized MAC control element is larger than 32767 bytes, and if the corresponding subheader is not the last subheader, the value of the F2 field may be set to 1, otherwise it may be set to 0.

In an example, the E (Extension) field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. In an example, the R field may be a Reserved bit.

In legacy SPS mechanisms, a single SPS may be configured on a cell for a wireless device. When the wireless is configured with UL transmission skipping for the SPS (e.g., with a SkipUplinkTXSPS IE), the UE may transmit a SPS confirmation MAC CE after receiving a DCI indicating activation/reactivation/release/deactivation of the SPS. In an example, more than one SPS configurations with different configuration parameters (e.g., different periodicities, offset, etc.) may be simultaneously active (e.g., for a UE capable of V2X transmission). Current SPS and/or periodic resource allocation mechanisms need to be enhanced to distinguish the SPS in the MAC CE transmitted by a UE in response to receiving an SPS activation/reactivation/release DCI when the UE is configured with ULTXSkipping SPS. The embodiments enhance the SPS and/or periodic resource allocation confirmation mechanisms so that a wireless device indicates to the base station a confirmation/acknowledgement for a specific SPS/periodic resource allocation that is activated or released.

In an example, ULTXSkipping may be configured for a wireless device as true for a grant type. The UE may skip a dynamic grant and/or a configured uplink transmissions (for the corresponding grant type) if no data is available for transmission. The UE may transmit some allowed type of MAC CE when no data is available for a dynamic grant.

In an example, ULTXSkipping may not be configured for a UE for a grant type. The UE may transmit MAC CE and/or padding in resources indicated by a dynamic grant and/or a configured uplink transmissions (e.g., for the corresponding grant type) if no data is available for transmission.

In an example embodiment, an eNB may configure a UE with one or more SPS configurations. In an example, the SPS-Config RRC IE may include the configuration parameters (e.g., SPS interval, etc.) of the one or more SPS configurations. In an example, a SPS configuration may be associated with one or more indicators. In an example, the one or more indicator may be a SPS index and/or SPS-RNTI. In an example, the eNB may signal (e.g., employing a DCI associated with an SPS-RNTI) the one or more SPS indicator (e.g., the SPS index) corresponding to a SPS configuration in a DCI that activates (e.g., initiates) and/or reactivates and/or releases the SPS configuration. The SPS activating/reactivating DCI may configure, for the UE, grants at subframes depending on the period and/or other parameters associated with the SPS configuration corresponding to the SPS indicator signaled to the UE. The SPS release DCI may clear the configured grants corresponding to the SPS configuration that is indicated to the UE (e.g., with a SPS index) in the SPS release DCI. In an example, legacy SPS configuration may not employ an SPS index.

In an example, a UE may be configured with SkipUplinkTXSPS IE. In an example, a UE configured with SkipUplinkTXSPS may skip transmission on a configured grant for which the UE has no data in its buffer for that grant. In an example, a UE configured with SkipUplinkTXSPS may skip transmission on a configured grant for which the UE has no data in its buffer for the one or more LCIDs corresponding to the configured SPS grant (e.g., if the configured grant corresponding to the SPS configuration is associated with an LCID). In an example, a UE configured with SkipUplinkTXSPS, may trigger a SPS confirmation MAC CE after receiving a DCI indicating activation/reactivation or release of a SPS configuration (e.g., a SPS configuration that is configured with SkipUplinkTXSPS).

Current LTE technology does not provide required flexibility in configuring SkipUplinkTXSPS for various configured grants and this may reduce uplink transmission efficiency when multiple SPSs with different requirements are configured. There is a need to enhance the current RRC configuration and MAC/RRC mechanisms to enable configuration of SkipUplinkTXSPS (set as true) for a subset (e.g., one or more) of the configured SPS configurations. Example embodiments increase uplink transmission efficiency and flexibility by enabling SkipUplinkTXSPS for some configured SPS grants, while not configuring SkipUplinkTXSPS for one or more configured SPS grants depending on the traffic and/or grant requirements.

In an example embodiment, the eNB may configure the uplink transmission skipping for the UE for one or more of one or more configured SPS configurations. In an example, the eNB may include a bitmap in an RRC IE (e.g. the SPS-Config IE, or MACmain-Config) that indicates for which of the one or more (e.g., eight) SPS configurations the transmission skipping is configured for and which of the one or more SPS configurations the transmission skipping is not configured. In an example, the leftmost bit in the bitmap may correspond to the SPS configuration with smallest SPS index, the next bit after the leftmost bit in the bitmap may correspond to the SPS configuration with second smallest SPS index and so on. In an example, when C SPS configurations are configured for the UE and C is less than eight (e.g., C=2, 4, etc.), the UE may consider the first C bits in the bitmap to determine whether uplink transmission skipping is configured for the corresponding SPS and ignore the other bits.

In an example, eNB may indicate whether UL transmission skipping applies for a SPS configuration using a field (e.g., one bit) for a SPS configuration in the SPS-Config RRC IE. When a plurality of SPS-configuration are configured, a SPS-configuration (or other parameters e.g. MAC-main-config) may comprise a parameter indicating whether UL transmission skipping is configured for that SPS configuration or not.

In an example, the eNB may indicate whether uplink skipping may be applied for a SPS configuration in the DCI activating/reactivating/releasing the SPS configuration, e.g., using a bit in the DCI. The UE may consider the bit in the DCI to determine whether uplink skipping is configured for the activated SPS.

In an example, if an eNB configures the SkipUplinkTXSPS IE for a UE, the UL transmission skipping may be applied to a predefined one or more SPS configurations (e.g., non-V2X traffic (e.g., VoIP), V2X traffic, and/or the like). For example, SkipUplinkTXSPS IE may be applied to SPS configuration using a first RNTI (e.g. VOIP, or V2X), and may not be applied to another SPS configuration using a second RNTI (e.g. VOIP, or V2X). In an example, SkipUplinkTXSPS IE may not be configurable for certain SPSs (e.g. corresponding to certain RNTI), and may be configurable for some other SPSs. In an example SkipUplinkTXSPS IE may be applied to legacy SPS-configuration, and may not be applied to enhanced SPS configuration.

In an example, eNB may indicate to the UE if uplink transmission skipping is enabled for a traffic type and/or LCID and/or if uplink transmission skipping is not enabled for a traffic type and/or LCID. For example, eNB may configure an SkipUplinkTXSPS IE for a corresponding SPS index, and/or corresponding SPS RNTI. In an example, an IE may comprise a sequence of (SkipUplinkTXSPS IE, and SPS configuration parameter) to configure or not configure SkipUplinkTXSPS IE for a particular SPS. SPS configuration parameter for example may identify the SPS config, e.g. SPS index and/or RNTI. In an example, an IE may comprise a sequence (list) of SkipUplinkTXSPS parameters. A SkipUplinkTXSPS in the sequence may correspond to a specific SPS configuration parameter (e.g. ordered based on SPS index). In an example, the sequence size may be constant (e.g. 8) or may depend on the number of configured SPSs.

In an example, SkipUplinkTXSPS configuration may employ one or more of the above examples. For example, legacy SkipUplinkTXSPS IE in the MAC-mainconfig may be applicable to legacy SPS configuration IE in the RRC SPS-Config IE (e.g. for VOIP traffic). One or more new SkipUplinkTXSPS IEs may be defined for one or more enhanced SPS configurations (e.g. for the V2X traffic) based on an example embodiment (described in above paragraphs) when multiple SPSs are configured.

Example embodiments enhance SPS confirmation mechanism when one or more SPSs are configured.

In an example embodiment, for a given SPS configuration, if SPS confirmation has been triggered and not cancelled and if the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, if the SPS confirmation MAC CE is triggered by a SPS release DCI, the MAC entity may clear the configured uplink grant associated with the released SPS after (e.g. as early as possible) first transmission of the SPS confirmation MAC CE.

In an example embodiment, when a UE is configured with an SPS configuration (legacy SPS configuration), SPS confirmation MAC CE may be identified by an SPS confirmation LCID (e.g. 10101). In an example, the SPS confirmation MAC control element is identified by a MAC PDU subheader with SPS confirmation LCID. The MAC CE may have a fixed size of zero bits.

In an example embodiment, a new LCID may be predefined for a UE to identify a MAC CE for SPS configuration supporting multiple SPS configuration. The new LCID may be employed when SPS confirmation is transmitted for a particular SPS configuration. For example, when an RRC message configures an enhanced SPS configuration (e.g. multiple SPS configurations) an enhanced SPS confirmation LCID may be used to identify an enhanced SPS confirmation MAC CE. When a UE is configured with a predefined SPS configuration, MAC CE may have a fixed size of zero bits that may be identified by a first LCID. The predefined configuration for example, may be configuration of one SPS configuration (e.g. legacy SPS), or one SPS-RNTI, or configuration of legacy SPS-config, and/or configuration of SPS for VOIP, and/or when SPS indexes are not configured. When the UE is configured with an enhanced RRC SPS configuration, the UE may transmit an enhance MAC CE for an enhanced SPS confirmation that may be identified by a second LCID (different from the first LCID). In an example, the legacy SPS confirmation MAC CE may be employed for confirming activation/release of the legacy SPS configuration (legacy SPS-config IE e.g. using a first RNTI). And the enhanced SPS confirmation MAC CE may be employed for confirming activation/release of the enhanced SPS configuration (enhanced SPS-config IE e.g. using a second RNTI). This mechanism may increase the number of LCIDs required for SPS confirmation.

An enhanced SPS confirmation MAC CE may be equally have other names, e.g., extended SPS confirmation, multiple SPS confirmation, long SPS confirmation, and/or the like.

Figure 18:
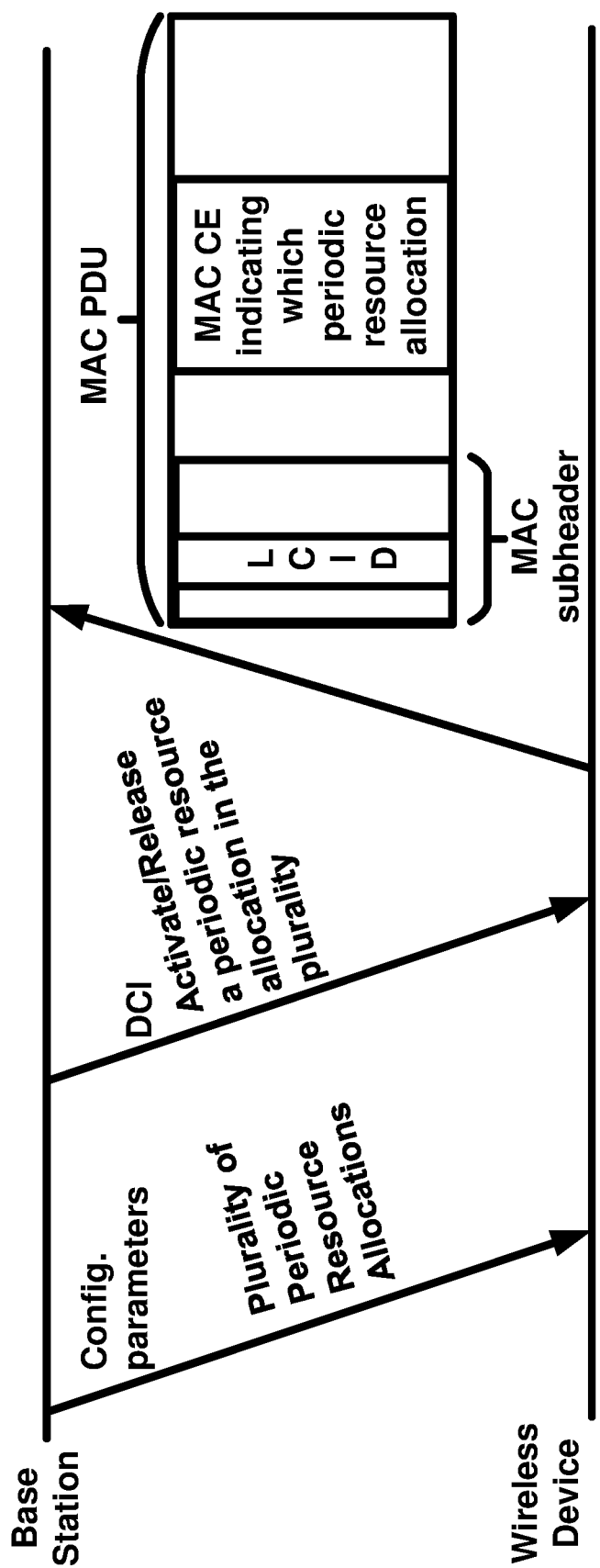
FIG. 18 is an example periodic resource allocation confirmation procedure as per an aspect of an embodiment of the present disclosure.

In an example embodiment, the legacy SPS confirmation LCID may be employed along with the RRC configuration for SPS to determine whether a UE transmits the legacy MAC SPS confirmation or the enhanced MAC SPS confirmation. An example embodiment may reduce the number of required LCIDs for SPS confirmation (one LCID is used for identifying both legacy and enhanced SPS MAC CEs). When a UE is configured with a predefined SPS configuration, MAC CE may have a fixed size of zero bits. The predefined configuration for example, may be configuration of one SPS configuration (e.g. legacy SPS), or one SPS-RNTI, or configuration of legacy SPS-config, and/or configuration of SPS for VOIP, and/or when SPS indexes are not configured. When the UE is configured with an enhanced RRC SPS configuration, the UE may transmit an enhance MAC CE for an enhanced SPS confirmation. Both MAC CEs may be identified by the same LCID. In an example, the legacy SPS confirmation MAC CE may be employed for confirming activation/release of the legacy SPS configuration (legacy SPS-config IE e.g. using a first RNTI). And the enhanced MAC CE SPS confirmation may be employed for confirming activation/release of the enhanced SPS configuration (enhanced SPS-config IE e.g. using a second RNTI). An example enhanced periodic resource allocation MAC CE and procedure for periodic resource allocation confirmation is shown in FIG. 18.

In an example, an enhanced SPS confirmation MAC CE may have a fixed size of one octet. In an example the L (e.g., L=3) leftmost bits in the SPS confirmation MAC CE may indicate the SPS index of the SPS configuration for which the SPS confirmation MAC CE corresponds to.

In an example embodiment, an enhanced SPS confirmation MAC CE may have a fixed size of one octet. In an example, the MAC CE may comprise a bitmap (e.g. of 8 bits). A bit in the bitmap may correspond to an SPS configuration. In an example, bit i (Ci) may correspond to an SPS identified by index i. The UE may transmit the MAC CE. SPS confirmation for an SPS activation/release may be indicated by a predefined value of Ci (e.g. Ci=1). In an example, the UE/eNB may set the Ci for one or more SPS that do not require SPS confirmation or are not configured as zero. In an example, the UE/eNB may ignore the value of the Ci for one or more SPS that do not require SPS confirmation or are not configured.

In an example embodiment, after a UE receives a SPS activation/reactivation/release DCI from the eNB, with the SPS configuration indicated in the DCI, if the UE is configured with SkipUplinkTXSPS (e.g., if SkipUplinkTXSPS is configured for the SPS index indicated in the DCI or if SkipUplinkTXSPS is configured for the configured SPS configurations), the UE may trigger the SPS confirmation. If the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, the MAC entity may clear the configured uplink grants associated with a SPS configuration after (e.g., as early as possible) first transmission of the SPS confirmation MAC CE triggered by the receiving a release DCI for the SPS configuration.

In an example embodiment, for a given SPS configuration, if SPS confirmation has been triggered and not cancelled and if the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, if the SPS confirmation MAC CE is triggered by a SPS release DCI, the MAC entity may clear the configured uplink grant associated with the released SPS after (e.g. as early as possible) first transmission of the SPS confirmation MAC CE.

In an example embodiment, the SPS confirmation MAC CE may be identified by a MAC PDU subheader with a LCID that corresponds to the SPS configuration for which the SPS confirmation MAC CE corresponds to. In an example, with eight different SPS configurations, the LCIDs 01110, 01111, 10000, 10001, 10010, 10011, 10100 and 10101 may be used to identify the SPS configurations. This solution may require many LCIDs.

In an example embodiment, when a UE is configured with an SPS configuration (legacy SPS configuration), SPS configuration MAC CE may be identified by an SPS confirmation LCID (e.g. 10101). In an example, the SPS confirmation MAC control element is identified by a MAC PDU subheader with SPS confirmation LCID. The MAC CE may have a fixed size of zero bits.

In an example embodiment, two LCIDs may be employed for SPS confirmation. A first LCID may be employed for legacy SPS configuration with a MAC CE of zero bits. A second LCID may be employed for SPS confirmation of enhanced SPS configuration with MAC CE of zero bits. In an example, the legacy SPS configuration may be for VOIP traffic, and the enhanced SPS configuration may be for V2X traffic. One or more example embodiments may be used for SPS confirmation of the enhanced SPS configuration when the second LCID is employed.

In an example, after a UE receives a SPS activation/reactivation/release DCI from the eNB, with the SPS configuration indicated in the DCI, if the UE is configured with SkipUplinkTXSPS (e.g., if SkipUplinkTXSPS is configured for the SPS index indicated in the DCI or if SkipUplinkTXSPS is configured for the configured SPS configurations), the UE may trigger the SPS confirmation. If the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, the MAC entity may clear the configured uplink grants associated with a SPS configuration after (e.g., as early as possible) first transmission of the SPS confirmation MAC CE triggered by the receiving a release DCI for the SPS configuration.

In an example, for a given SPS configuration, if SPS confirmation has been triggered and not cancelled and if the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, if the SPS confirmation MAC CE is triggered by a SPS release DCI, the MAC entity may clear the configured uplink grant associated with the released SPS after (e.g. as early as possible) first transmission of the SPS confirmation MAC CE.

In an example, when a UE is configured with an SPS configuration (legacy SPS configuration), SPS configuration MAC CE may be identified by an SPS confirmation LCID (e.g. 10101). In an example, the SPS confirmation MAC control element is identified by a MAC PDU subheader with SPS confirmation LCID. The MAC CE may have a fixed size of zero bits.

In an example embodiment, one or more bits in the SPS confirmation MAC CE subheader may be employed to indicate whether the SPS confirmation is for a legacy SPS configuration or an enhanced SPS configuration. For example, an R bit may be employed to indicate how the MAC CE is used. One or more example embodiments may be used for SPS confirmation of the enhanced SPS configuration when the one or more bits indicate that the MAC CE is applicable to an enhanced SPS configuration. In an example, the length field in the MAC CE subheader may indicate that the MAC CE is for the legacy SPS configuration or enhanced SPS configuration. For example, when the length field has a first value (e.g. zero), the SPS confirmation MAC CE may be for legacy SPS configuration, and if the length field has a second value (e.g. one), the MAC CE is applicable to enhanced SPS configuration. In an example, a bit in the MAC CE may determine whether the MAC CE is applicable to a legacy SPS configuration or enhanced SPS configuration. In an example, RNTI associated with the SPS configuration may be included in the SPS confirmation. In an example, SPS index may be included in SPS confirmation MAC CE. In an example, SPS RNTI and/or SPS index may be included in the MAC CE to indicate the confirmation of a corresponding SPS. In an example, a bitmap may be included in a MAC CE, wherein a bit corresponds to a corresponding SPS index/RNTI.

In an example, SPS confirmation MAC CE may include other SPS related parameters for an SPS configuration, e.g. SPS UE assistance information, etc.

In an example embodiment, after a UE receives a SPS activation/reactivation/release DCI from the eNB, with the SPS configuration indicated in the DCI, if the UE is configured with SkipUplinkTXSPS (e.g., if SkipUplinkTXSPS is configured for the SPS index indicated in the DCI or if SkipUplinkTXSPS is configured for the configured SPS configurations), the UE may trigger the SPS confirmation. If the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, the MAC entity may clear the configured uplink grants associated with a SPS configuration after (e.g., as early as possible) first transmission of the SPS confirmation MAC CE triggered by the receiving a release DCI for the SPS configuration.

In an example, for a given SPS configuration, if SPS confirmation has been triggered and not cancelled and if the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, if the SPS confirmation MAC CE is triggered by a SPS release DCI, the MAC entity may clear the configured uplink grant associated with the released SPS after (e.g. as early as possible) first transmission of the SPS confirmation MAC CE.

In an example, when a UE is configured with an SPS configuration (legacy SPS configuration), SPS confirmation MAC CE may be identified by an SPS confirmation LCID (e.g. 10101). In an example, the SPS confirmation MAC control element is identified by a MAC PDU sub-header with SPS confirmation LCID. The MAC CE may have a fixed size of zero bits.

In an example embodiment, the SPS confirmation MAC CE may be identified by a MAC PDU subheader with an LCID (e.g. LCID of 10101) and may have a fixed size of zero bits. In an example, after a UE receives a SPS activation/reactivation/release DCI from the eNB, with the SPS configuration indicated in the DCI, if the UE is configured with SkipUplinkTXSPS (e.g., if SkipUplinkTXSPS is configured for the SPS index indicated in the DCI or if SkipUplinkTXSPS is configured for the configured SPS configurations), the UE may trigger the SPS confirmation. The MAC entity may instruct the Multiplexing and Assembly procedure to generate an SPS confirmation MAC CE in a TTI for which the MAC entity has a configured grant corresponding to the SPS configuration indicated in the DCI (the TTI may be a TTI for the next SPS grant) and cancel the triggered SPS confirmation after its transmission. In an example, the MAC entity may clear the configured uplink grants associated with a SPS configuration after (e.g., as early as possible) first transmission of the SPS confirmation MAC CE triggered by receiving a release DCI for the SPS configuration.

In an example, for a given SPS configuration, if SPS confirmation has been triggered and not cancelled and if the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, if the SPS confirmation MAC CE is triggered by a SPS release DCI, the MAC entity may clear the configured uplink grant associated with the released SPS after (e.g. as early as possible) first transmission of the SPS confirmation MAC CE.

In an example, when a UE is configured with an SPS configuration (legacy SPS configuration), SPS confirmation MAC CE may be identified by an SPS confirmation LCID (e.g. 10101). In an example, the SPS confirmation MAC control element is identified by a MAC PDU sub-header with SPS confirmation LCID. The MAC CE may have a fixed size of zero bits.

In an example embodiment, the SPS confirmation MAC CE may be identified by a MAC PDU subheader with an LCID (e.g. LCID of 10101) and may have a fixed size of zero bits. In an example, after a UE receives a SPS activation/reactivation/release DCI from the eNB, with the SPS configuration indicated in the DCI, if the UE is configured with SkipUplinkTXSPS (e.g., if SkipUplinkTXSPS is configured for the SPS index indicated in the DCI or if SkipUplinkTXSPS is configured for the configured SPS configurations), the UE may trigger the SPS confirmation. If the MAC entity has UL resources allocated for new transmission in a TTI on or after the SPS confirmation trigger (e.g., the TTI that the DCI is received), the MAC entity may instruct the Multiplexing and Assembly procedure to generate an SPS confirmation MAC CE and cancel the triggered SPS confirmation after its transmission. In an example, the eNB may not send a new SPS activation/reactivation/release DCI until the eNB receives the MAC CE of the last SPS Activation/Release from the UE. In an example, the MAC entity may clear the configured uplink grants associated with a SPS configuration after (e.g., as early as possible) first transmission of the SPS confirmation MAC CE triggered by the receiving a release DCI for the SPS configuration.

In an example embodiment, a UE may trigger a UE assistance (e.g., MAC CE) based on some implementation rules. In an example, the UE may be configured with one or more SPS configurations. In an example, the UE may trigger the assistance due to change in expected packet periodicity (e.g., to indicate a preferred SPS interval) and/or offset (e.g., with respect to subframe0 of SFN0) in packet generation and/or packet size of one or more active and/or configured SPS configurations. In an example, the UE assistance information may be transmitted for active and/or configured and/or non-configured SPS configuration (e.g., to trigger activation and/or configuration by the eNB). In an example, the preferred SPS interval in the UE assistance information may be the interval between the last two generated packets. In an example, the preferred SPS interval in the UE assistance information may be average inter-packet generation time for a period of time (e.g., the last T seconds and/or S subframes). In an example, the period of time may be configured for the UE. In an example, the period of time may be RRC configured for the UE. In an example, the UE may estimate the periodicity and timing offset based on UE implementation. In an example, other assistance information such as one or more SPS index of the one or more SPS configuration (e.g., if SPS is configured by the eNB), one or more LCIDs to which the content of the UE assistance information is/are associated, one or more PPPP to which the content of the assistance information is/are associated with, the Destination L2 ID for the associated logical channel(s), and the like.

In an example embodiment, when a UE assistance is triggered at the UE, and if the MAC entity has UL resources allocated for new transmission for this TTI (e.g., for transmission of the MAC CE on the first subframe on or after four subframes after the UE assistance is triggered), the MAC entity may instruct the Multiplexing and Assembly procedure to generate a UE assistance MAC CE. In an example, the information in MAC CE (e.g., periodicity and/or offset and/or message size and/or the like), may be based on the measurement and/or the UE understanding of the values of the UE assistance information at the subframe that UE assistance MAC CE and/or MAC PDU that contains the UE assistance MAC CE is generated.

In an example, an eNB may configure a UE (e.g., using RRC) with parameters and/or timers to control the UE assistance operation. In an example, the eNB may release (stop) the UE assistance reporting using a release command in the RRC information element, e.g. the RRC message that configures the UE assistance parameters/timers. An eNB may transmit one RRC message to the UE. The RRC message may comprise an information element releasing the SPS assistance or configuring/updating UE Assistance and/or SPS configuration. In an example, the IE may be part of the MAC-MainConfig IE and/or SPS-Config.

In an example, the eNB may configure the UE with a timer (e.g., a prohibit timer). In an example, an eNB may transmit one or more RRC messages comprising one or more IE indicating one or more prohibit timer values. In an example, one timer value may be configured for multiple SPS configurations. In an example, an SPS configuration may have its own timer value. For example, SPS configuration IE may comprise a timer value, and multiple SPS configuration IEs may be configured. In an example, the RRC message may comprise a sequence of parameters comprising (timer value, SPS parameter), SPS parameter may be e.g. SPS index and/or SPS-RNTI.

In an example, the timer value may be one of a set of predefined values, (e.g. value 1, value 2, value 3, . . . value 8), and an index (e.g. 3 bits) may determine which timer value is selected. Other examples may be provided.

In an example, the UE may not trigger and/or transmit the UE assistance while a corresponding SPS prohibit timer is running.

In an example embodiment, the UE may cancel a first trigger for a first UE assistance upon transmission of a first UE assistance information.

In an example, the MAC entity may start a first timer (e.g., a prohibit timer) upon the transmission of the first UE assistance information. In an example, the value of the first timer may be RRC configured. In an example, the UE may not trigger a second UE assistance while the first timer is running. In an example, UE may trigger a second UE assistance when the second UE assistance is different from the first UE assistance while the first timer is running. In an example, the UE may (re)start a second timer when the second UE assistance is transmitted. In an example, the UE may (re)start the first timer when the second UE assistance is transmitted. A different UE assistant may be for a different SPS index and/or RNTI, or may be for a different value of the same and/or different parameter of the same SPS index and/or RNTI.

Figure 19:
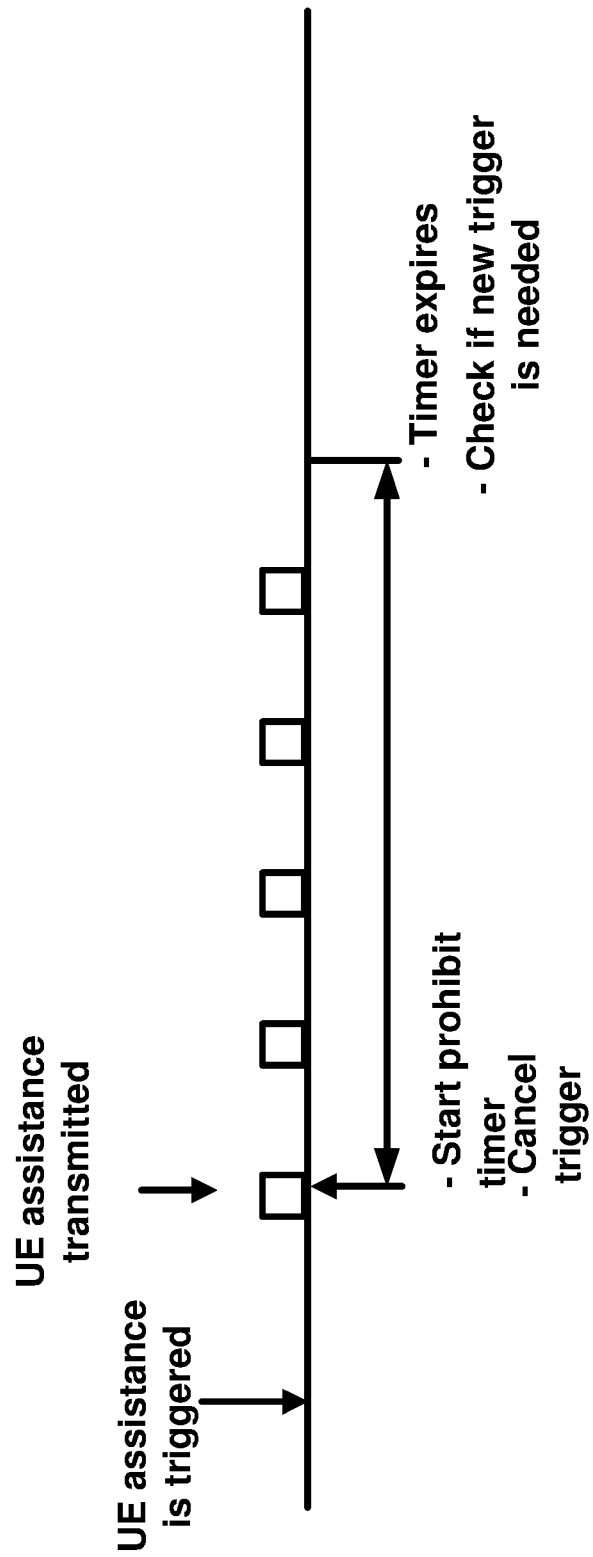
FIG. 19 is an example assistance information transmission procedure as per an aspect of an embodiment of the present disclosure.

In an example embodiment, as shown in FIG. 19, the UE may check if a UE assistance may be triggered after the expiration of the timer. In an example, if the configured SPS grants meet the traffic requirements of the UE (e.g., periodicity and/or offset and/or message size and/or the like) and/or if the eNB considers the information in the UE assistance and activates/updates the SPS for the UE (e.g., while the timer is running), the UE may not trigger the SPS after the timer expires. In an example, the UE may trigger UE assistance after the expiration of timer for example because the generated traffic characteristics (e.g., periodicity and/or offset and/or message size and/or the like) and configured grants do not meet traffic requirements and/or if eNB does not configure and/or activate/reactivate and/or update the SPS considering the UE assistance information.

Figure 20:
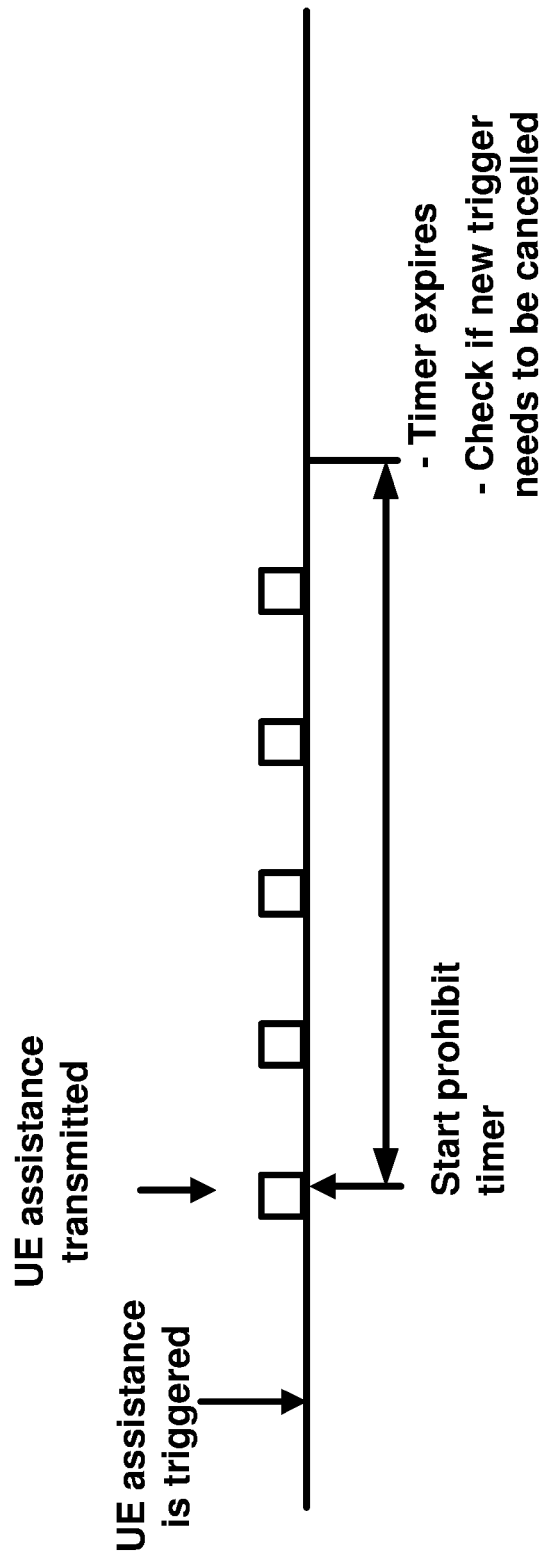
FIG. 20 is an example assistance information transmission procedure as per an aspect of an embodiment of the present disclosure.
Figure 21:
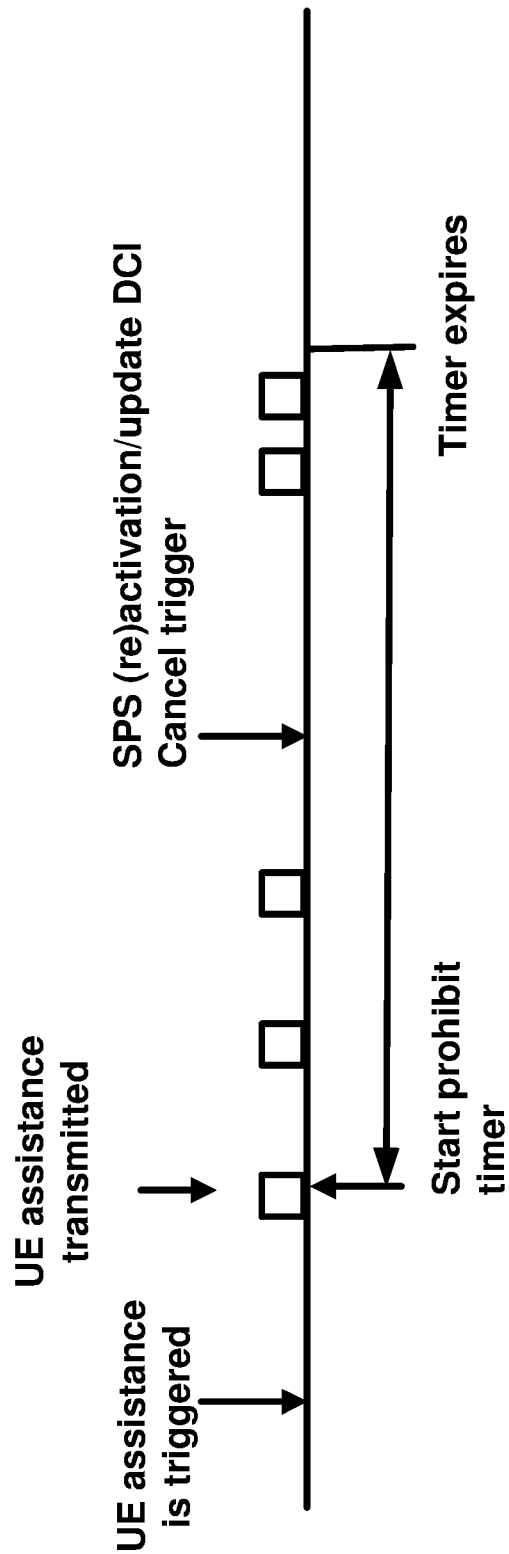
FIG. 21 is an example assistance information transmission procedure as per an aspect of an embodiment of the present disclosure.
Figure 22:
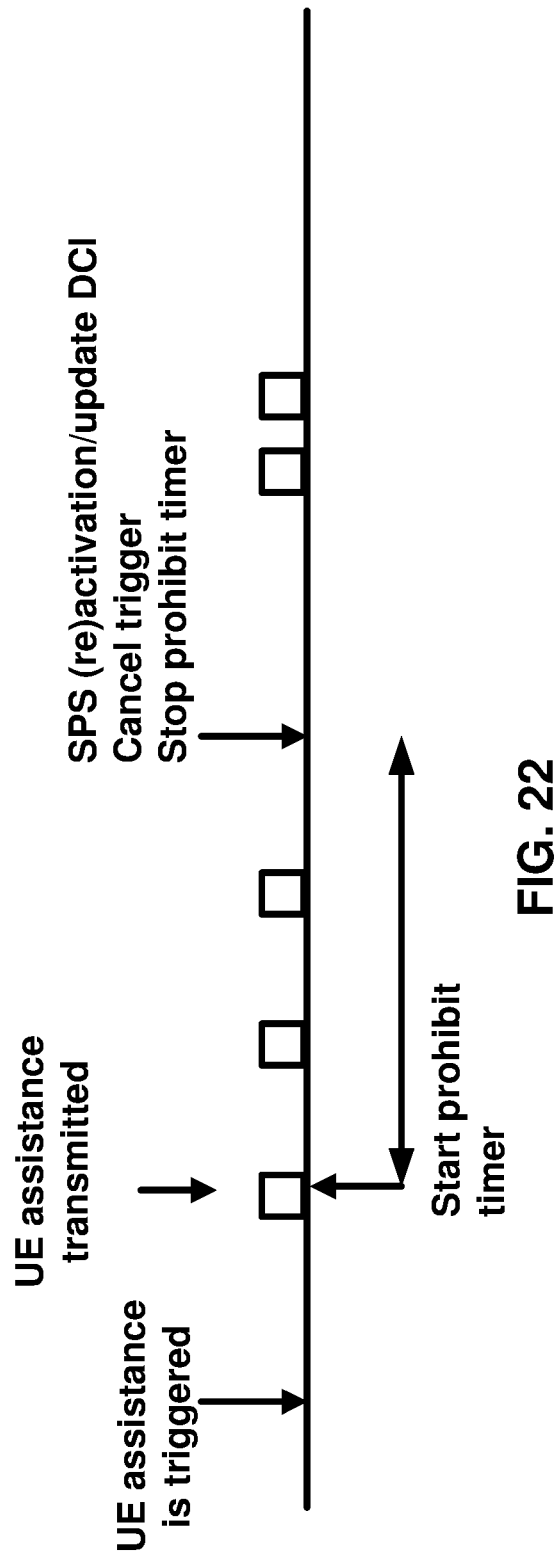
FIG. 22 is an example assistance information transmission procedure as per an aspect of an embodiment of the present disclosure.

In an example embodiment, as shown in FIG. 20, FIG. 21, and FIG. 22, the UE may not cancel the trigger for UE assistance after transmission of the UE assistance. In an example, the MAC entity may start a first timer (e.g., a prohibit timer) upon the transmission of a first UE assistance MAC CE. In an example, the value of the timer may be RRC configured. In an example, the UE may not transmit UE assistance while the first timer is running.

In an example embodiment, as shown in FIG. 20, the UE may check if the UE assistance trigger may be canceled on or after the expiration of the first timer. In an example, if the configured SPS grants meets the traffic requirements of the UE (e.g., periodicity and/or offset and/or message size and/or the like) and/or if the eNB considers the information in the UE assistance MAC CE and activates/updates the SPS for the UE (e.g., while the timer is running), the UE may cancel the trigger on or after the first timer expires.

In an example embodiment, as shown in FIG. 21, the UE may check if the UE assistance trigger may be canceled before the expiration of the first timer. In an example, if the configured SPS grants meets the traffic requirements of the UE (e.g., periodicity and/or offset and/or message size and/or the like) and/or if the eNB considers the information in the UE assistance MAC CE and activates/updates the SPS for the UE (e.g., while the timer is running), the UE may cancel the trigger after the checking and before the first timer expires.

In an example embodiment, as shown in FIG. 22, the UE may check if the UE assistance trigger may be canceled and/or the first timer may be stopped before the expiration of the first timer. In an example, in response to the configured SPS grants meeting the traffic requirements of the UE (e.g., periodicity and/or offset and/or message size and/or the like) and/or in response to the eNB considering the information in the UE assistance MAC CE and activating/updating the SPS for the UE (e.g., while the timer is running), the UE may cancel the trigger in response to the checking and before the first timer expires and the UE may stop the first timer.

Figure 23:
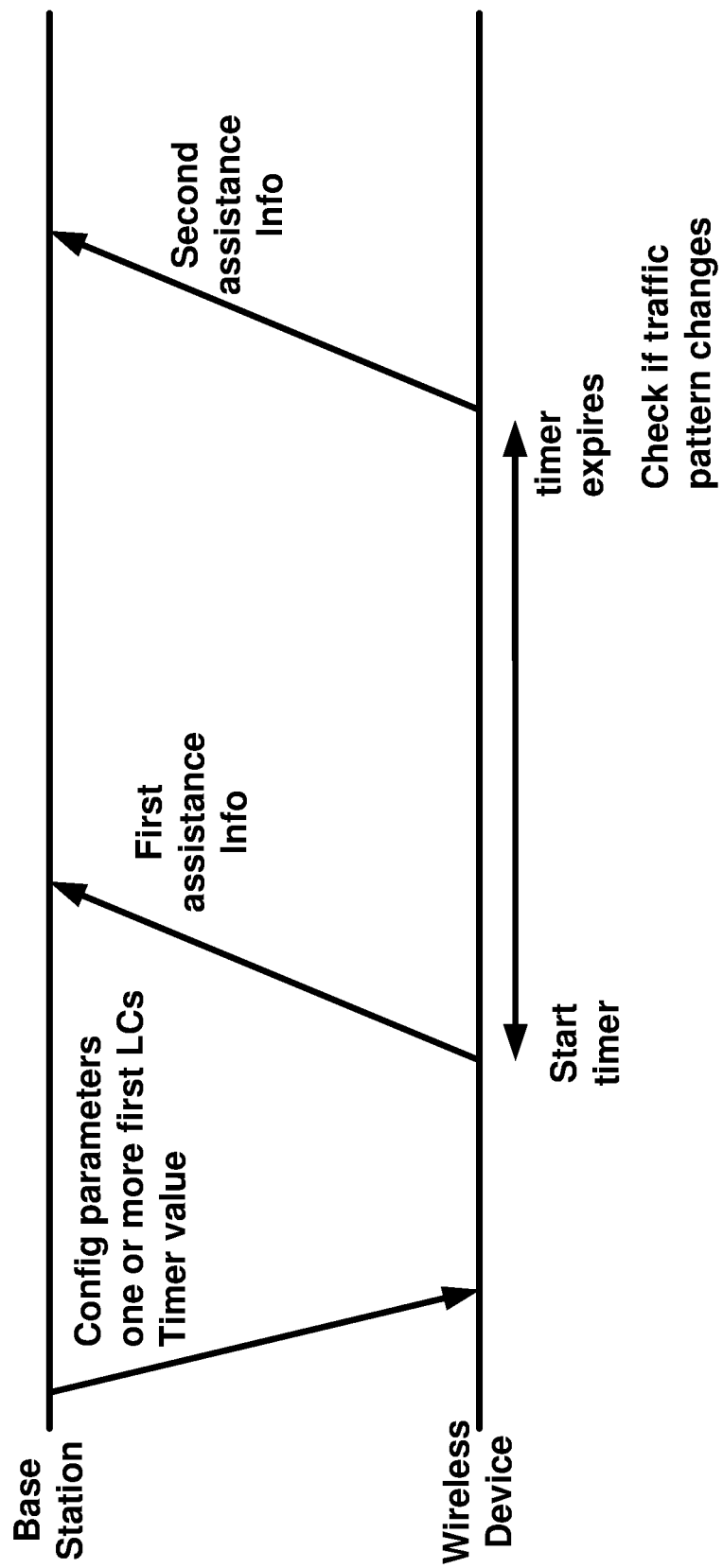
FIG. 23 is an example assistance information transmission procedure as per an aspect of an embodiment of the present disclosure.

In an example embodiment, a wireless device may be configured with one or more first logical channels in a plurality of logical channels. The data from the one or more first logical channels may be used for transmission of a plurality of SPS and/or periodic resource allocation. The wireless device may transmit a first SPS assistance information in response to a assistance information trigger. In an example, the trigger may be based on an implementation rule. The trigger may be based on one or more conditions. The wireless device may start a timer in response to transmitting the first assistance information. An example procedure for SPS assistance information transmission is shown in FIG. 23. In an example, the wireless device may not transmit a second SPS assistance information while the timer is running. In an example, the wireless device may check if traffic pattern has changed and may trigger/transmit a second SPS assistance information in response to the timer expiring and some parameters of the traffic pattern changing. The parameters for traffic pattern may comprise, periodicity, packet size, offset, etc.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 24:
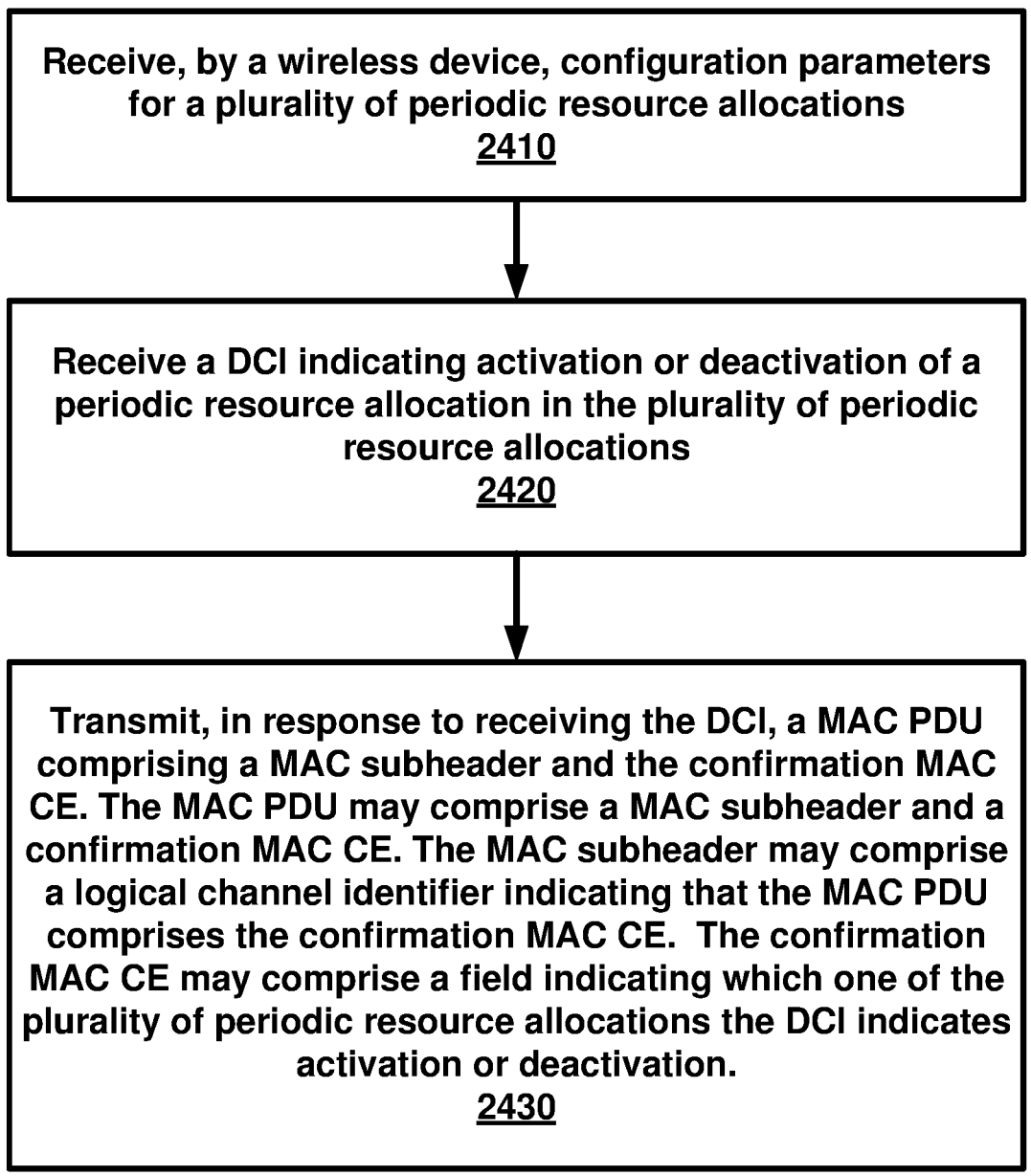
FIG. 24 is an example flow diagram as per an aspect of an embodiment of the present disclosure.

FIG. 24 is an example flow diagram as per an aspect of an embodiment of the present disclosure. At 2410, a wireless device may receive configuration parameters for a plurality of periodic resource allocations. At 2420, a downlink control information (DCI) may be received indicating activation or deactivation of a periodic resource allocation in the plurality of periodic resource allocations. At 2430, in response to receiving the DCI, a medium access control (MAC) protocol data unit (PDU) may be transmitted. The MAC PDU may comprise a MAC subheader and a confirmation MAC control element (MAC CE). The MAC subheader may comprise a logical channel identifier indicating that the MAC PDU comprises the confirmation MAC CE. The confirmation MAC CE may comprise a field indicating which one of the plurality of periodic resource allocations the DCI indicates activation or deactivation.

According to an embodiment, the periodic resource allocation may be semi-persistent scheduling. According to an embodiment, the configuration parameters of the periodic resource allocation may comprise: an index of the periodic resource allocation; and a periodicity of the periodic resource allocation. According to an embodiment, the field may indicate the index of the periodic resource allocation. According to an embodiment, the field may comprise a bitmap. A bit in the bitmap may correspond to one of the plurality of periodic resource allocations and a value of the bit indicates whether a DCI is received that indicates activation or deactivation of a periodic resource allocation corresponding to the bit. According to an embodiment, the configuration parameters may comprise: a first radio network temporary identifier corresponding to one or more first periodic resource allocations; and a second radio network temporary identifier corresponding to one or more second periodic resource allocations. According to an embodiment, the configuration parameters may comprise the logical channel identifier.

Figure 25:
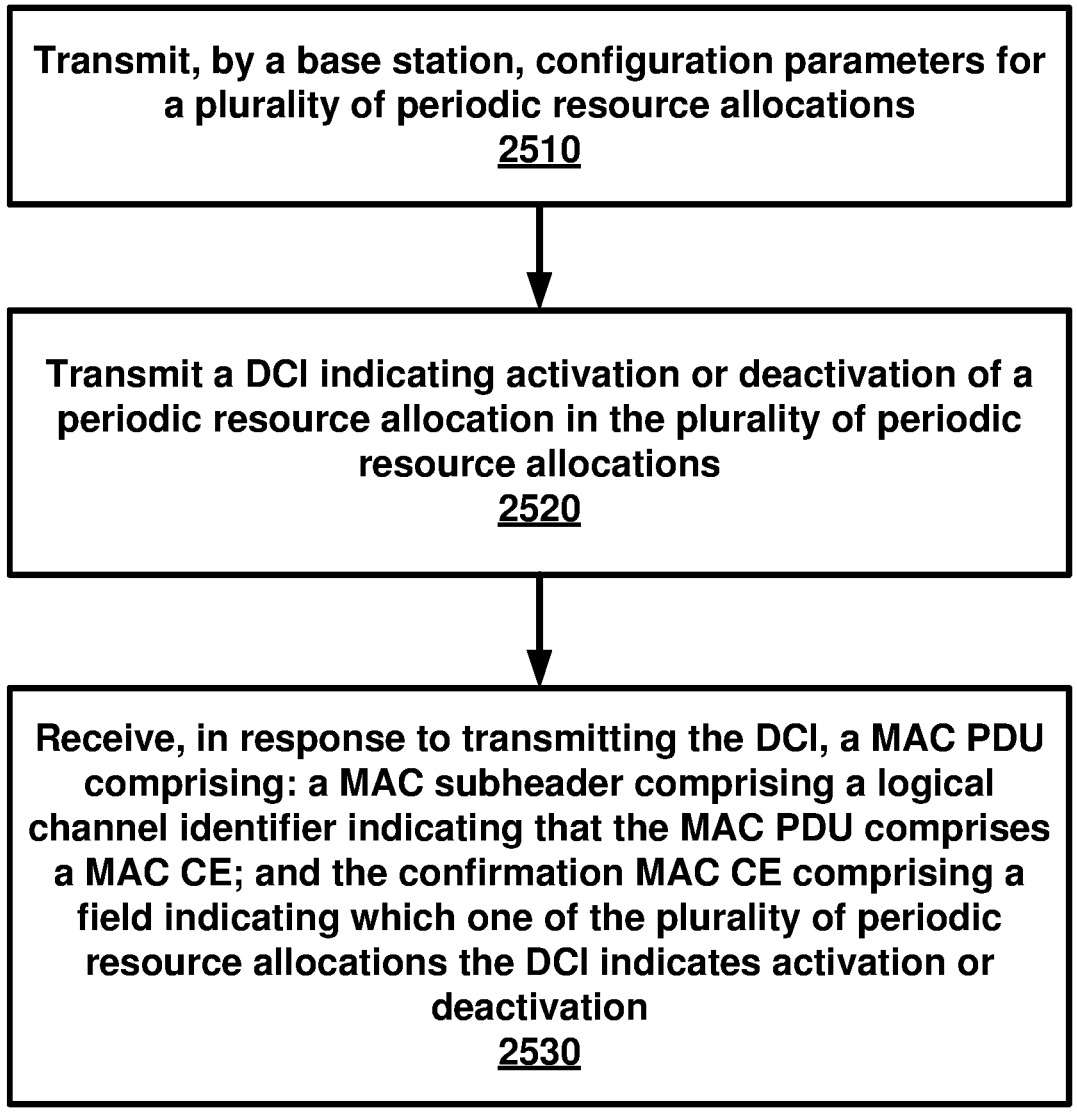
FIG. 25 is an example flow diagram as per an aspect of an embodiment of the present disclosure.

FIG. 25 is an example flow diagram as per an aspect of an embodiment of the present disclosure. At 2510, a base station may transmit configuration parameters for a plurality of periodic resource allocations. At 2520, a downlink control information (DCI) may be transmitted. The DCI may indicate activation or deactivation of a periodic resource allocation in the plurality of periodic resource allocations. At 2530, in response to transmitting the DCI, a medium access control (MAC) protocol data unit (MAC PDU) may be received. The MAC PDU may comprise: a MAC subheader comprising a logical channel identifier indicating that the MAC PDU comprises a confirmation MAC control element (MAC CE); and the confirmation MAC CE comprising a field indicating which one of the plurality of periodic resource allocations the DCI indicates activation or deactivation.

According to an embodiment, the periodic resource allocation may be semi-persistent scheduling. According to an embodiment, the configuration parameters of the periodic resource allocation may comprise: an index of the periodic resource allocation; and a periodicity of the periodic resource allocation. According to an embodiment, the field may indicate the index of the periodic resource allocation. According to an embodiment, the field may comprise a bitmap. A bit in the bitmap may correspond to one of the plurality of periodic resource allocations and a value of the bit may indicate whether a DCI is received that indicates activation or deactivation of a periodic resource allocation corresponding to the bit. According to an embodiment, the configuration parameters may comprise: a first radio network temporary identifier corresponding to one or more first periodic resource allocations; and a second radio network temporary identifier corresponding to one or more second periodic resource allocations.

Figure 26:
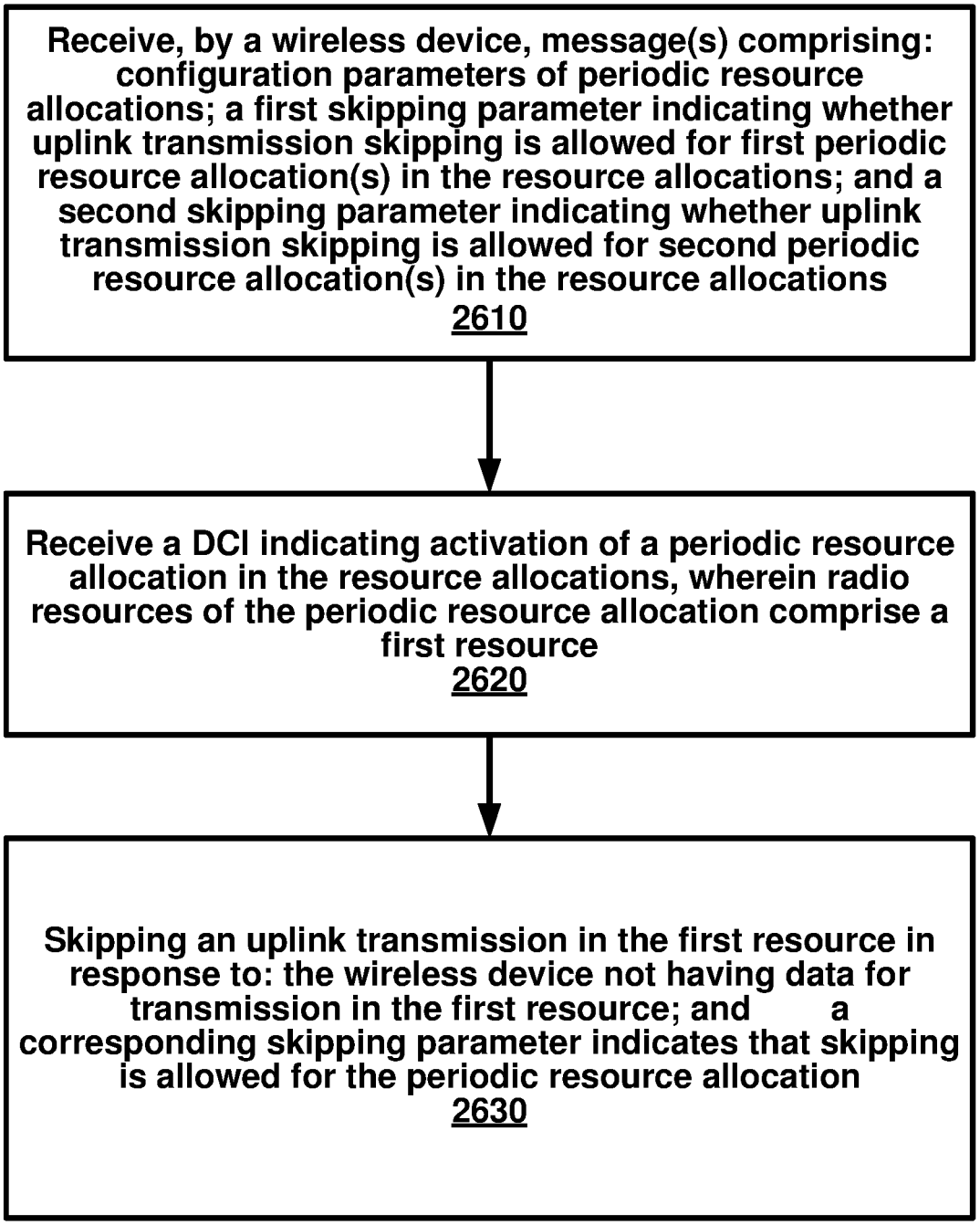
FIG. 26 is an example flow diagram showing as per an aspect of an embodiment of the present disclosure.

FIG. 26 is an example flow diagram as per an aspect of an embodiment of the present disclosure. At 2610, a wireless device receives one or more messages. The one or more messages may comprise: configuration parameters of a plurality of periodic resource allocations; a first skipping parameter indicating whether uplink transmission skipping is allowed for one or more first periodic resource allocations in the plurality of resource allocations; and a second skipping parameter indicating whether uplink transmission skipping is allowed for one or more second periodic resource allocations in the plurality of resource allocations. At 2620, a downlink control information (DCI) may be received. The DCI may indicate activation of a periodic resource allocation in the plurality of resource allocations. The radio resources of the periodic resource allocation may comprise a first resource. At 2630, an uplink transmission in the first resource may be skipped in response to: the wireless device not having data for transmission in the first resource; and a corresponding skipping parameter indicates that skipping is allowed for the periodic resource allocation.

Figure 27:
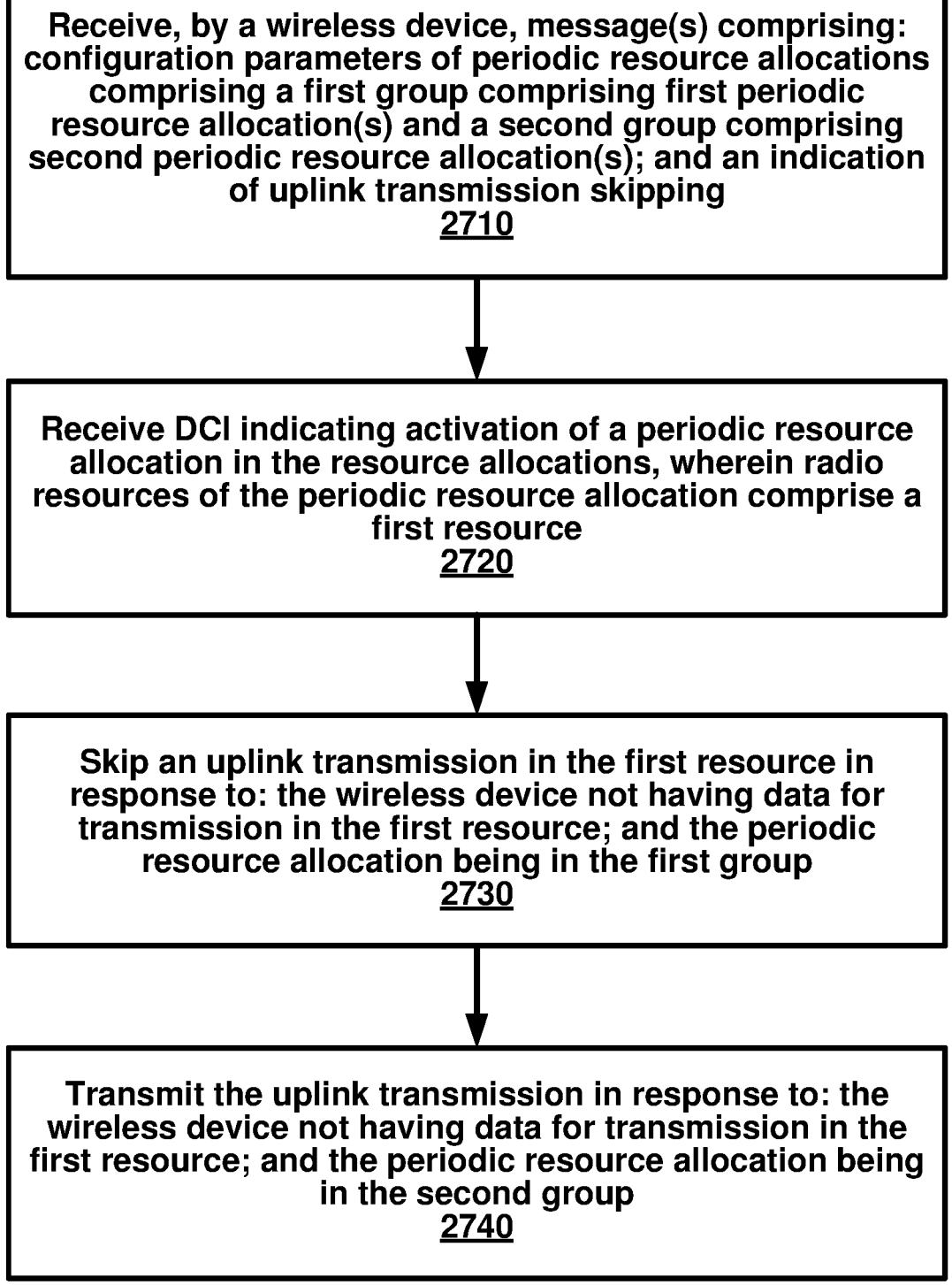
FIG. 27 is an example flow diagram as per an aspect of an embodiment of the present disclosure.

FIG. 27 is an example flow diagram as per an aspect of an embodiment of the present disclosure. At 2710, a wireless device may receive one or more messages. The message(s) may comprise: configuration parameters of a plurality of periodic resource allocations comprising a first group comprising one or more first periodic resource allocations and a second group comprising one or more second periodic resource allocations; and an indication of uplink transmission skipping. At 2720, a downlink control information (DCI) may be received. The DCI may indicate activation of a periodic resource allocation in the plurality of resource allocations, wherein radio resources of the periodic resource allocation comprises a first resource. At 2730, an uplink transmission in the first resource may be skipped in response to: the wireless device not having data for transmission in the first resource; and the periodic resource allocation being in the first group. At 2740, the uplink transmission may be transmitted in response to: the wireless device not having data for transmission in the first resource; and the periodic resource allocation being in the second group.

Figure 28:
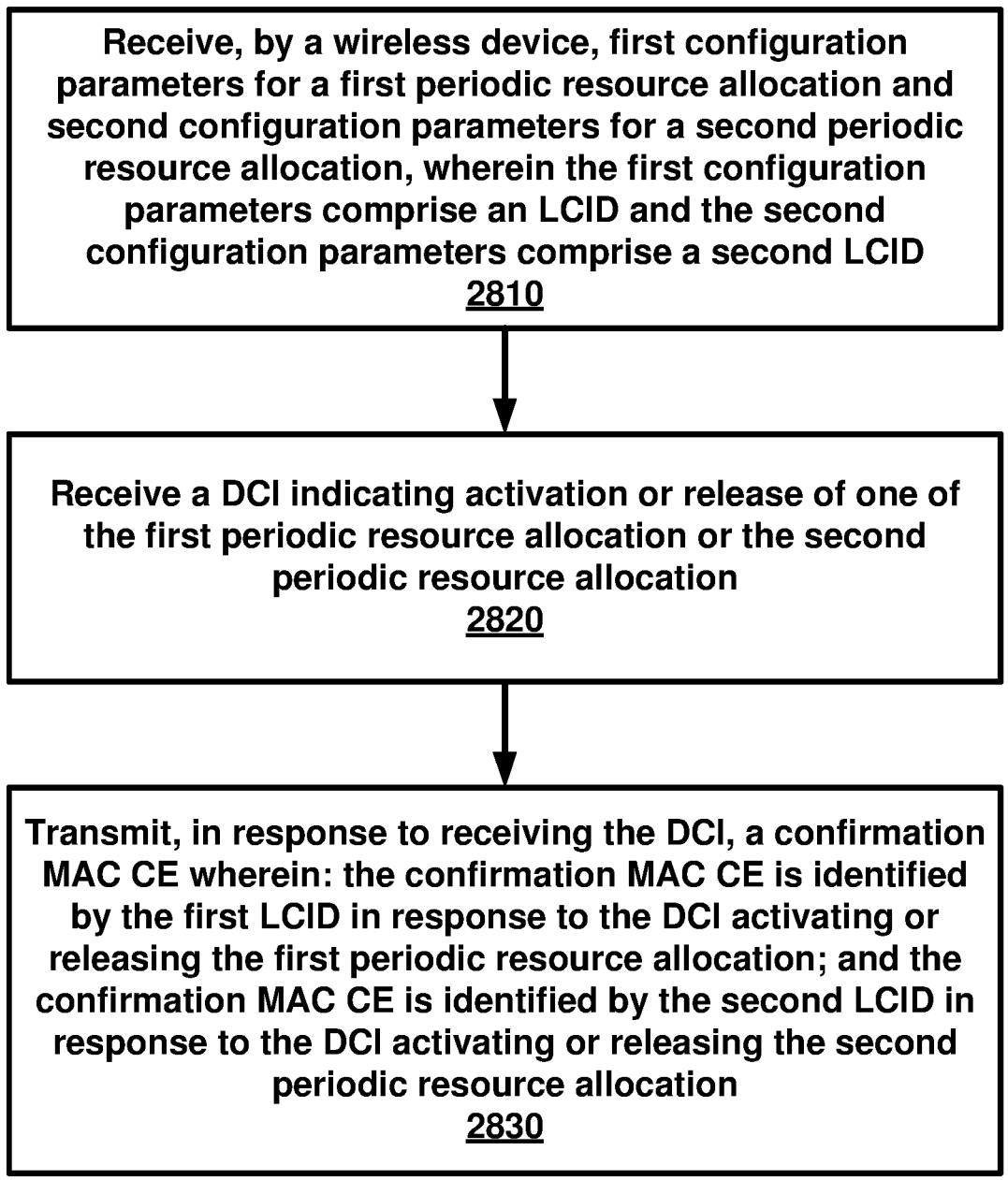
FIG. 28 is an example flow diagram as per an aspect of an embodiment of the present disclosure.

FIG. 28 is an example flow diagram as per an aspect of an embodiment of the present disclosure. At 2810, a wireless device may receive first configuration parameters for a first periodic resource allocation and second configuration parameters for a second periodic resource allocation. The first configuration parameters may comprise a first logical channel identifier (LCID) and the second configuration parameters comprise a second LCID. At 2820, a downlink control information (DCI) may be received indicating activation or release of one of the first periodic resource allocation or the second periodic resource allocation. In response to receiving the DCI, a confirmation medium access control (MAC) control element (MAC CE) may be transmitted. The confirmation MAC CE may be identified by the first LCID in response to the DCI activating or releasing the first periodic resource allocation. The confirmation MAC CE may be identified by the second LCID in response to the DCI activating or releasing the second periodic resource allocation.

Figure 29:
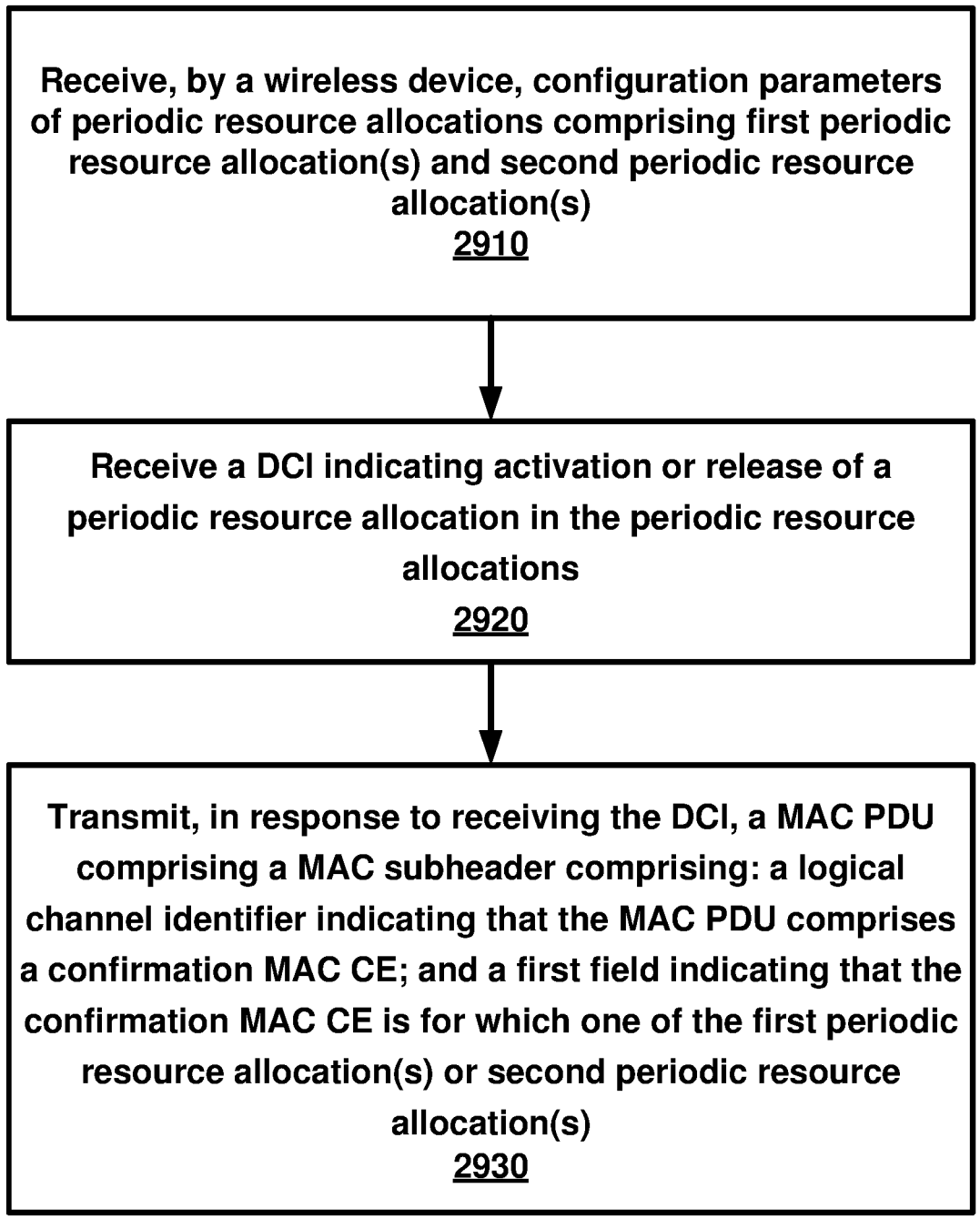
FIG. 29 is an example flow diagram showing as per an aspect of an embodiment of the present disclosure.

FIG. 29 is an example flow diagram as per an aspect of an embodiment of the present disclosure. At 2910, a wireless device may receive configuration parameters of a plurality of periodic resource allocations comprising one or more first periodic resource allocations and one or more second periodic resource allocations. At 2920, a downlink control information (DCI) may be received. The DCI may indicate activation or release of a periodic resource allocation in the plurality of periodic resource allocations. In response to receiving the DCI, a medium access control (MAC) protocol data unit (MAC PDU) may be transmitted at 2930. The MAC PDU may comprise a logical channel identifier indicating that the MAC PDU comprises a confirmation MAC control element (MAC CE); and a first field indicating that the confirmation MAC CE is for which one of the one or more first periodic resource allocations or one or more second periodic resource allocations.

Figure 30:
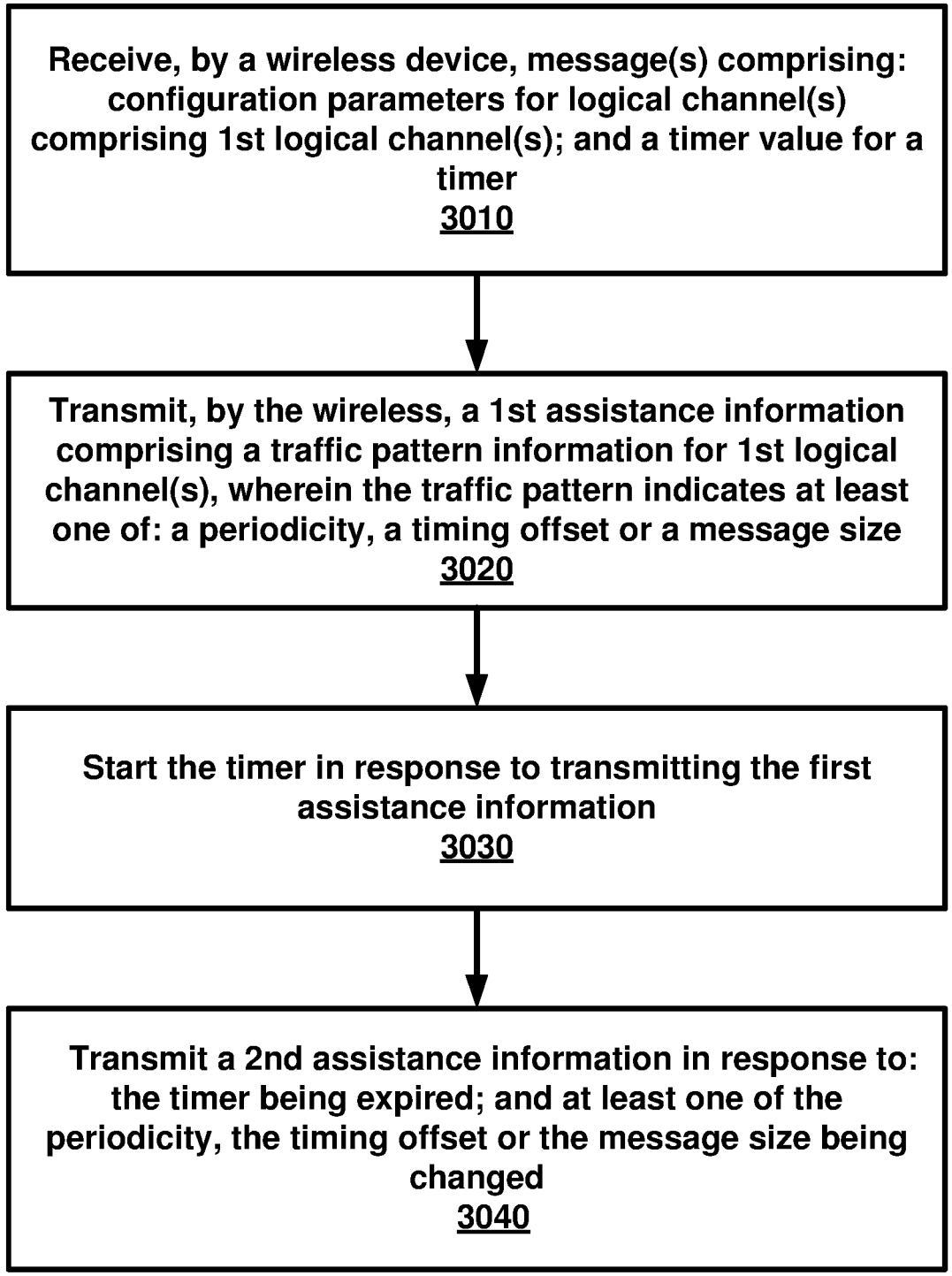
FIG. 30 is an example flow diagram as per an aspect of an embodiment of the present disclosure.

FIG. 30 is an example flow diagram as per an aspect of an embodiment of the present disclosure. At 3010, a wireless device may receive one or more messages. The message(s) may comprise: configuration parameters for a plurality of logical channels comprising one or more first logical channels; and a timer value for a timer. At 3020, the wireless device may transmit a first assistance information comprising a traffic pattern information for one or more first logical channels. The traffic pattern may indicate at least one of: a periodicity, and a timing offset or a message size. At 303, the timer may be started in response to transmitting the first assistance information. At 3040, a second assistance information may be transmitted in response to: the timer being expired; and at least one of the periodicity, the timing offset or the message size being changed.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages. In an example, an IE may be a sequence of first parameters (first IEs). The sequence may comprise one or more first parameters. For example, a sequence may have a length max_length (e.g. 1, 2, 3, etc.). A first parameter in the sequence may be identified by the parameter index in the sequence. The sequence may be ordered.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, an indication of activation or release of at least one resource allocation of a plurality of resource allocations; and
   sending, based on the indication:
      a medium access control (MAC) subheader comprising an identifier associated with a MAC control element; and
      the MAC control element, wherein the MAC control element comprises a plurality of fields, and wherein at least one of the plurality of fields comprises a same value to indicate either the activation or the release.

2. The method of claim 1, wherein the at least one resource allocation is associated with semi-persistent scheduling.

3. The method of claim 1, wherein:
   the plurality of fields comprises a bitmap; and
   a value of each bit in the bitmap indicates an activation status of one of the at least one resource allocation, wherein the activation status comprises either activation or release.

4. The method of claim 1, wherein the MAC subheader and the MAC control element are in a MAC protocol data unit (PDU).

5. The method of claim 1, wherein:
   a confirmation of an activation of a resource allocation of the plurality of resource allocations is indicated by a first value;
   a confirmation of a release of the resource allocation is indicated by the first value; and
   not having received an indication of an activation or release of the resource allocation is indicated by a second value that is different from the first value.

6. The method of claim 1, wherein the receiving the indication comprises receiving downlink control information (DCI) comprising the indication.

7. The method of claim 1, wherein the identifier comprises a logical channel identifier (LCID).

8. The method of claim 1, further comprising:
   receiving configuration information for the plurality of resource allocations, wherein the configuration information comprises:
      a first radio network temporary identifier corresponding to at least one first resource allocation of the plurality of resource allocations; and
      a second radio network temporary identifier corresponding to at least one second resource allocation of the plurality of resource allocations.

9. A wireless device comprising:
   at least one processor; and
   memory storing instructions that, when executed by the at least one processor, cause the wireless device to:
      receive an indication of activation or release of at least one resource allocation of a plurality of resource allocations; and
      send, based on the indication:
         a medium access control (MAC) subheader comprising an identifier associated with a MAC control element; and
         the MAC control element, wherein the MAC control element comprises a plurality of fields, and wherein at least one of the plurality of fields comprises a same value to indicate either the activation or the release.

10. The wireless device of claim 9, wherein the at least one resource allocation is associated with semi-persistent scheduling.

11. The wireless device of claim 9, wherein:
    the plurality of fields comprises a bitmap; and
    a value of each bit in the bitmap indicates an activation status of one of the at least one resource allocation, wherein the activation status comprises either activation or release.

12. The wireless device of claim 9, wherein the MAC subheader and the MAC control element are in a MAC protocol data unit (PDU).

13. The wireless device of claim 9, wherein:
    a confirmation of an activation of a resource allocation of the plurality of resource allocations is indicated by a first value;
    a confirmation of a release of the resource allocation is indicated by the first value; and not having received an indication of an activation or release of the resource allocation is indicated by a second value that is different from the first value.

14. The wireless device of claim 9, wherein the instructions, when executed by the at least one processor, cause the wireless device to receive the indication by receiving downlink control information (DCI) comprising the indication.

15. The wireless device of claim 9, wherein the identifier comprises a logical channel identifier (LCID).

16. The wireless device of claim 9, wherein the instructions, when executed by the at least one processor, cause the wireless device to:
receive configuration information for the plurality of resource allocations, wherein the configuration information comprises:
a first radio network temporary identifier corresponding to at least one first resource allocation of the plurality of resource allocations; and
a second radio network temporary identifier corresponding to at least one second resource allocation of the plurality of resource allocations.

17. A method comprising:
sending, by a base station, an indication of activation or release of at least one resource allocation of a plurality of resource allocations; and
receiving, after sending the indication:
a medium access control (MAC) subheader comprising an identifier associated with a MAC control element; and
the MAC control element, wherein the MAC control element comprises a plurality of fields, and wherein at least one of the plurality of fields comprises a same value to indicate either the activation or the release.

18. The method of claim 17, wherein the at least one resource allocation is associated with semi-persistent scheduling.

19. The method of claim 17, wherein:
the plurality of fields comprises a bitmap; and
a value of each bit in the bitmap indicates an activation status of one of the at least one resource allocation, wherein the activation status comprises either activation or release.

20. The method of claim 17, wherein the MAC subheader and the MAC control element are in a MAC protocol data unit (PDU).

21. The method of claim 17, wherein:
a confirmation of an activation of a resource allocation of the plurality of resource allocations is indicated by a first value;
a confirmation of a release of the resource allocation is indicated by the first value; and
not having received an indication of an activation or release of the resource allocation is indicated by a second value that is different from the first value.

22. The method of claim 17, wherein the sending the indication comprises sending downlink control information (DCI) comprising the indication.

23. The method of claim 17, wherein the identifier comprises a logical channel identifier (LCID).

24. The method of claim 17, further comprising:
sending configuration information for the plurality of resource allocations, wherein the configuration information comprises:
a first radio network temporary identifier corresponding to at least one first resource allocation of the plurality of resource allocations; and
a second radio network temporary identifier corresponding to at least one second resource allocation of the plurality of resource allocations.

25. A base station comprising:
at least one processor; and
memory storing instructions that, when executed by the at least one processor, cause the base station to:
send an indication of activation or release of at least one resource allocation of a plurality of resource allocations; and
receive, after sending the indication:
a medium access control (MAC) subheader comprising an identifier associated with a MAC control element; and
the MAC control element, wherein the MAC control element comprises a plurality of fields, and wherein at least one of the plurality of fields comprises a same value to indicate either the activation or the release.

26. The base station of claim 25, wherein the at least one resource allocation is associated with semi-persistent scheduling.

27. The base station of claim 25, wherein:
the plurality of fields comprises a bitmap; and
a value of each bit in the bitmap indicates an activation status of one of the at least one resource allocation, wherein the activation status comprises either activation or release.

28. The base station of claim 25, wherein the MAC subheader and the MAC control element are in a MAC protocol data unit (PDU).

29. The base station of claim 25, wherein:
a confirmation of an activation of a resource allocation of the plurality of resource allocations is indicated by a first value;
a confirmation of a release of the resource allocation is indicated by the first value; and
not having received an indication of an activation or release of the resource allocation is indicated by a second value that is different from the first value.

30. The base station of claim 25, wherein the instructions, when executed by the at least one processor, cause the base station to send the indication by sending downlink control information (DCI) comprising the indication.

31. The base station of claim 25, wherein the identifier comprises a logical channel identifier (LCID).

32. The base station of claim 25, wherein the instructions, when executed by the at least one processor, cause the base station to:
send configuration information for the plurality of resource allocations, wherein the configuration information comprises:
a first radio network temporary identifier corresponding to at least one first resource allocation of the plurality of resource allocations; and
a second radio network temporary identifier corresponding to at least one second resource allocation of the plurality of resource allocations.

33. A non-transitory computer-readable medium storing instructions that, when executed, configure a wireless device to:
receive an indication of activation or release of at least one resource allocation of a plurality of resource allocations; and
send, based on the indication:
a medium access control (MAC) subheader comprising an identifier associated with a MAC control element; and
the MAC control element, wherein the MAC control element comprises a plurality of fields, and wherein at least one of the plurality of fields comprises a same value to indicate either the activation or the release.

34. The non-transitory computer-readable medium of claim 33, wherein the at least one resource allocation is associated with semi-persistent scheduling.

35. The non-transitory computer-readable medium of claim 33, wherein:
the plurality of fields comprises a bitmap; and
a value of each bit in the bitmap indicates an activation status of one of the at least one resource allocation, wherein the activation status comprises either activation or release.

36. The non-transitory computer-readable medium of claim 33, wherein the MAC subheader and the MAC control element are in a MAC protocol data unit (PDU).

37. The non-transitory computer-readable medium of claim 33, wherein:
a confirmation of an activation of a resource allocation of the plurality of resource allocations is indicated by a first value;
a confirmation of a release of the resource allocation is indicated by the first value; and
not having received an indication of an activation or release of the resource allocation is indicated by a second value that is different from the first value.

38. The non-transitory computer-readable medium of claim 33, wherein the instructions, when executed, further configure the wireless device to receive the indication by receiving downlink control information (DCI) comprising the indication.

39. The non-transitory computer-readable medium of claim 33, wherein the identifier comprises a logical channel identifier (LCID).

40. The non-transitory computer-readable medium of claim 33, wherein the instructions, when executed, further configure the wireless device to:
receive configuration information for the plurality of resource allocations, wherein the configuration information comprises:
a first radio network temporary identifier corresponding to at least one first resource allocation of the plurality of resource allocations; and
a second radio network temporary identifier corresponding to at least one second resource allocation of the plurality of resource allocations.

41. A non-transitory computer-readable medium storing instructions that, when executed, configure a base station to:
send an indication of activation or release of at least one resource allocation of a plurality of resource allocations; and
receive, after sending the indication:
a medium access control (MAC) subheader comprising an identifier associated with a MAC control element; and
the MAC control element, wherein the MAC control element comprises a plurality of fields, and wherein at least one of the plurality of fields comprises a same value to indicate either the activation or the release.

42. The non-transitory computer-readable medium of claim 41, wherein the at least one resource allocation is associated with semi-persistent scheduling.

43. The non-transitory computer-readable medium of claim 41, wherein:
the plurality of fields comprises a bitmap; and
a value of each bit in the bitmap indicates an activation status of one of the at least one resource allocation, wherein the activation status comprises either activation or release.

44. The non-transitory computer-readable medium of claim 41, wherein the MAC subheader and the MAC control element are in a MAC protocol data unit (PDU).

45. The non-transitory computer-readable medium of claim 41, wherein:
a confirmation of an activation of a resource allocation of the plurality of resource allocations is indicated by a first value;
a confirmation of a release of the resource allocation is indicated by the first value; and
not having received an indication of an activation or release of the resource allocation is indicated by a second value that is different from the first value.

46. The non-transitory computer-readable medium of claim 41, wherein the instructions, when executed, further configure the base station to send the indication by sending downlink control information (DCI) comprising the indication.

47. The non-transitory computer-readable medium of claim 41, wherein the identifier comprises a logical channel identifier (LCID).

48. The non-transitory computer-readable medium of claim 41, wherein the instructions, when executed, further configure the base station to:
send configuration information for the plurality of resource allocations, wherein the configuration information comprises:
a first radio network temporary identifier corresponding to at least one first resource allocation of the plurality of resource allocations; and
a second radio network temporary identifier corresponding to at least one second resource allocation of the plurality of resource allocations.

49. A system comprising:
a base station; and
a wireless device,
wherein the base station is configured to send, to the wireless device, an indication of activation or release of at least one resource allocation of a plurality of resource allocations, and
wherein the wireless device is configured to:
receive, from the base station, the indication of activation or release of the at least one resource allocation of the plurality of resource allocations; and
send, to the base station, based on the indication:
a medium access control (MAC) subheader comprising an identifier associated with a MAC control element; and
the MAC control element, wherein the MAC control element comprises a plurality of fields, and wherein at least one of the plurality of fields comprises a same value to indicate either the activation or the release.

50. The system of claim 49, wherein the at least one resource allocation is associated with semi-persistent scheduling.

51. The system of claim 49, wherein:
the plurality of fields comprises a bitmap; and
a value of each bit in the bitmap indicates an activation status of one of the at least one resource allocation, wherein the activation status comprises either activation or release.

52. The system of claim 49, wherein the MAC subheader and the MAC control element are in a MAC protocol data unit (PDU).

53. The system of claim 49, wherein:
a confirmation of an activation of a resource allocation of the plurality of resource allocations is indicated by a first value;

a confirmation of a release of the resource allocation is indicated by the first value; and not having received an indication of an activation or release of the resource allocation is indicated by a second value that is different from the first value.

54. The system of claim 49, wherein the base station is further configured to send the indication by sending downlink control information (DCI) comprising the indication.

55. The system of claim 49, wherein the identifier comprises a logical channel identifier (LCID).

56. The system of claim 49, wherein the base station is further configured to:
send configuration information for the plurality of resource allocations, wherein the configuration information comprises:
a first radio network temporary identifier corresponding to at least one first resource alocation of the plurality of resource allocations; and
a second radio network temporary identifier corresponding to at least one second resource allocation of the plurality of resource allocations.

* * * * *

UNITED STATES PATENT AND TRADEMARK OFFICE
CERTIFICATE OF CORRECTION

PATENT NO. : 11,785,615 B2
APPLICATION NO. : 17/896881
DATED : October 10, 2023
INVENTOR(S) : Babaei et al.

It is certified that error appears in the above-identified patent and that said Letters Patent is hereby corrected as shown below:

In the Specification

Column 9, Detailed Description of Embodiments, Line 59:
Delete "NTA" and insert --$N_{TA}$-- therefor Column 9, Detailed Description of Embodiments, Line 63:
Delete "NTA=0." and insert --$N_{TA}$=0.-- therefor Column 11, Detailed Description of Embodiments, Line 20:
After "running", insert --.-- therefor Column 12, Detailed Description of Embodiments, Line 59:
Delete "Ci:" and insert --$C_i$:-- therefor Column 12, Detailed Description of Embodiments, Line 62:
Delete "Ci" and insert --$C_i$-- therefor Column 12, Detailed Description of Embodiments, Line 62:
Delete "Ci" and insert --$C_i$-- therefor Column 12, Detailed Description of Embodiments, Line 63:
Delete "Ci" and insert --$C_i$-- therefor Column 29, Detailed Description of Embodiments, Line 44:
Delete "(Ci)" and insert --($C_i$)-- therefor Column 29, Detailed Description of Embodiments, Line 47:
Delete "Ci" and insert --$C_i$-- therefor Signed and Sealed this
Third Day of December, 2024

Katherine Kelly Vidal
*Director of the United States Patent and Trademark Office*

Column 29, Detailed Description of Embodiments, Line 47:
Delete "Ci=1)." and insert --$C_i$=1).-- therefor Column 29, Detailed Description of Embodiments, Line 48:
Delete "Ci" and insert --$C_i$-- therefor Column 29, Detailed Description of Embodiments, Line 51:
Delete "Ci" and insert --$C_i$-- therefor Column 38, Detailed Description of Embodiments, Line 1:
Delete "303," and insert --3030,-- therefor